United States Patent
Vandermeulen

(10) Patent No.: US 9,101,874 B2
(45) Date of Patent: Aug. 11, 2015

(54) METHODS AND SYSTEMS FOR TURBULENT, CORROSION RESISTANT HEAT EXCHANGERS

(71) Applicant: 7AC Technologies, Inc., Beverly, MA (US)

(72) Inventor: Peter F. Vandermeulen, Newburyport, MA (US)

(73) Assignee: 7AC Technologies, Inc., Beverly, MA (US)

( * ) Notice: Subject to any disclaimer, the term of this patent is extended or adjusted under 35 U.S.C. 154(b) by 54 days.

(21) Appl. No.: 13/915,222

(22) Filed: Jun. 11, 2013

(65) Prior Publication Data
US 2014/0150656 A1 Jun. 5, 2014

Related U.S. Application Data

(60) Provisional application No. 61/658,205, filed on Jun. 11, 2012, provisional application No. 61/729,139, filed on Nov. 21, 2012, provisional application No. 61/731,227, filed on Nov. 29, 2012, provisional application No. 61/736,213, filed on Dec. 12, 2012, provisional application No. 61/758,035, filed on Jan. 29, 2013, provisional application No. 61/789,357, filed on Mar. 15, 2013.

(51) Int. Cl.
| | | |
|---|---|---|
| B01D 53/22 | (2006.01) | |
| B01D 53/26 | (2006.01) | |
| F28F 1/02 | (2006.01) | |
| B01D 53/18 | (2006.01) | |
| F28F 13/12 | (2006.01) | |
| F28F 21/06 | (2006.01) | |

(Continued)

(52) U.S. Cl.
CPC .............. *B01D 53/263* (2013.01); *B01D 53/18* (2013.01); *B01D 53/265* (2013.01); *B01D 53/268* (2013.01); *F28D 5/00* (2013.01); *F28D 9/005* (2013.01); *F28D 21/0015* (2013.01); *F28F 1/02* (2013.01); *F28F 13/12* (2013.01); *F28F 21/065* (2013.01); *B01D 63/085* (2013.01); *B01D 2053/222* (2013.01); *F24F 3/1417* (2013.01); *F24F 2003/1435* (2013.01)

(58) Field of Classification Search
CPC ........... B01D 2053/222; B01D 63/085; B01D 53/263; B01D 53/265; B01D 53/268; B01D 53/18; F28F 1/02; F28F 13/12; F28F 21/065; F28D 5/00; F28D 9/005; F28D 21/0015
See application file for complete search history.

(56) References Cited

U.S. PATENT DOCUMENTS

| | | |
|---|---|---|
| 1,791,086 A | 2/1931 | Sperr |
| 2,221,787 A | 11/1940 | Downs et al. |

(Continued)

FOREIGN PATENT DOCUMENTS

| | | |
|---|---|---|
| CN | 202229469 U | 5/2012 |
| EP | 1120609 A1 | 8/2001 |

(Continued)

OTHER PUBLICATIONS

International Search Report and Written Opinion for PCT/US2013/045161, dated Feb. 7, 2014. 7 pages.

(Continued)

*Primary Examiner* — Jason M Greene
*Assistant Examiner* — Anthony Shumate
(74) *Attorney, Agent, or Firm* — Rajesh Vallabh; Foley Hoag LLP

(57) ABSTRACT

Disclosed are various turbulent, corrosion-resistant heat exchangers used in desiccant air conditioning systems.

17 Claims, 47 Drawing Sheets

(51) Int. Cl.
   *F28D 5/00*      (2006.01)
   *F28D 9/00*      (2006.01)
   *F28D 21/00*     (2006.01)
   *B01D 63/08*     (2006.01)
   *F24F 3/14*      (2006.01)

(56) References Cited

U.S. PATENT DOCUMENTS

| | | |
|---|---|---|
| 2,235,322 A | 3/1941 | Martin |
| 2,433,741 A | 12/1947 | Crawford |
| 2,988,171 A | 6/1961 | Arnold et al. |
| 3,718,181 A | 2/1973 | Reilly et al. |
| 4,100,331 A | 7/1978 | Fletcher et al. |
| 4,176,523 A | 12/1979 | Rousseau |
| 4,209,368 A | 6/1980 | Coker et al. |
| 4,222,244 A | 9/1980 | Meckler |
| 4,235,221 A | 11/1980 | Murphy |
| 4,239,507 A | 12/1980 | Benoit et al. |
| 4,259,849 A | 4/1981 | Griffiths |
| 4,324,947 A | 4/1982 | Dumbeck |
| 4,429,545 A | 2/1984 | Steinberg |
| 4,435,339 A | 3/1984 | Kragh |
| 4,444,992 A | 4/1984 | Cox, III |
| 4,583,996 A | 4/1986 | Sakata et al. |
| 4,607,132 A | 8/1986 | Jarnagin |
| 4,612,019 A | 9/1986 | Langhorst |
| 4,649,899 A | 3/1987 | Moore |
| 4,703,629 A | 11/1987 | Moore |
| 4,786,301 A | 11/1988 | Rhodes |
| 4,832,115 A | 5/1989 | Albers et al. |
| 4,882,907 A | 11/1989 | Brown, II |
| 4,887,438 A | 12/1989 | Meckler |
| 4,900,448 A | 2/1990 | Bonne et al. |
| 4,910,971 A | 3/1990 | McNab |
| 4,939,906 A | 7/1990 | Spatz et al. |
| 4,941,324 A | 7/1990 | Peterson et al. |
| 4,955,205 A | 9/1990 | Wilkinson |
| 4,979,965 A | 12/1990 | Sannholm |
| 4,987,750 A | 1/1991 | Meckler |
| 5,181,387 A | 1/1993 | Meckler |
| 5,186,903 A | 2/1993 | Cornwell |
| 5,191,771 A | 3/1993 | Meckler |
| 5,221,520 A | 6/1993 | Cornwell |
| 5,351,497 A | 10/1994 | Lowenstein |
| 5,375,429 A | 12/1994 | Tokizaki et al. |
| 5,462,113 A | 10/1995 | Wand |
| 5,528,905 A | 6/1996 | Scarlatti |
| 5,534,186 A | 7/1996 | Walker et al. |
| 5,595,690 A | 1/1997 | Filburn et al. |
| 5,605,628 A | 2/1997 | Davidson et al. |
| 5,638,900 A | 6/1997 | Lowenstein et al. |
| 5,641,337 A * | 6/1997 | Arrowsmith et al. ............. 95/39 |
| 5,661,983 A | 9/1997 | Groten et al. |
| 5,685,152 A | 11/1997 | Sterling |
| 5,797,272 A | 8/1998 | James |
| 5,832,993 A | 11/1998 | Ohata et al. |
| 5,860,284 A | 1/1999 | Goland et al. |
| 5,860,285 A | 1/1999 | Tulpule |
| 5,928,808 A | 7/1999 | Eshraghi |
| 5,933,702 A | 8/1999 | Goswami |
| 6,018,954 A | 2/2000 | Assaf |
| 6,103,969 A | 8/2000 | Bussey |
| 6,156,102 A | 12/2000 | Conrad et al. |
| 6,171,374 B1 | 1/2001 | Barton et al. |
| 6,216,483 B1 | 4/2001 | Potnis et al. |
| 6,244,062 B1 | 6/2001 | Prado |
| 6,247,604 B1 | 6/2001 | Taskis et al. |
| 6,266,975 B1 | 7/2001 | Assaf |
| 6,417,423 B1 | 7/2002 | Koper et al. |
| 6,442,951 B1 | 9/2002 | Maeda et al. |
| 6,463,750 B2 | 10/2002 | Assaf |
| 6,487,872 B1 | 12/2002 | Forkosh et al. |
| 6,488,900 B1 | 12/2002 | Call et al. |
| 6,497,107 B2 | 12/2002 | Maisotsenko et al. |
| 6,497,749 B2 | 12/2002 | Kesten et al. |
| 6,502,807 B1 | 1/2003 | Assaf et al. |
| 6,514,321 B1 | 2/2003 | Lehto et al. |
| 6,539,731 B2 | 4/2003 | Kesten et al. |
| 6,546,746 B2 | 4/2003 | Forkosh et al. |
| 6,660,069 B2 * | 12/2003 | Sato et al. ............................ 96/4 |
| 6,684,649 B1 | 2/2004 | Thompson |
| 6,739,142 B2 | 5/2004 | Korin |
| 6,745,826 B2 | 6/2004 | Lowenstein et al. |
| 6,766,817 B2 | 7/2004 | da Silva et al. |
| 6,854,278 B2 | 2/2005 | Maisotsenko et al. |
| 6,918,404 B2 | 7/2005 | Dias da Silva et al. |
| 6,938,434 B1 | 9/2005 | Fair |
| 6,976,365 B2 | 12/2005 | Forkosh et al. |
| 6,986,428 B2 | 1/2006 | Hester et al. |
| 7,066,586 B2 | 6/2006 | da Silva et al. |
| RE39,288 E | 9/2006 | Assaf |
| 7,143,597 B2 | 12/2006 | Hyland et al. |
| 7,191,821 B2 | 3/2007 | Gronwall et al. |
| 7,197,887 B2 | 4/2007 | Maisotsenko et al. |
| 7,269,966 B2 | 9/2007 | Lowenstein et al. |
| 7,279,215 B2 | 10/2007 | Hester et al. |
| 7,306,650 B2 | 12/2007 | Slayzak et al. |
| 7,337,615 B2 | 3/2008 | Reidy |
| 7,430,878 B2 | 10/2008 | Assaf |
| 7,758,671 B2 | 7/2010 | Kesten et al. |
| 7,938,888 B2 | 5/2011 | Assaf |
| 8,337,590 B2 | 12/2012 | Herencia et al. |
| 8,353,175 B2 | 1/2013 | Wohlert |
| 8,496,732 B2 * | 7/2013 | Culp et al. ........................ 95/52 |
| 8,500,960 B2 * | 8/2013 | Ehrenberg et al. ............ 202/168 |
| 8,623,210 B2 * | 1/2014 | Manabe et al. ......... 210/321.75 |
| 8,641,806 B2 * | 2/2014 | Claridge et al. .................... 96/9 |
| 8,695,363 B2 | 4/2014 | Tang et al. |
| 8,696,805 B2 | 4/2014 | Chang et al. |
| 8,769,971 B2 | 7/2014 | Kozubal et al. |
| 8,790,454 B2 | 7/2014 | Lee et al. |
| 8,800,308 B2 | 8/2014 | Vandermeulen et al. |
| 8,876,943 B2 * | 11/2014 | Gottlieb et al. .................... 95/46 |
| 8,968,945 B2 * | 3/2015 | Fasold et al. .................. 429/413 |
| 2001/0015500 A1 | 8/2001 | Shimanuki et al. |
| 2002/0026797 A1 | 3/2002 | Sundhar |
| 2002/0098395 A1 | 7/2002 | Shimanuki et al. |
| 2002/0104439 A1 | 8/2002 | Komkova et al. |
| 2002/0139245 A1 | 10/2002 | Kesten et al. |
| 2002/0139320 A1 | 10/2002 | Shimanuki et al. |
| 2002/0148602 A1 | 10/2002 | Nakamura |
| 2003/0000230 A1 | 1/2003 | Kopko |
| 2003/0029185 A1 | 2/2003 | Kopko |
| 2003/0051498 A1 | 3/2003 | Sanford |
| 2003/0106680 A1 | 6/2003 | Serpico et al. |
| 2003/0230092 A1 | 12/2003 | Lowenstein et al. |
| 2004/0061245 A1 | 4/2004 | Maisotsenko et al. |
| 2004/0109798 A1 * | 6/2004 | Chopard et al. ............. 422/198 |
| 2004/0134212 A1 | 7/2004 | Lee et al. |
| 2004/0168462 A1 | 9/2004 | Assaf |
| 2004/0194944 A1 | 10/2004 | Hendricks et al. |
| 2004/0211207 A1 | 10/2004 | Forkosh et al. |
| 2004/0231512 A1 | 11/2004 | Slayzak et al. |
| 2005/0109052 A1 | 5/2005 | Albers et al. |
| 2005/0133082 A1 | 6/2005 | Konold et al. |
| 2005/0210907 A1 | 9/2005 | Gillan et al. |
| 2005/0218535 A1 | 10/2005 | Maisotsenko et al. |
| 2005/0257551 A1 | 11/2005 | Landry |
| 2006/0042295 A1 | 3/2006 | Assaf |
| 2006/0278089 A1 * | 12/2006 | Theilow .......................... 96/290 |
| 2007/0175234 A1 | 8/2007 | Pruitt |
| 2007/0234743 A1 | 10/2007 | Assaf |
| 2008/0127965 A1 | 6/2008 | Burton |
| 2008/0156471 A1 | 7/2008 | Han et al. |
| 2008/0196758 A1 | 8/2008 | McGuire |
| 2008/0302357 A1 | 12/2008 | DeNault |
| 2009/0000732 A1 * | 1/2009 | Jacobine et al. ............ 156/273.5 |
| 2010/0000247 A1 | 1/2010 | Bhatti et al. |
| 2010/0051083 A1 | 3/2010 | Boyk |
| 2010/0084120 A1 | 4/2010 | Yin et al. |
| 2010/0170776 A1 * | 7/2010 | Ehrenberg et al. ............ 202/168 |
| 2010/0319370 A1 | 12/2010 | Kozubal et al. |
| 2011/0126885 A1 | 6/2011 | Kokotov et al. |
| 2012/0118148 A1 * | 5/2012 | Culp et al. ........................ 95/52 |

(56) References Cited

U.S. PATENT DOCUMENTS

| | | | |
|---|---|---|---|
| 2012/0118155 | A1* | 5/2012 | Claridge et al. .................... 96/9 |
| 2012/0125020 | A1 | 5/2012 | Vandermeulen et al. |
| 2012/0132513 | A1 | 5/2012 | Vandermeulen et al. |
| 2012/0152318 | A1 | 6/2012 | Kee |
| 2013/0056177 | A1 | 3/2013 | Coutu et al. |
| 2013/0101909 | A1* | 4/2013 | Fasold et al. ................. 429/413 |
| 2013/0186121 | A1 | 7/2013 | Erb et al. |
| 2013/0199220 | A1 | 8/2013 | Ma et al. |
| 2013/0227982 | A1 | 9/2013 | Forkosh |
| 2013/0255287 | A1 | 10/2013 | Forkosh |
| 2014/0054004 | A1 | 2/2014 | LePoudre et al. |
| 2014/0054013 | A1 | 2/2014 | LePoudre et al. |
| 2014/0223947 | A1 | 8/2014 | Ranjan et al. |
| 2014/0260367 | A1 | 9/2014 | Coutu et al. |
| 2014/0260369 | A1 | 9/2014 | LePoudre |
| 2014/0260398 | A1 | 9/2014 | Kozubal et al. |
| 2014/0262125 | A1 | 9/2014 | Erb et al. |
| 2014/0262144 | A1 | 9/2014 | Erb et al. |
| 2014/0264968 | A1 | 9/2014 | Erb et al. |
| 2014/0360373 | A1 | 12/2014 | Peacos et al. |

FOREIGN PATENT DOCUMENTS

| | | | |
|---|---|---|---|
| EP | 1563229 | A1 | 8/2005 |
| EP | 1781995 | A1 | 5/2007 |
| EP | 2256434 | A2 | 12/2010 |
| EP | 2306100 | A1 | 4/2011 |
| JP | 02306067 | A | 12/1990 |
| JP | H08-105669 | A | 4/1996 |
| JP | H11-351700 | A | 12/1999 |
| JP | 2002206834 | A | 7/2002 |
| JP | 2006-263508 | A | 10/2006 |
| JP | 2006-529022 | A | 12/2006 |
| JP | 04273555 | B2 | 6/2009 |
| JP | 2009-293831 | A | 12/2009 |
| JP | 2010-247022 | A | 11/2010 |
| KR | 20040026242 | A | 3/2004 |
| KR | 10-0510774 | B1 | 8/2005 |
| WO | 9922180 | A1 | 5/1999 |
| WO | 0011426 | A1 | 3/2000 |
| WO | 0055546 | A1 | 9/2000 |
| WO | 03004937 | A1 | 1/2003 |
| WO | 2004046618 | A1 | 6/2004 |
| WO | 2006006177 | A1 | 1/2006 |
| WO | 2008-037079 | A1 | 4/2008 |
| WO | 2009094032 | A1 | 7/2009 |
| WO | 2009144880 | A1 | 12/2009 |
| WO | 2011062808 | A1 | 5/2011 |
| WO | 2011161547 | A2 | 12/2011 |
| WO | 2012082093 | A1 | 6/2012 |

OTHER PUBLICATIONS

1-Open Absorption System for Cooling and Air Conditioning using Membrane Contactors—Annual Report 2005, Publication No. Publication 260097, Project: 101310—Open Absorption System for Cooling and Air Conditioning using Membrane Contactors, Date of publication: Jan. 31, 2006, Author: Manuel Conde-Petit, Robert Weber, Contractor: M. Conde Engineering, 8 pages.

2-Open Absorption System for Cooling and Air Conditioning using Membrane Contactors—Annual, Report 2006, Publication No. Publication 260098, Project: 101310—Open Absorption System for Cooling and Air Conditioning using Membrane Contactors, Date of publication: Nov. 14, 2006, Author: Manuel Conde-Petit, Robert Weber, Contractor: M. Conde Engineering, 13 pages.

3-Open Absorption System for Cooling and Air Conditioning using Membrane Contactors—Final Report, Publication No. Publication 280139, Project: 101310—Open Absorption System for Cooling and Air Conditioning using Membrane Contactors, Date of publication: Jul. 8, 2008, Author: Viktor Dorer, Manuel Conde-Petit, Robert Weber, Contractor: M. Conde Engineering, 50 pages.

4-Conde-Petit, M. 2007. Liquid Desiccant-Based Air-Conditioning Systems—LDACS, Proc. of the 1st European Conference on Polygeneration—Technologies and Applications, 217-234, A. Coronas, ed., Tarragona—Spain, Oct. 16-17, Published by CREVER—Universitat Rovira I Virgili, Tarragona, Spain, 18 pages.

5-Conde-Petit, M. 2008. Open Absorption Systems for Air-Conditioning using Membrane Contactors,Proceedings '15. Schweizerisches Status-Seminar <<Energie- und Umweltforschung im Bauwesen>>', Sep. 11-12—ETH Zurich, Switzerland. Published by BRENET—Eggwilstr. 16a, CH-9552 Bronschhofen—Switzerland (brenet@vogel-tech.ch), 12 pages.

6-Third Party Observations for PCT/US2011/037936, dated Sep. 24, 2012, 6 pages.

Beccali, et al., "Energy and Economic Assessment of Desiccant Cooling," Solar Energy, Issue 83, pp. 1828-1846, Aug. 2009.

Fimbres-Weihs, et al., "Review of 3D CFD modeling of flow and mass transfer in narrow spacer-filled channels in membrane modules," Chemical Engineering and Processing 49 (2010) pp. 759-781.

Li, F., et al., "Novel spacers for mass transfer enhancement in membrane separations," Journal of Membrane Science, 253 (2005), pp. 1-12.

Li, Y., et al., "CFD simulation of fluid flow through spacer-filled membrane module: selecting suitable cell types for periodic boundary conditions," Desalination 233 (2008) pp. 351-358.

Lowenstein, "A Solar Liquid-Desiccant Air Conditioner," Solar 2003, Proceedings of the 32nd ASES Annual Conference, Austin, TX, Jul. 2003, 7 pages.

Liu, et al., "Research Progress in Liquid Desiccant Air Conditioning Devices and Systems," Frontiers of Energy and Power Engineering in China, vol. 4, Issue 1, pp. 55-65, Feb. 2010.

Mathioulakis, "Desalination by Using Alternative Energy," Desalination, Issue 203, pp. 346-365, 2007.

Russell, et al., "Optimization of Photovolatic Thermal Collector Heat Pump Systems," ISES International Solar Energy Conference, Atlanta, GA, vol. 3, pp. 1870-1874, May 1979.

Welty, "Liquid Desiccant Dehumidification," Engineered Systems, May 2010, vol. 27 Issue 5, p. 34, 5 pages.

Ashrae, et al., "Desiccant Dehumidification and Pressue Drying Equipment," 2012 ASHRAE Handbook—HVAC Systems and Equipment, Chapter 24, pp. 24.1-24.12.

* cited by examiner

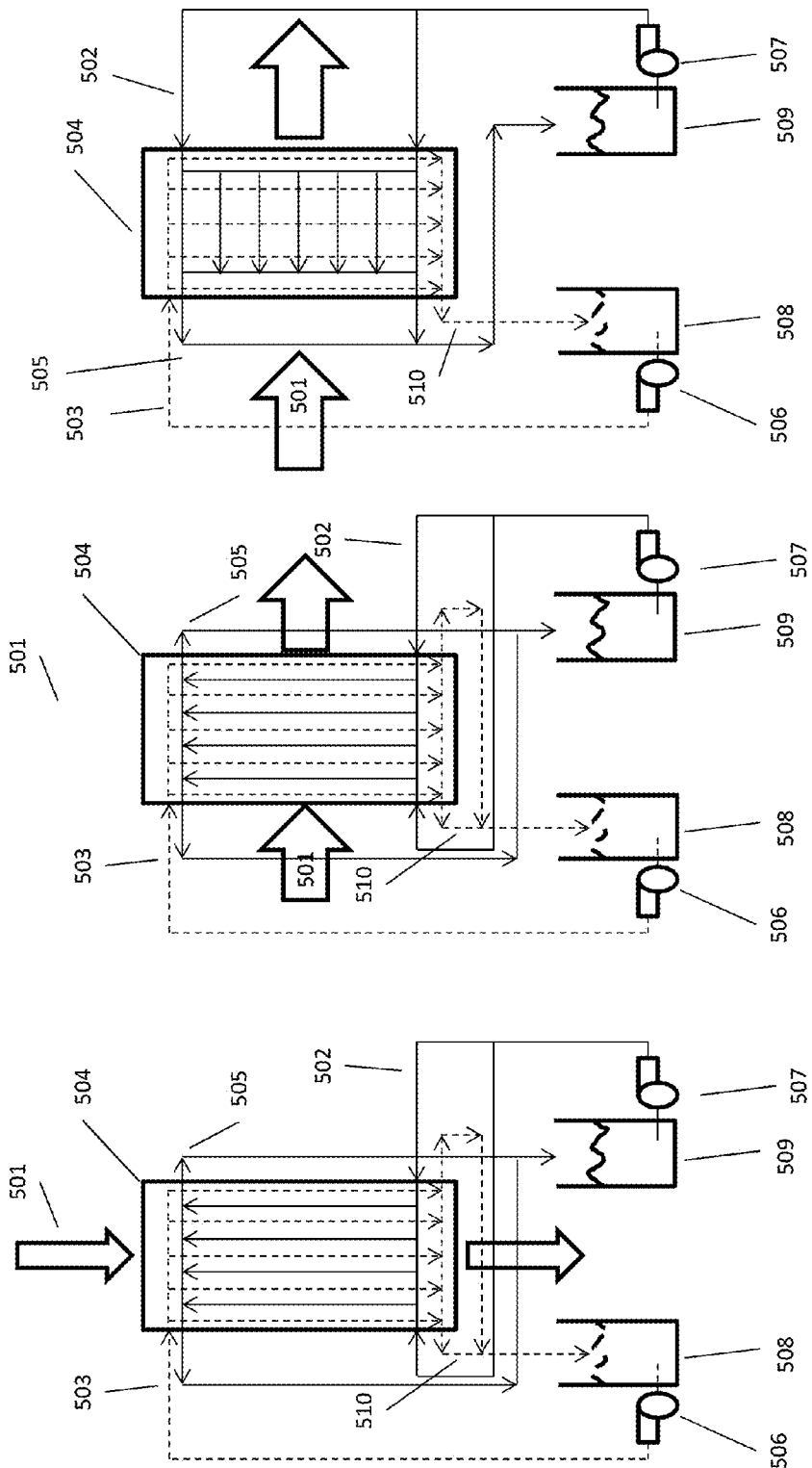

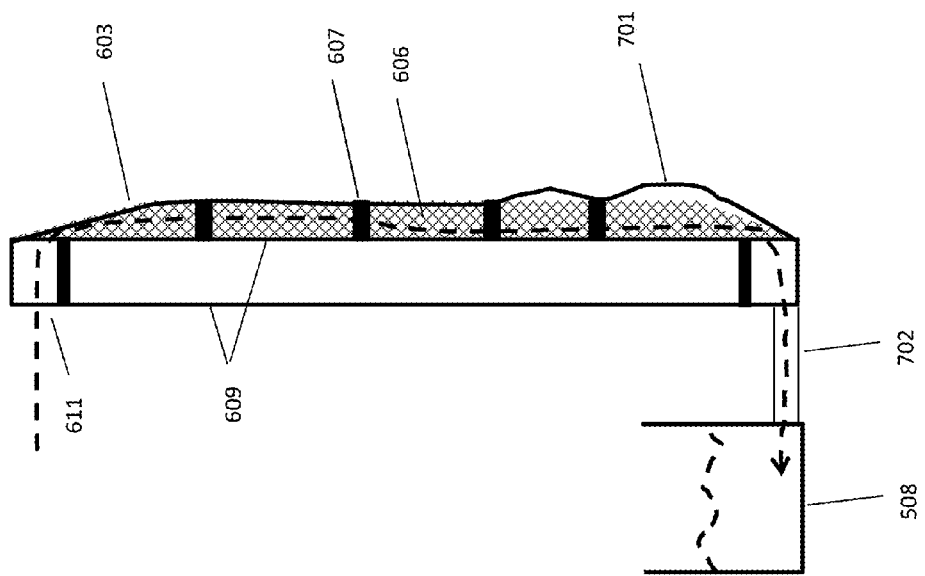
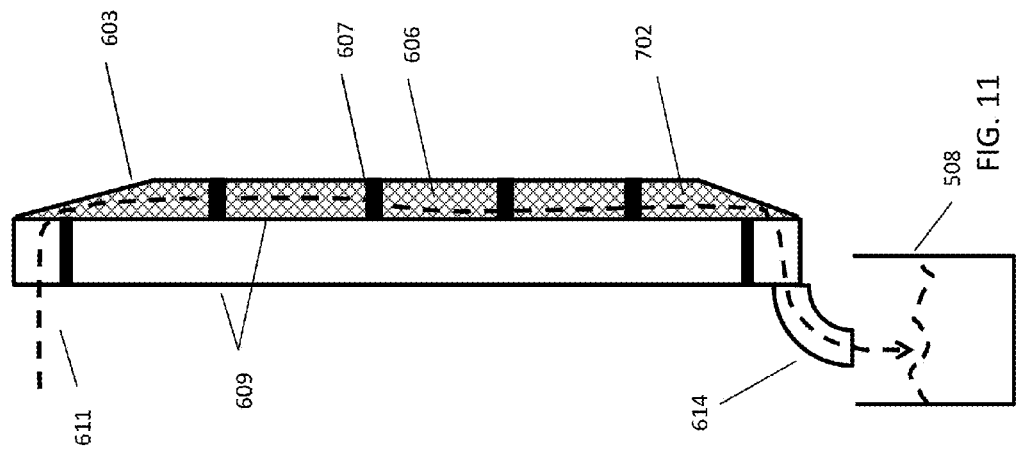

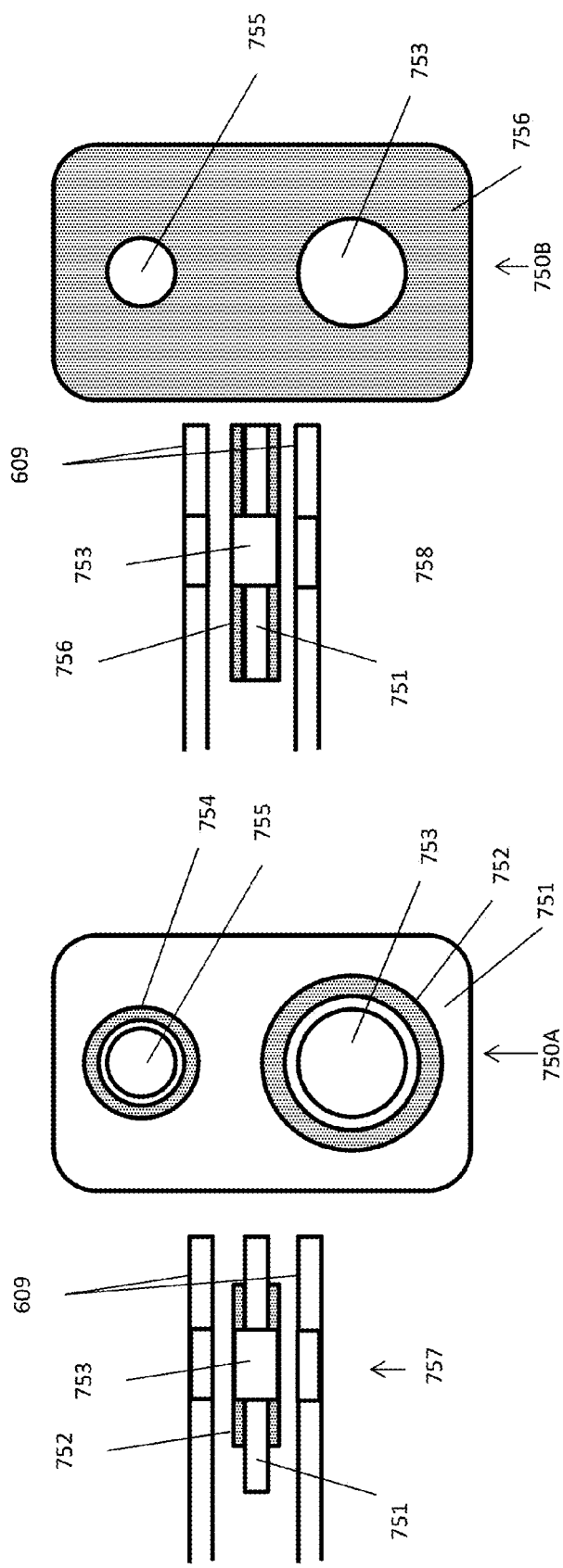

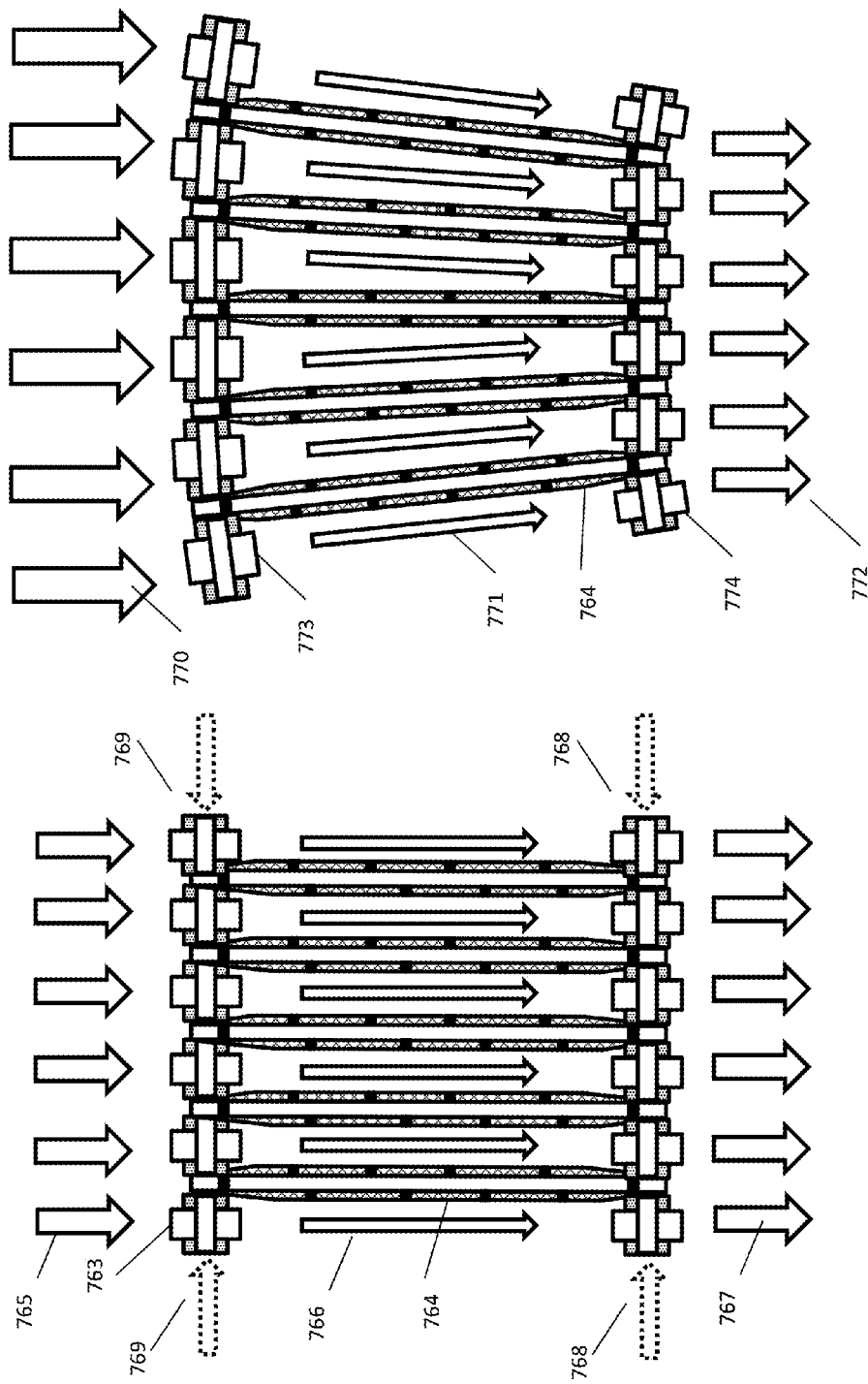

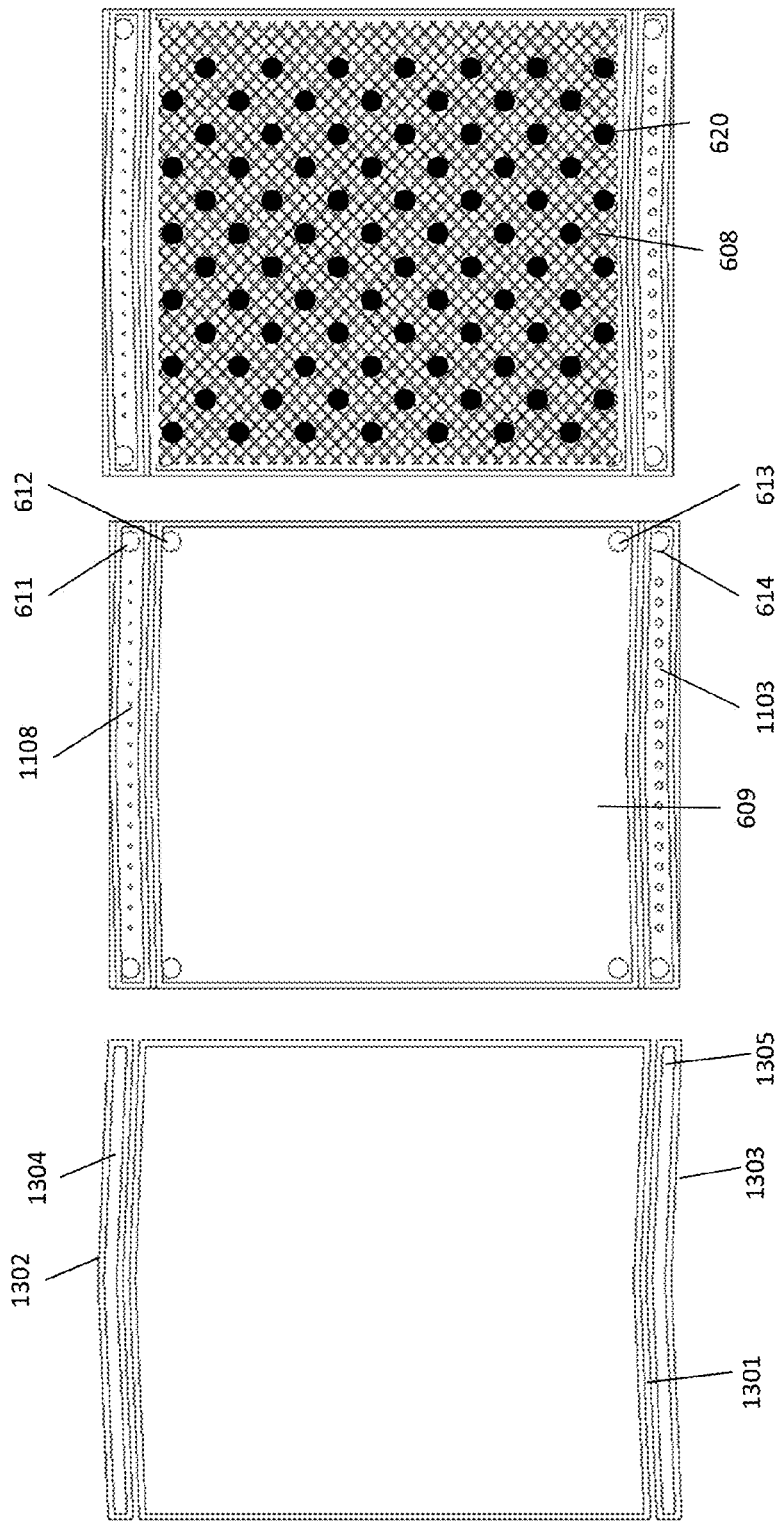

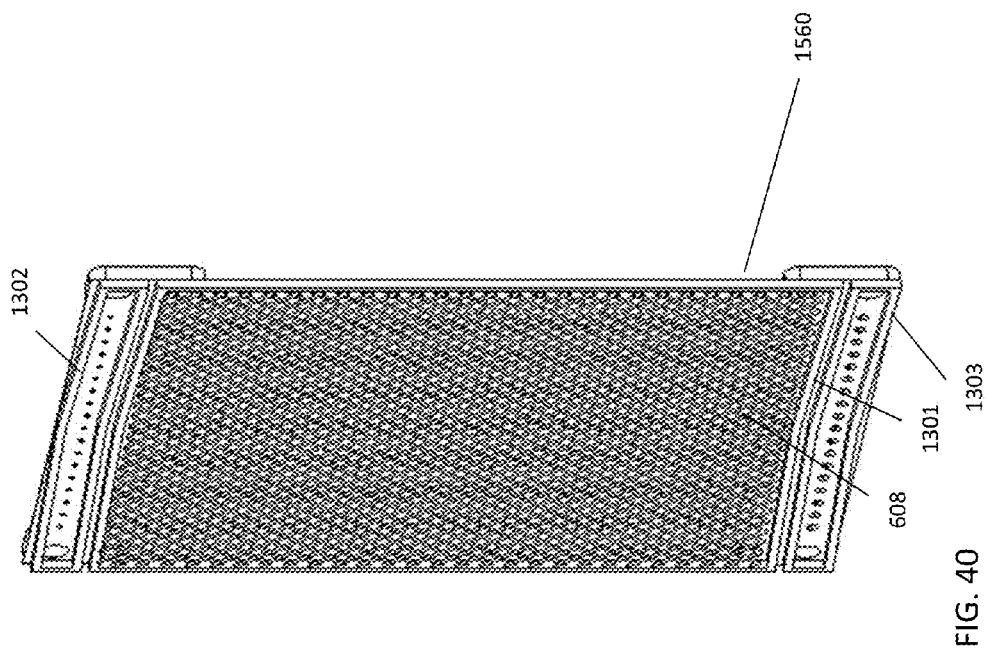
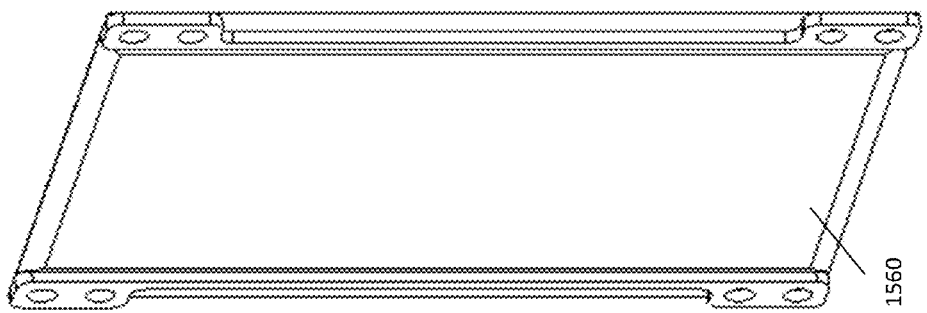
FIG. 40

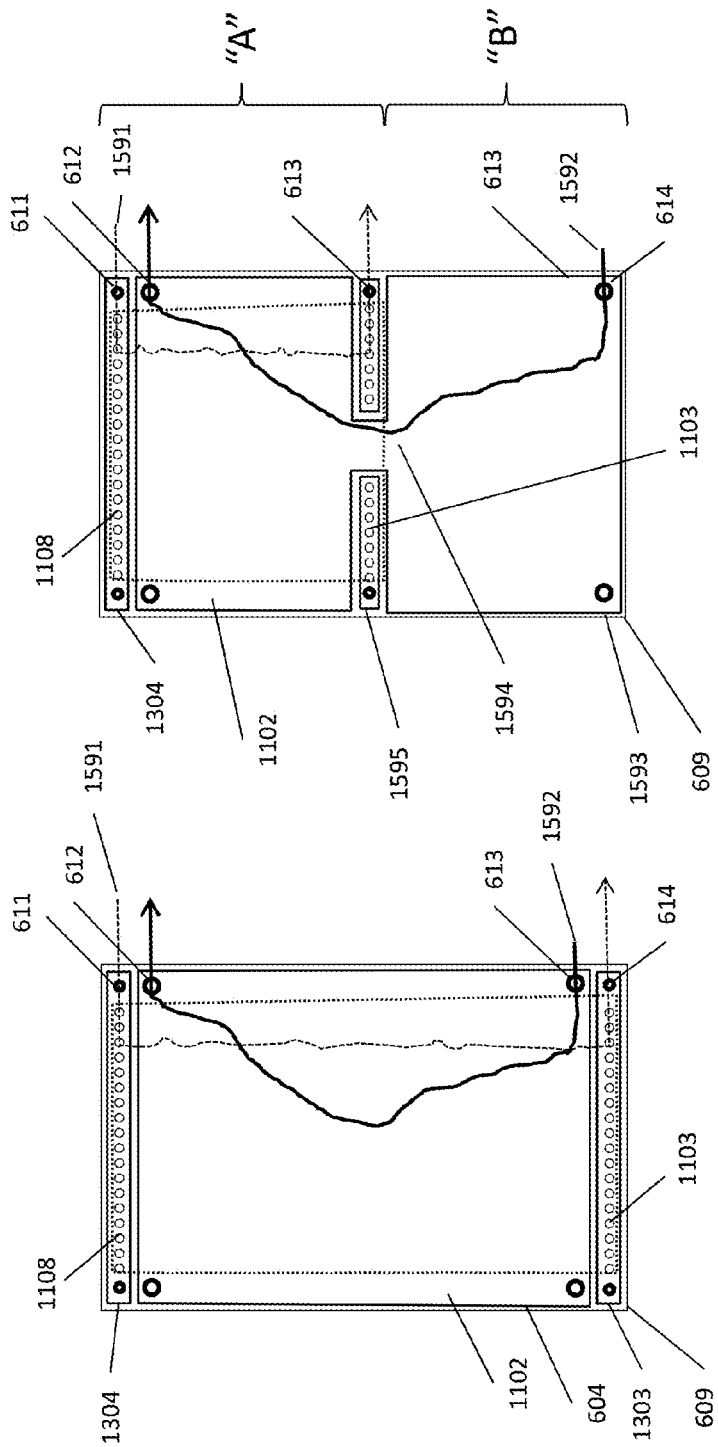

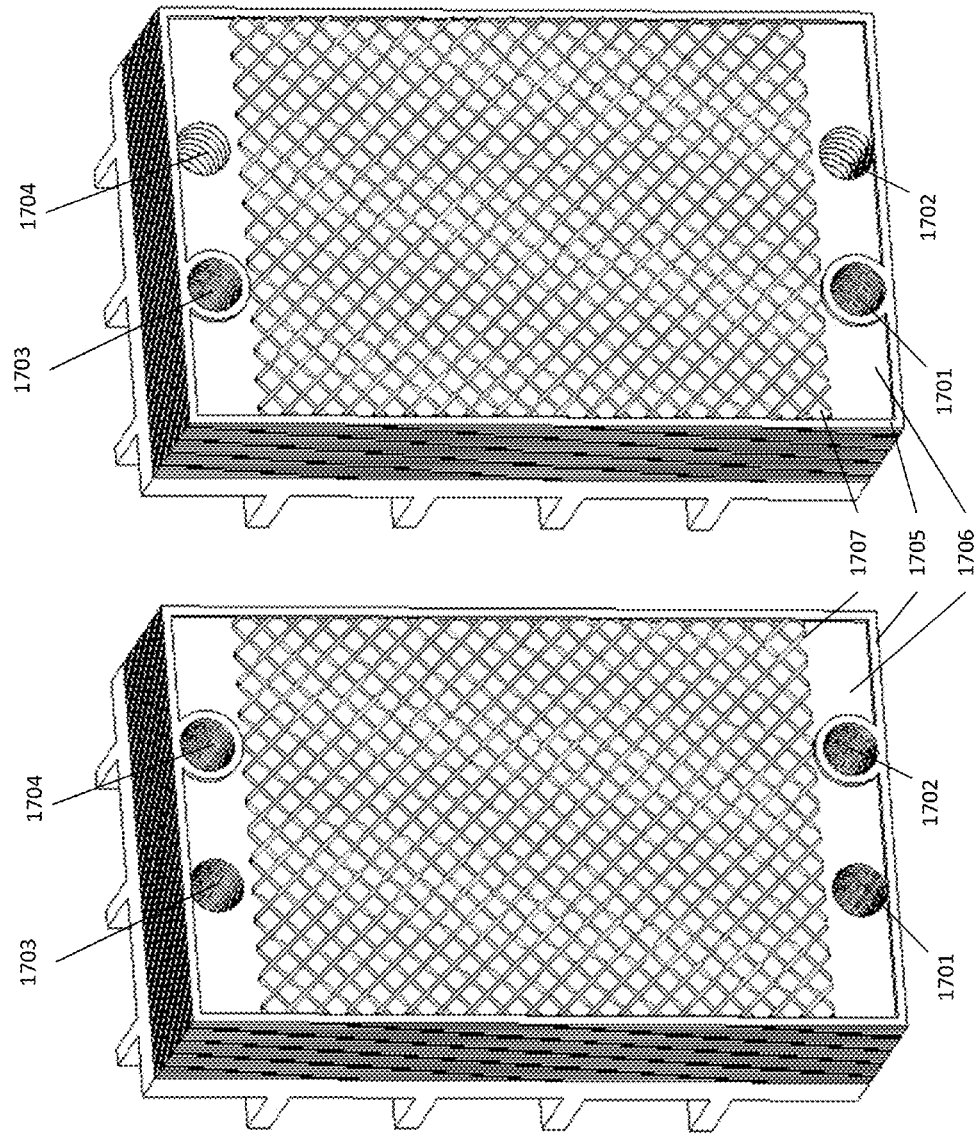

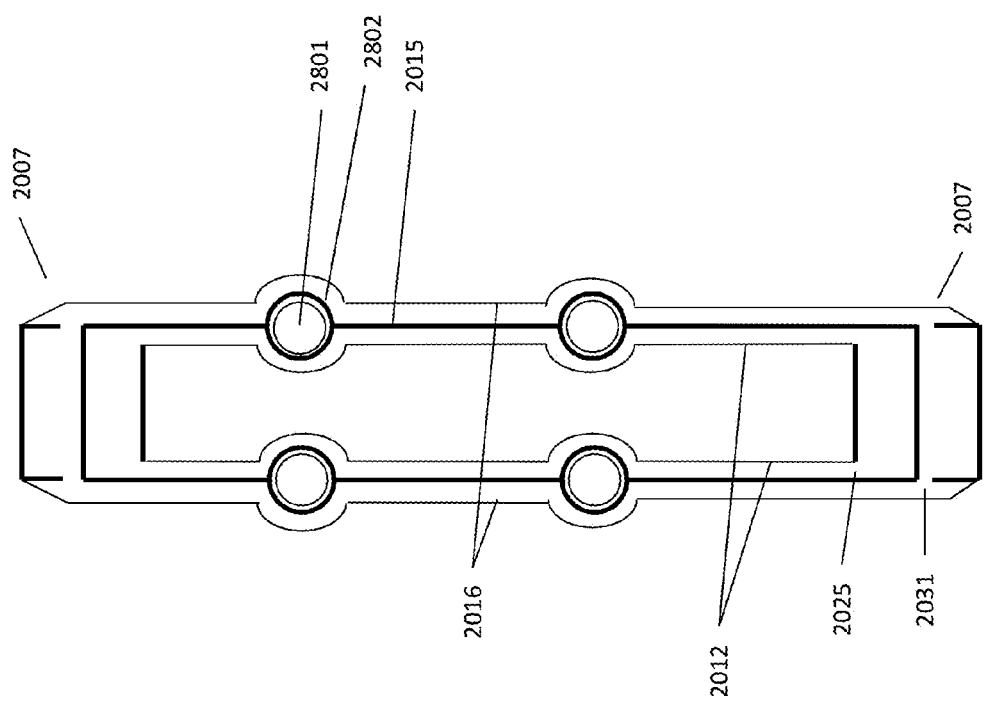

METHODS AND SYSTEMS FOR TURBULENT, CORROSION RESISTANT HEAT EXCHANGERS

CROSS-REFERENCE TO RELATED APPLICATIONS

This application claims priority from the following applications: (1) U.S. Provisional Patent Application No. 61/658,205 filed on Jun. 11, 2012 entitled METHODS AND SYSTEMS FOR TURBULENT, CORROSION RESISTANT HEAT EXCHANGERS; (2) U.S. Provisional Patent Application No. 61/729,139 filed on Nov. 21, 2012 entitled METHODS AND SYSTEMS FOR TURBULENT, CORROSION RESISTANT HEAT EXCHANGERS; (3) U.S. Provisional Patent Application No. 61/731,227 filed on Nov. 29, 2012 entitled METHODS AND SYSTEMS FOR TURBULENT, CORROSION RESISTANT HEAT EXCHANGERS; (4) U.S. Provisional Patent Application No. 61/736,213 filed on Dec. 12, 2012 entitled METHODS AND SYSTEMS FOR TURBULENT, CORROSION RESISTANT HEAT EXCHANGERS; (5) U.S. Provisional Patent Application No. 61/758,035 filed on Jan. 29, 2013 entitled METHODS AND SYSTEMS FOR TURBULENT, CORROSION RESISTANT HEAT EXCHANGERS; and (6) U.S. Provisional Patent Application No. 61/789,357 filed on Mar. 15, 2013 entitled METHODS AND SYSTEMS FOR TURBULENT, CORROSION RESISTANT HEAT EXCHANGERS, each of which is hereby incorporated by reference.

BACKGROUND

The present application relates generally to the use of liquid desiccants to dehumidify and cool (and in some cases humidify and heat) an air stream entering a space. More specifically, the application relates to the use of micro-porous and other membranes to separate the liquid desiccant from the air stream wherein the fluid streams (air, cooling or heating fluids, and liquid desiccants) are made to flow turbulently so that high heat and moisture transfer rates between the fluids can occur. The application further relates to corrosion resistant heat exchangers between two or three fluids. Such heat exchangers can use gravity induced pressures (siphoning) to keep the micro-porous membranes properly attached to the heat exchanger structure.

Liquid desiccants have been used in parallel to conventional vapor compression HVAC equipment to help reduce humidity in spaces, particularly in spaces that either require large amounts of outdoor air or that have large humidity loads inside the building space itself. Humid climates, such as for example Miami, Fla. require a large amount of energy to properly treat (dehumidify and cool) the fresh air that is required for a space's occupant comfort. Conventional vapor compression systems have only a limited ability to dehumidify and tend to overcool the air, oftentimes requiring energy intensive reheat systems, which significantly increase the overall energy costs because reheat adds an additional heat-load to the cooling coil. Liquid desiccant systems have been used for many years and are generally quite efficient at removing moisture from the air stream. However, liquid desiccant systems generally use concentrated salt solutions such as solutions of LiCl, LiBr or $CaCl_2$ and water. Such brines are strongly corrosive, even in small quantities so numerous attempt have been made over the years to prevent desiccant carry-over to the air stream that is to be treated. One approach—generally categorized as closed desiccant systems—is commonly used in equipment dubbed absorption chillers, places the brine in a vacuum vessel, which then contains the desiccant and since the air is not directly exposed to the desiccant; such systems do not have any risk of carry-over of desiccant particles to the supply air stream. Absorption chillers however tend to be expensive both in terms of first cost and maintenance costs. Open desiccant systems allow direct contact between the air stream and the desiccant, generally by flowing the desiccant over a packed bed similar to those used in cooling towers. Such packed bed systems suffer from other disadvantages besides still having a carry-over risk: the high resistance of the packed bed to the air stream results in larger fan power and pressure drops across the packed bed, requiring thus more energy. Furthermore, the dehumidification process is adiabatic, since the heat of condensation that is released during the absorption of water vapor into the desiccant has no place to go. As a result, both the desiccant and the air stream are heated by the release of the heat of condensation. This results in a warm, dry air stream where a cool dry air stream was required, necessitating the need for a post-dehumidification cooling coil. Warmer desiccant is also exponentially less effective at absorbing water vapor, which forces the system to supply much larger quantities of desiccant to the packed bed, which in turn requires larger desiccant pump power since the desiccant is doing double duty as a desiccant as well as a heat transfer fluid. The larger desiccant flooding rate also results in an increased risk of desiccant carryover. Generally, air flow rates need to be kept well below the turbulent region (at Reynolds numbers of less than ~2,400) to prevent carryover.

Membrane modules often suffer from problems wherein glue or adhesion layers are stressed by temperature differences across the various components. This is particularly difficult in components that are operating under high temperatures such as liquid desiccant regenerators. In order to inhibit cracking of the plastics or failures of the bonds or adhesives, a 2-part plate structure is disclosed that has a first part made from a harder plastic (such as, e.g., ABS (Acrylonitrile butadiene styrene)) and a second part made from a compliant material (such as, e.g., EPDM (ethylene propylene diene monomer) rubber or Polyurethane). One advantage of this structure is that the compliant material easily absorbs the differences in expansion coefficients, while still providing for fluid passages and other features such as edge seals for air passages and turbulating features for those same air passages.

There thus remains a need for a system that provides a cost efficient, manufacturable and thermally efficient method to capture moisture from an air stream, while simultaneously cooling such an air stream and while also eliminating the risk of contaminating such an air stream.

Heat exchangers (mostly for 2 fluids) are very commonly used in many applications for heat transfer and energy recovery. Most heat exchangers are constructed out of metals such as copper, stainless steel and aluminum. Generally speaking such heat exchangers incorporate feature that attempt at disturbing the fluid flows in order to enhance the heat transfer between the fluid and the metal surfaces. Boundary layers on the surface of the metals create larger resistances to heat transfer. In quite a few applications, one or both of the fluids can be corrosive to the commonly used metals. Surface coatings can help prevent corrosion, but tend to also have decreased heat transfer. Metals that are not sensitive to corrosion such as Titanium, are generally considered expensive to use and difficult to work with. Plastics can be used but they oftentimes cannot withstand the operating pressures and temperatures that are typically used for the fluids. There thus remains a need for a cost-effective, corrosion resistant liquid to liquid heat exchanger.

SUMMARY

Provided herein are methods and systems used for the efficient dehumidification of an air stream using a liquid desiccant. In accordance with one or more embodiments the liquid desiccant is running down the face of a support plate as a falling film. In accordance with one or more embodiments, the liquid desiccant is covered by a microporous membrane so that liquid desiccant is unable to enter the air stream, but water vapor in the air stream is able to be absorbed into the liquid desiccant. In some embodiments, the air stream contains a turbulator: a material or feature that induces turbulence in the air flow so that the air does not become laminar over the surface of the desiccant. In some embodiments, the turbulator is a plastic netting material. In some embodiments, the turbulator is a series of plastic wires that span across the air flow. In some embodiments, the membrane is a bi-axially stretched polypropylene membrane. In some embodiments, the liquid desiccant is running through a wicking material such as a fabric or a thin screen material, wherein the fabric or screen material sets a fixed distance between the support plate and membrane. In some embodiments, the screen material or fabric provides a mixing or turbulence to the desiccant so that fresh desiccant is brought close to the membrane and spent desiccant is removed from the surface near the membrane. In some embodiments, the membrane is bonded through the screen or wicking material onto a support plate. In some embodiments, the support plate is a somewhat thermally conductive rigid plastic such as a fiberglass reinforced plastic. In some embodiments, the support plate is cooled on the opposite side by a cooling fluid. In some embodiments, the cooling fluid is water or a water/glycol mixture. In some embodiments, the cooling fluid is running through a plastic mesh wherein the plastic mesh sets the distance between the support plate and a second support plate and wherein the cooling fluid is made to become turbulent by the mesh. In some embodiments, the mesh is a dual plane diamond plastic mesh. In some embodiments, the second support plate is bonded to the first support plate by a series of adhesive dots so that the plates do not bulge out due to the cooling fluid pressure. In some embodiments, the support plates are formed so that similar features of the diamond mesh are formed directly into the support plate. In some embodiments, the support plate is joined to a second support plate wherein both plates contain features that achieve the functions of the diamond mesh: setting a fixed distance between the two support plates and creating a turbulent mixing cooling fluid flow. In some embodiments, the features of the wicking material or screen material on the desiccant side are also incorporated into the support plates. In some embodiments, the glue dots on either or both the desiccant or cooling fluid side are replaced by thermal bonding, ultrasonic bonding, or some other bonding method to connect to a membrane or to a second support plate. In some embodiments, the support plate itself contains an adhesive in the plastic that is activate by some process, either by heat, or ultrasonic sound or microwaves or some other suitable method.

In some embodiments, the diamond mesh comprises a co-extruded plastic and an adhesive. In some embodiments, the plastic is coated with an adhesive in a separate process step. In some embodiments, the second support plate provides a second screen and mesh and faces a second air gap containing a second air turbulator. In some embodiments, a so constructed membrane plate assembly is provided with multiple liquid supply- and drain ports so that uniform liquid distribution is achieved across the surfaces of the membrane and support plates. In some embodiments, the ports are reconfigurable so that the air can be directed in either a horizontal or vertical fashion across the membranes. In some embodiments, the air turbulator is constructed so that it is effective for either horizontal or vertical air flow. In some embodiments, the liquid ports can be configured so that the cooling fluid is always flowing against the direction of the air flow so that a counter-flow heat exchange function is obtained. In some embodiments, the drain ports to the plate are constructed in such a way as to provide a siphoning of the leaving liquids thereby creating a negative pressure between the support plates with respect to atmospheric pressure and a negative pressure between the support plate and the membrane ensuring that the membrane stays flat against the screening material or wicking fabric. In some embodiments, the main seals in between the support plates are constructed so as to provide a self-draining function so no liquids stay inside the membrane plate system. In some embodiments, such self-draining seals create separate areas for the liquid desiccants and for the cooling fluids so that a leak in one of the seals will not affect the other fluid. In other embodiments the support plate is only partially covered by a membrane, thereby providing an additional area for sensible only cooling. In some embodiments the partially covered support plates encounter a vertical air flow and an also vertical heat transfer fluid flow directed in a direction opposite or counter to the air flow. In some embodiments the partially covered support plate supports a horizontal air flow and an also horizontal heat transfer fluid flow directed primarily in a direction counter to the air flow. In some embodiments the glue dots are minimized to take advantage of the siphoning of the liquids leaving the channels of the plate thereby maximizing the available membrane area.

Systems and methods are provided wherein the membrane plate assemblies described in the previous section are connected by a pliable spacer. In some embodiments, the spacer is made from a rubber material such as EPDM. In some embodiments, the spacer has annular seals providing separation between the liquids and sealing the spacer to the surface of the support plate. In some embodiments, the spacer is fully coated with an adhesive. In some embodiments, the spacer also contains features to support the air netting turbulator. In some embodiments, the spacer contains features that keep the air turbulator under tension. In some embodiments, the spacer is shaped so that it also provides a wall to channel the air stream in a proper direction. In some embodiments, the rubber material is over-molded on the support plate. In some embodiments, the spacer and the air netting turbulator form a single manufactured component. In some embodiments, the air netting and spacer are separate components. In some embodiments, the air netting turbulator contains support structures designed to hold a membrane in a fixed location. In some embodiments, the air netting turbulator, membranes and support plates, with or without cooling fluid centers are stacked wherein the spacer and support netting eliminate the need for adhesives. In some embodiments, the plates, support structures and spacers are made from flexible materials so that the structures can be rolled into a cylindrical shape. In some embodiments a force is applied to the compliant spaces to adjust and air gap between membrane plates. In some embodiments the force is applied in a larger amount near one end of the membrane plate and a smaller amount near the opposite end of a membrane plate, resulting in an air gap that is smaller on one end as it is on the opposite end. In some embodiments the variable air gap is matched to the shrinkage or expansion of air in the channel. In some embodiments the variable air gap is dynamically adjusted to optimize between membrane efficiency and air pressure drop in the channel. In some embodiments the spacers are made to be wider on one side of a membrane module and narrower on the opposite side of the membrane module. In some embodiments the air gaps are so adjusted to match the expansion or contraction of the air in between the membrane plates.

In some embodiments, a series of so constructed plates and spacers as discussed above are placed in a block. In some embodiments, the block contains a larger series of plates. In some embodiments, the block can be reconfigured so that the air stream enters from either a vertical aspect or a horizontal aspect into the plates. In some embodiments, the ports in the block can be reconfigured so that the cooling fluid is always directed against the flow of the air stream. In some embodiments, the cooling fluid is replaced by a heating fluid. In some embodiments, the heating fluid is used to evaporate water vapor from the desiccant into the air stream through the membrane rather than absorbing water vapor into the desiccant when the fluid is cool.

In accordance with one or more embodiments, air treatment modules are disclosed comprising alternating rigid and flexible materials. In some embodiments, the rigid element uses a liquid distribution header at the top of the module and a similar liquid distribution header at the bottom of the module, connected by two support plates. In some embodiments, the headers are split to supply two fluids to a series of membranes. In some embodiments, one set of membranes receives fluids from one portion of the top header, while a second set of membranes receives fluids from a second portion of the header. In some embodiments, the headers are made with a flexible material such as, e.g., EPDM rubber, while the support plates are made with a more rigid material such as, e.g., ABS or PET. In some embodiments, the support plates are doped with fire retarding additives or thermally conductive additives. In some embodiments, the support plates have holes for fluid supply and fluid drain incorporated in them. In some embodiments, the support plates have a series of membranes attached over them. In some embodiments, the membranes are connected to the support plate using an adhesive. In some embodiments, the adhesive is contained in a screen material that also provides turbulent mixing of the liquid. In some embodiments, the adhesive is connected through a thin screen material that provides turbulent mixing of the fluid. In some embodiments, the turbulating features are integrated into the support plate. In some embodiments, the support plates have turbulating features on either side of them. In some embodiments the screen material is formed in such a way as to provide a surface turbulence in the air stream. In some embodiments the membrane is formed in such a way as to provide turbulence in the air stream. In some embodiments the membrane is adhered over the features in the screen material so that the combination creates turbulence in the air stream. In some embodiments the support plate has added features that create ridges over which the screen material and membranes are formed to create turbulence in the air stream. In some embodiments, the air gaps between the support plates are filled with a flexible structural material to support the membranes. In some embodiments, the flexible structural material provides an edge seal for the air gaps. In some embodiments, the flexible structural material provides turbulence to the air stream. In some embodiments the turbulating feature is located on the surface of the membranes. In some embodiments the turbulating feature is located in the middle of the air gap. In some embodiments, the flexible structural material provides liquid passages to the supply liquids or drain liquids from the membranes. In some embodiments the turbulator has walls that are sloped at an angle to the air stream. In some embodiments the turbulator walls that are alternatingly sloped at opposite angles to the air stream. In some embodiments the turbulator walls get smaller in the downstream direction. In some embodiments the turbulator has a secondary structure that contains walls that are directing the air stream back towards the opposite direction from the primary wall structure in such a way that a rotation in the air stream is enhanced. In some embodiments the combination of primary and secondary walls results in a counter-rotating air stream down an air channel.

Methods and systems are also provided wherein several 2-part rigid and flexible membrane plate components are stacked to obtain a membrane air treatment module. In some embodiments, such an air treatment module receives a primary air flow in a primarily vertical orientation and a secondary air flow in a primarily horizontal orientation. In some embodiments, the vertical air flow is exposed to one set of membranes, whereas the horizontal air flow is exposed to a second set of membranes. In some embodiments, the one or both sets of membranes are replaced with a flocking, fabric, netting or other hydrophilic material on the surface of the membrane support plate. In some embodiments, the primary air flow is exposed to one fluid through one set of the membranes, and the secondary air flow is exposed to a second fluid through the other set of membranes. In some embodiments, the first fluid is a desiccant solution such as LiCl and water, $CaCl_2$ and water or other suitable liquid desiccant. In some embodiments, the second fluid is water or seawater or waste water or other inexpensive water source. In some embodiments, the fluids are the same. In some embodiments, the primary and secondary air channels are both oriented to be generally horizontal. In some embodiments, both the channels expose air to the same liquid behind a series of membranes.

In some embodiments, the primary air channel is generally horizontal wherein the air is exposed to a liquid desiccant and wherein a portion of the thus treated is diverted to the secondary channel wherein the treated air is mixed with a secondary air stream and exposed to a different liquid such as water. In some embodiments, the water is replaced with seawater or wastewater. In some embodiments, the diverted air flow is adjustable to that the amount of diverted air can be varied. In some embodiments, the diverted air flow is adjustable to vary the mixture ratio between the diverted air and the secondary air stream. In some embodiments the diverted air flow is directed to near the rear entry of the primary air flow channels where the effect of the dried primary air has a larger cooling effect in the secondary air stream than if the air flow was directed to near the rear exit of the primary air flow channels.

Methods and systems are provided wherein two fluids exchange heat between them through a series of parallel plates. In some embodiments, the fluids are corrosive fluids. In some embodiments, the fluids function as desiccants. In some embodiments, the desiccants contain LiCl, $CaCl_2$, $Ca(NO_3)_2$, LiBr and water or other salt solutions. In some embodiments, one liquid is hot and the other liquid is cold. In some embodiments, the parallel plate structure comprises plates with an adhesive edge seal. In some embodiments, the plates are made of a plastic material. In some embodiments, the plastic material is a fiberglass reinforced plastic, or Poly-Ethylene-Terephthalate (PET) or other plastic material. In some embodiments, the plate material is a sheet of corrosion resistant material such as Titanium. In some embodiments, the plate material is a thermally doped engineering plastic. In some embodiments, the dopants are ceramics such as disclosed in U.S. Patent Application Publication No. 2012/0125581. In some embodiments, the space between the plates is filled with a dual planar diamond extruded mesh. In some embodiments, the mesh provides a fixed distance between the plates while allowing for passage of the fluids. In some embodiments, the mesh creates turbulence in the fluids. In some embodiments, the mesh comprises a co-extruded plastic and an adhesive. In some embodiments, the plastic is coated with an adhesive in a separate process step. In some embodiments, the adhesive comprises adhesive dots that reach though the mesh between two sheets of plate material. In some embodiments, the seals between the parallel plates are made out of an adhesive. In some embodiments, the adhesive is a 3M 550 or 5200 adhesive or a similar polyurethane adhesive. In some embodiments, the seals are shaped so as to create opposing flow profiles between opposing plates.

Membrane modules often suffer from problems wherein glue or adhesion layers are stressed by temperature differences across the various components. This is particularly difficult in components used for the regeneration of the desiccant, since many common plastics have high thermal expansion coefficients. Oftentimes specialty high-temperature plastics are employed that are expensive to use in manufacturing. Bonding large surface areas together also creates problems with the adhesion and can cause stress fractures over time. Potting techniques (typically a liquid poured plastic) have some resilience if the potting material remains somewhat compliant even after curing. However the systems and methods described herein are significantly more resistant to expansion caused by high temperatures, which keeping the manufacturing process simple and robust.

Furthermore, a problem when building conditioner and regenerator systems for 2-way liquid desiccants is that it is hard to design a system that provides uniform desiccant distribution on both sides of a thin sheet of plastic support material. The systems and methods described herein show a simple method for exposing an air stream to a series of membranes covering the desiccant.

Methods and systems are provided herein wherein a 2-way membrane module utilizes a set of refrigerant lines to actively cool a desiccant flowing behind a series of membranes. Flowing a desiccant directly over metal tubes such as copper refrigerant lines is problematic since the desiccants (typically Halide salts) are highly corrosive to most metals. Titanium is a possible exception but is cost prohibitive to employ. Rather than using Titanium piping, systems and methods described herein show a plastic support sheet that is wrapped around copper refrigerant lines thereby achieving direct cooling of the desiccant rather than using an indirect evaporative channel for cooling of the desiccant. In some embodiments, the refrigerant is running in copper tubing. In some embodiments the copper tubing is wrapped by a plastic support sheet. In some embodiments the plastic support sheet forms the support structure for a membrane, which in turn contains a desiccant fluid.

In no way is the description of the applications intended to limit the disclosure to these applications. Many construction variations can be envisioned to combine the various elements mentioned above each with its own advantages and disadvantages. The present disclosure in no way is limited to a particular set or combination of such elements.

BRIEF DESCRIPTION OF THE FIGURES

FIG. 7 shows a schematic flow diagram of the 3-way heat exchanger of FIG. 4 wherein the fluids are collected through a gravity drain circulation system.

FIG. 8 shows a schematic flow diagram of the 3-way heat exchanger of FIG. 5 wherein the fluids are collected through a gravity drain circulation system.

FIG. 9 shows a schematic flow diagram of the 3-way heat exchanger of FIG. 6 wherein the fluids are collected through a gravity drain circulation system.

FIG. 11 demonstrates a siphoning drain for the 3-way heat exchanger plate of FIG. 10 which allows the membranes to stay flat against the support structure. One of the membranes has been removed for purposes of illustration.

FIG. 12 illustrates a non-siphoning drain for the same 3-way heat exchanger but shows that the membrane bulges into the air gap. One of the membranes has been removed for purposes of illustration.

FIG. 14 shows a spacer that is used between two membrane plates of FIG. 600 with individual fluid seals for desiccant and cooling fluid.

FIG. 15 illustrates a spacer that is used between two membrane plates of FIG. 10 with a full seal encompassing both the desiccant and cooling fluid.

FIG. 18 shows an embodiment of a set of spacers of FIG. 14 used to connect a set of membrane plates as were shown in FIG. 10, wherein the spacers are of equal thickness creating uniform channel widths between the membrane plates.

FIG. 19 shows an embodiment of a set of spacers of FIG. 14 used to connect a set of membrane plates as were shown in FIG. 10, wherein the spacers are of unequal thickness creating varying channel widths between the membrane plates.

FIG. 29 shows an alternate construction of the seal wherein the desiccant and cooling fluids are in separate seal areas and wherein the seal is shaped in such a way as to be self-draining.

FIG. 30 shows the seal of FIG. 29 mounted against a thermally conductive cover plate with drain- and supply-holes for the fluids.

FIG. 31 shows the assembly of FIG. 30 with a turbulating mesh and adhesive dots installed in the middle of the cooling fluid area.

FIG. 40 illustrates how two half-plates are adhered to form a single membrane plate in accordance with one or more embodiments.

FIG. 52 shows an arrangement of seals for the liquid desiccant, membrane and cooling fluids of FIG. 10.

FIG. 53 shows an alternate arrangement of seals wherein the desiccant runs behind a membrane in zone "A" and the zone "B" only provides sensible cooling.

FIG. 56 shows a cut-away detail of the 2 way heat exchanger at an odd level intersection.

FIG. 57 shows a cut-away detail of the 2 way heat exchanger at an even level intersection.

FIG. 80 illustrates the air treatment module of FIG. 2000 wherein the support plate has been modified to accommodate a set of refrigerant lines flowing inside the support plate so that direct cooling of the desiccant is provided.

DETAILED DESCRIPTION OF PREFERRED EMBODIMENTS

Figure 1:
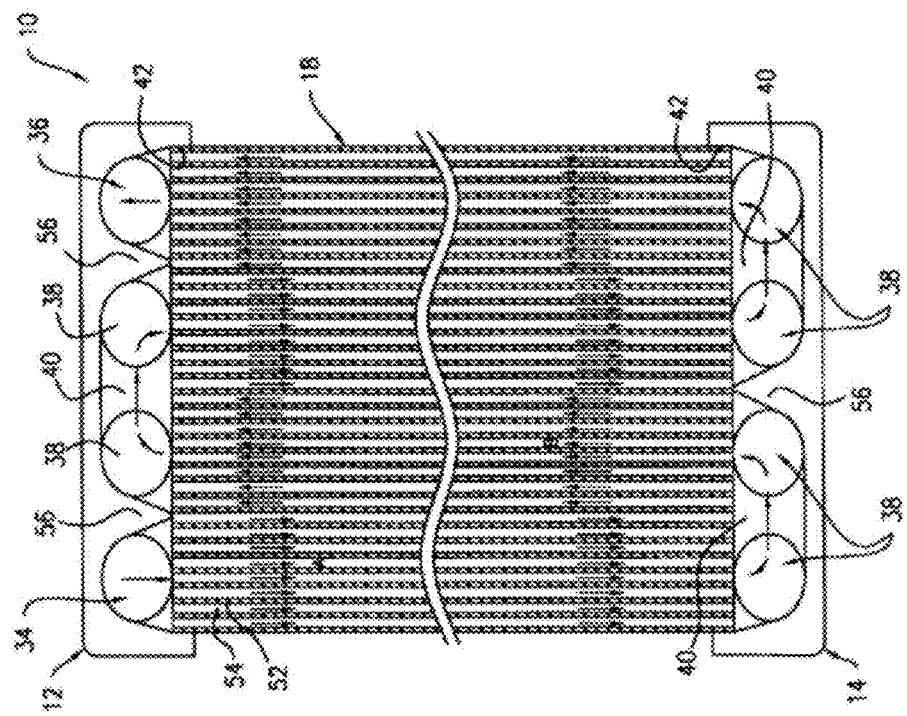
FIG. 1 illustrates a prior art 3-way, cross-flow heat exchanger that employs a double U-shaped cooling liquid path, a falling film desiccant flow (downward) and a horizontal air flow.

FIG. 1 depicts a 3-way heat exchanger in the prior art wherein air enters a stack of vertical plates. The vertical plates have provisions for a cooling fluid 38 and are coated with a flocking material. A liquid desiccant is applied to the flocking material that slowly falls down the surface of the plate, while absorbing water vapor from the air stream and conducting heat from the condensation and air into the cooling fluid.

Figure 2:
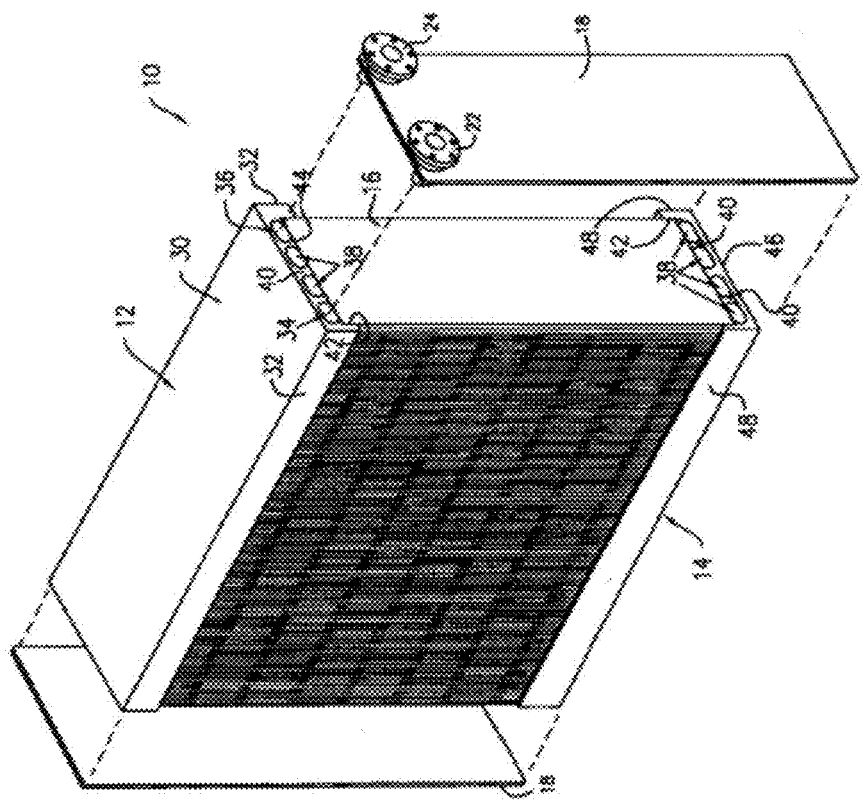
FIG. 2 illustrates a detail of FIG. 1.

FIG. 2 shows a cross section of a plate of FIG. 1 in the prior art wherein the cooling fluid enters at location 34, flows down to the bottom location 38 and back up to the upper location 38. The fluid then flows again to the bottom and back up to the exit port 36. The long, narrow passages in the fluid flow result in laminar fluid flows and, as can be seen in the figure, the air flow entering at 10 is at right angles to the cooling fluid flows.

Figure 3:
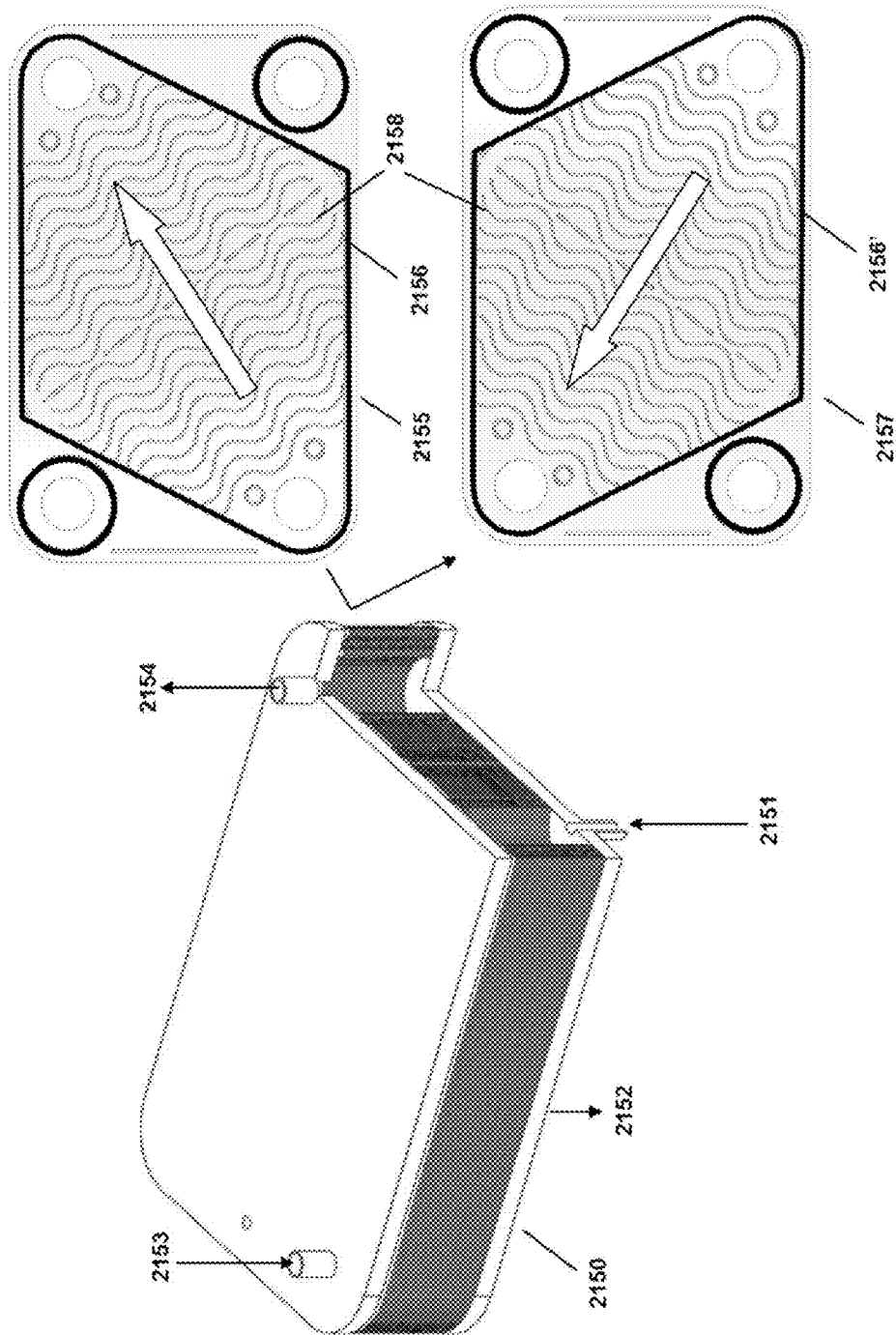
FIG. 3 shows a plastic two-way liquid to liquid heat exchanger as shown in US Patent Application Publication No. 2012/0125581.

FIG. 3 illustrates a 2-way heat exchanger wherein alternating patterns are applied to a series of plates. The patterns are meant to disturb (turbulate) the fluid flows. Oftentimes 2-way heat exchangers are constructed using metals because high pressures and temperatures are common in 2-way heat exchangers. In order to accommodate corrosive fluids, Titanium heat exchangers can be employed, but Titanium is expensive and generally hard to work with (drilling, welding etc.). Plastic heat-exchangers have been build and proposed but can usually not withstand very high pressures or temperatures.

Figure 4:
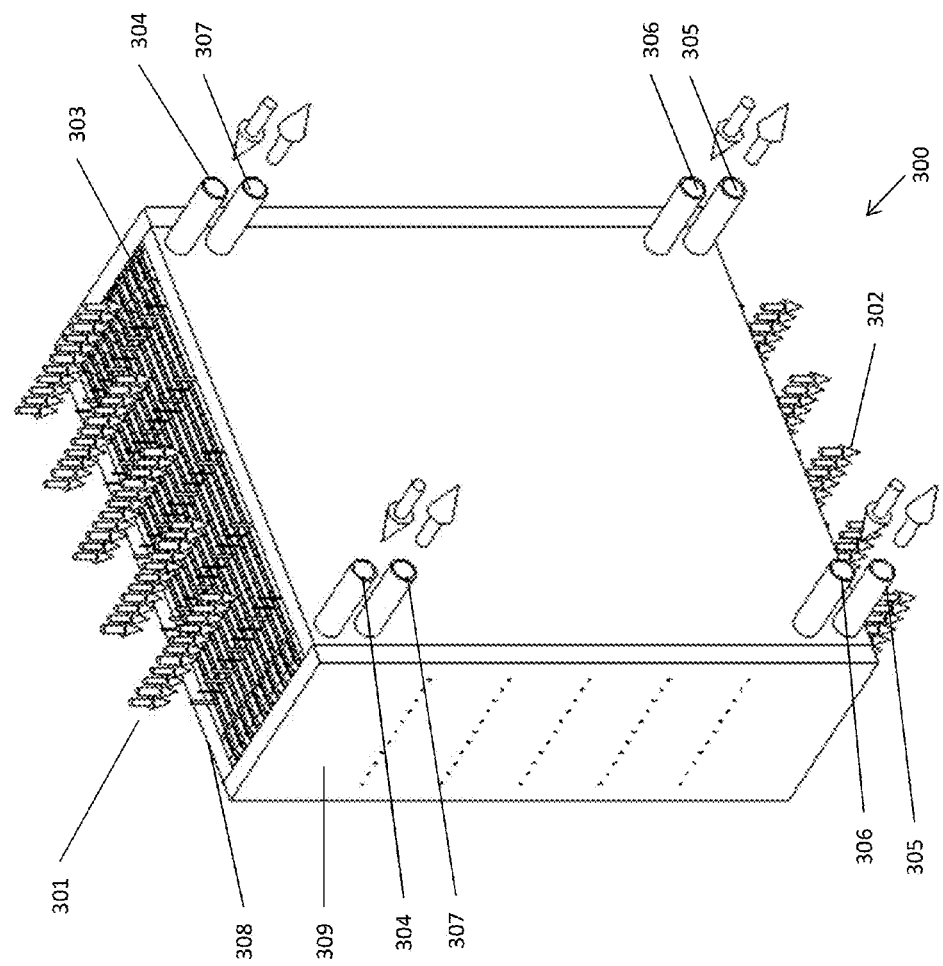
FIG. 4 shows a 3-way reconfigurable counter-flow heat exchanger in accordance with various embodiments set up with vertical air flow (downward), vertical cooling fluid flow (upward) and a vertical falling film desiccant (downward) behind a membrane.

FIG. 4 shows a flexible, completely turbulent flow, corrosion resistant, self-draining, negative pressure, membrane protected, counter-flow 3-way heat exchanger meant for capturing water vapor from and air stream while simultaneously cooling the air stream. The high temperature, high humidity air stream 301 enters a series of membrane plates 303 that cool and dehumidify the air stream. The cool, dry, leaving air 302 is supplied to a space such as for example a space in a building. A desiccant is supplied through supply ports 304. Two ports are provided on each side of the plate block structure 300. The supply ports are spaced apart in such a way as to provide a uniform desiccant film flow across the membrane plates 303. The desiccant film falls through gravity and is collected at the bottom of the plate block 300 and exits through the drain ports 305. A cooling fluid (or heating fluid as the case may be) is supplied through ports 306 at the bottom of the plate block 300. Again, the cooling fluid supply ports are spaced in such a way as to provide uniform cooling fluid flow inside the membrane plates 300. The cooling fluid runs upward inside the membrane plates 303 and leaves the plate block 300 through the ports 307. Front/rear covers 308 and side covers 309 provide structural support and thermal insulation and ensure that air does not leave through the sides of the block.

Figure 5:
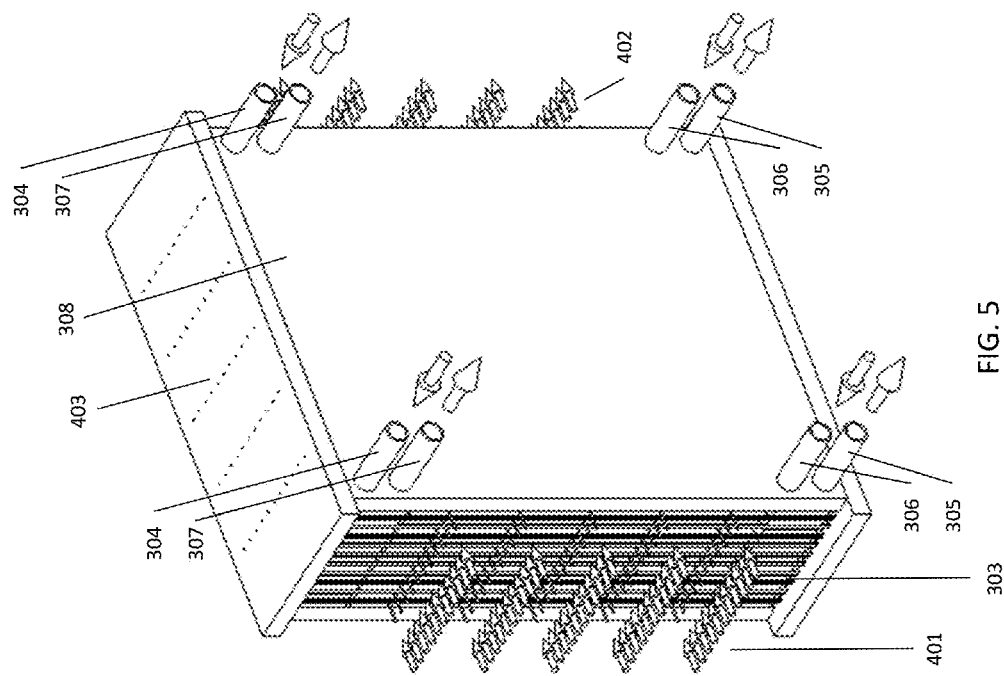
FIG. 5 demonstrates a different configuration of the heat exchanger from FIG. 4 set up as a cross-flow system with horizontal air flow, a vertical cooling fluid flow (upward) and a falling film desiccant (downward) behind a membrane.

FIG. 5 shows the plate block of FIG. 4 reconfigured in such a way the air stream now can enter the block in a horizontal orientation. The air enters at 401 and leaves the block at 402. Top and bottom covers 403 ensure structural support and prevent air from leaking out of the top and bottom of the plate block.

Figure 6:
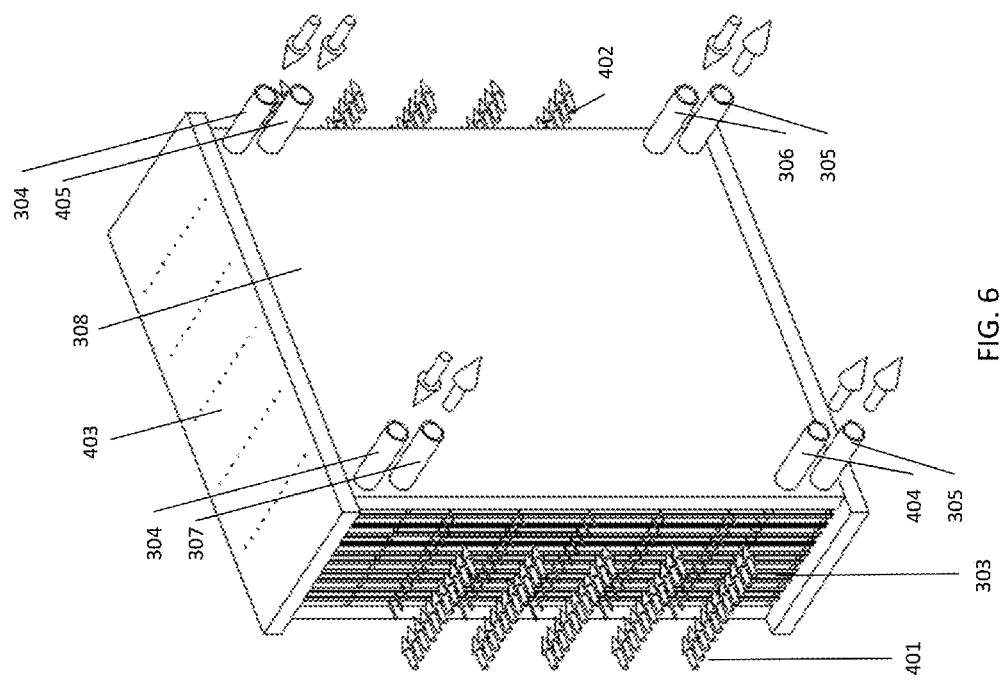
FIG. 6 shows the heat exchanger of FIG. 5 in a counter-flow setup again with horizontal air flow, but with horizontal cooling fluid flow (against the direction of the air flow) and a falling film desiccant (downward) behind a membrane.

FIG. 6 illustrates the plate block of FIG. 5 however the cooling fluid flow has been reconfigured so that the fluid enters on the right hand side of the block at ports 306 on the bottom right and port 405 on the top right. The fluid now leaves the block at ports 307 on the top left and port 404 on the bottom left. As can be seen from the figure, the cooling fluid flows in the opposite direction to the air stream flow, resulting in better heat and moisture transfer between the air and the desiccant and cooling water.

FIG. 7 illustrates a simplified fluid flow diagram corresponding to the plate block configuration of FIG. 4. The air stream flows over the membrane plate surface starting at point 501. The membrane plate 504 is constructed as a hollow structure with fluid passages. The cooling fluid pump 507 pumps fluid 502 into the hollow plate where it is distributed. The fluid then runs upward and leaves at exit port 505. The fluid can enter the plate at more than one port to ensure uniform fluid distribution as is shown in the figure. The drain 505 is constructed in such a way as to create a siphoning effect when the liquid drains out into the tank 509. This results in a slightly negative pressure in the plate structure. The negative pressure helps prevent the plate from bulging out. A typical plate height is 500 to 600 mm, with a typical thickness of 3 mm and a width of 400 to 500 mm. When a plate is filled with water, the hydraulic pressure can push the walls of the plate apart resulting in a narrowing of the air gaps between the plates and at worst a pinching off of the air gap altogether. The siphoning and negative pressure forces the plates inward rather than outward and the air gap is properly maintained.

Similarly the desiccant 503 is pumped by pump 506 to the top of the plate where it runs down as a falling film on the outside surface of the plate. The liquid desiccant is contained to the surface of the plate by a thin, microporous membrane (not shown). The membrane forces the liquid desiccant into a drain channel in the plate, and similar to the cooling fluid, the desiccant drains through a siphoning drain 510 into a desiccant tank 508. The siphoning effect is even more important on the desiccant side of the system, since the membrane is typically very thin (around 20 µm) and thus can bulge into the air gap much more easily.

FIG. 8 illustrates the flow diagram corresponding to the plate block configuration of FIG. 5. The air stream enters at 501 across the plate surface. The flows of the other flows of the cooling fluid and the desiccant are unchanged from the flows in FIG. 7.

The use of dual ports allows one to reconfigure the system of FIG. 8 into the system shown in FIG. 9 and supply cooling fluid to both the top and bottom of the plate, thereby turning the cooling liquid flow into a counter-flow to the air stream and significantly increasing the efficiency of the heat exchanger function of the membrane plate 504. Since building air conditioning systems are built to accommodate a wide variations of buildings and climates is advantageous to be able to flow air out of an air conditioning system in either a horizontal or vertical fashion, without significantly altering the efficiency of the heat exchanger. By being able to alter the flow pattern in the membrane plate, the plate retains optimum efficiency in either air flow orientation.

Figure 10:
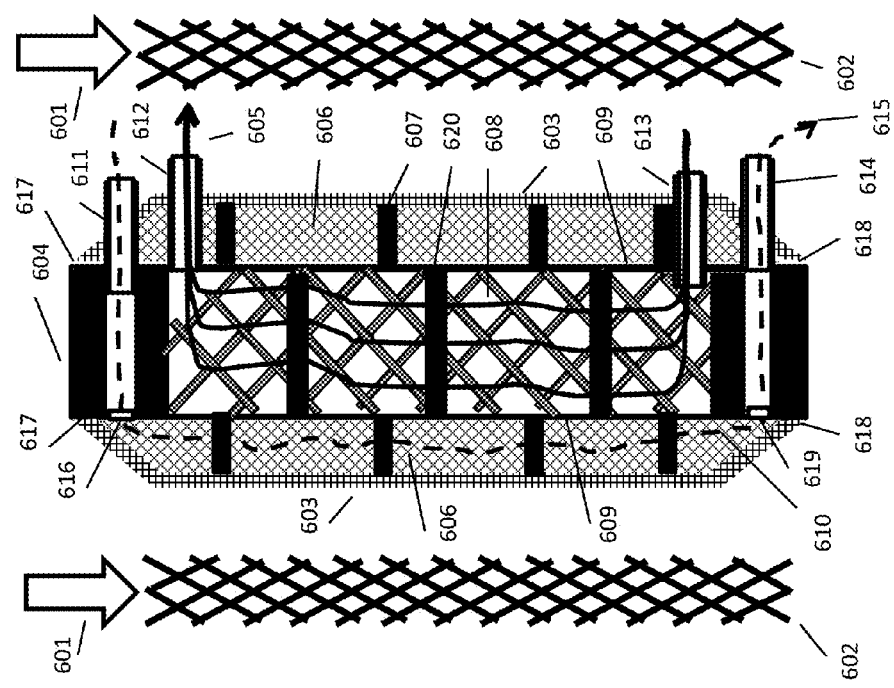
FIG. 10 shows a cross-sectional view of the individual plates that provide 3-way heat exchange between air, desiccant and a cooling fluid, including the materials that create turbulence in the air, desiccant and water channels.

FIG. 10 shows a cross-sectional construction detail of a single membrane plate assembly. Incoming air 601 is directed over two mesh-shaped, air-turbulators 602. The air-turbulators 602 can be constructed of various inexpensive materials such as poly-propylene extruded plastic netting or plastic lines, or other convenient materials. An example of a netting that can function as an air-turbulator is the black poly-propylene OB1200 netting made by Industrial Netting, 7681 Setzler Pkwy N. Minneapolis, Minn. 55445, USA. Since the membrane plates have a membrane 603 helps prevent liquids from entering the air stream, the membrane plates unlike systems without membranes, can accommodate turbulent air flows, since the turbulent flow is not able to knock desiccant into the air stream. The air-turbulator can thus enhance heat and moisture transfer from the airstream into the liquid desiccant without running the risk of desiccant carry-over. The membrane is for example the EZ2090 poly-propylene, microporous membrane manufactured by Celgard, LLC, 13800 South Lakes Drive Charlotte, N.C. 28273. The membrane is approximately 65% open area and has a typical thickness of about 20 µm. This type of membrane is structurally very uniform in pore size and is thin enough to not create a significant thermal barrier. The uniform pore size ensures that there are no areas or spots of liquid desiccant breaking through the membrane. The open area allows for good contact between the air and the desiccant. However, the polypropylene has a very low surface energy making it hard to bond to by conventional adhesives. Heat-bonding is possible but carries risk of damage to the membrane by creating pin-holes. Also the membrane is typically not able to withstand temperatures of much more than 90 C, which means that thermal welding needs to be a well-controlled process. Another option is to bond the membrane 603 bonded by adhesive dots 607 to a thin, thermally conductive plastic sheet 609. The adhesive dots can for example be adhesive 550 or 5200 manufactured by 3M Corp., 3M Center St. Paul, Minn. 55144-1000. These non-solvent based adhesives are able to mechanically "grab" the membrane structure and are thus able to adhere well to both the membrane 603 and the plate structure 609. The adhesive dots 607 are spaced about 2.5 cm apart in a pattern suitable to create good adhesion across the entire face of the plate structure 609. The plate structure 609 comprises a reinforced polymer such as a fiberglass reinforced plastic sheet, PET film or engineered plastic selected for rigidity and inertness to the desiccant solutions. The plate structure 609 is typically a sheet roughly 450 mm wide, 600 mm high and 0.4 mm thick. The plate plastic can be thermally doped to enhance heat transfer between the desiccant 606 and the cooling fluid 608. The adhesive dots 607 are applied through a fine screen material 606. The screen material 606 is for example a thin polypropylene screen XN 4900 manufactured by Industrial Netting, 7681 Setzler Pkwy N. Minneapolis, Minn. 55445, USA. The screen 606 serves two major functions: it turbulates the desiccant 610 as it is flowing down the surface of the support plate 609. It also sets a fixed distance between the support plate 609 and the membrane 603, which results in better desiccant distribution and an even thickness of the desiccant film 610 as it is flowing down the support plate 609. Rather than employing adhesive dots 607, it would be clear to those skilled in the art that other methods of bonding the membrane to the screen 606 and the support plate 609 can be devised, for example by coating the screen 606 with an adhesive or by co-extruding the screen 606 with an adhesive so that the screen 606 already contains an adhesive that can be activated by heat or some other activation mechanism.

Figure 26:
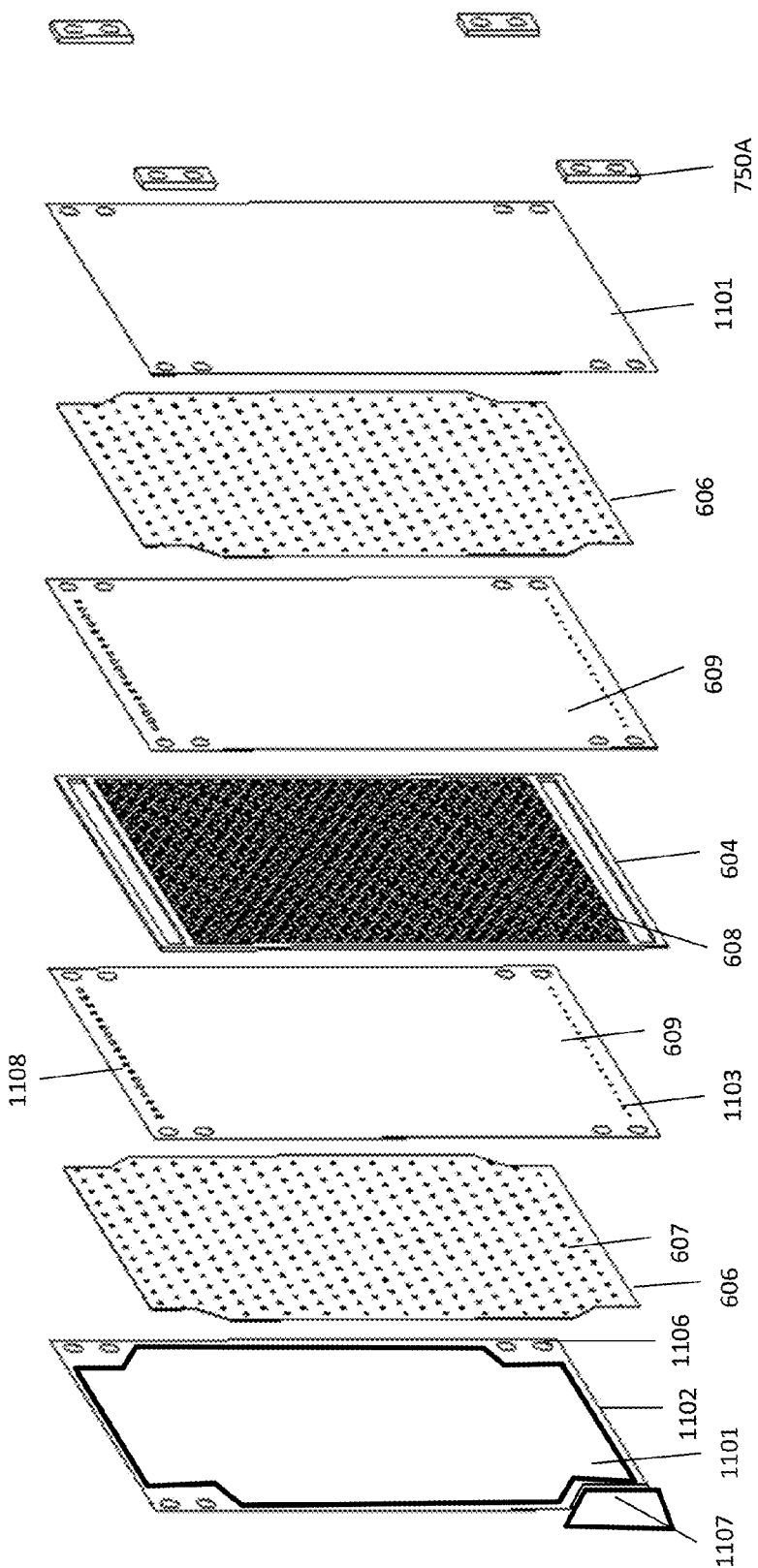
FIG. 26 shows an exploded assembly drawing of a single membrane plate in accordance with one or more embodiments.

The desiccant enters the membrane plate through supply port 611, which is offset horizontally from the membrane area as will be shown in FIG. 26. The desiccant flows through the distribution header 604, which can be manufactured using an adhesive seal or plastic part as will also be shown in FIG. 26. The distribution header 604 has a series of small approximately 0.5 mm holes 616, which ensure a generally even desiccant film distribution on the top of the support plate 609. The desiccant then proceeds to flow turbulently through the screen 606. The membrane is adhered to the support plate through the adhesive dots 607 as well as adhered with an edge seal 617. The edge seal can either be made with an adhesive such as 3M 550 or 5200 mentioned earlier or with a high-temperature capable double sided adhesive tape such as 3M™ Adhesive Transfer Tape 950 3M Id: 70-0060-3055-8 as manufactured by 3M Corp. In either case, the desiccant reaches the bottom of the support plate, and the bottom seal forces the desiccant into the support plate drain holes 619. The desiccant then proceeds to the drain port 614, where a siphoning drain 615 collects the desiccant into a tank (not shown).

A cooling fluid enters the cooling supply port 613. The cooling fluid enters a hollow area between the two support plates 609. The hollow area measures approximately 550 mm×430 mm×2.5 mm thick. The hollow area is completely separated from the desiccant area by the seals 604. The hollow area is also filled by a cooling-fluid turbulator 608. This turbulator 608 can comprise a coarse diamond shaped screen such as the XN 4700 diamond mesh manufactured by Industrial Netting, 7681 Setzler Pkwy N. Minneapolis, Minn. 55445, USA. The diamond mesh is a two-planar material that serves two functions: it sets the distance between the two support plates 609 to a precisely controlled and uniform distance. It also creates turbulence or stirring in the cooling fluid as it flows through the hollow area, thereby efficiently absorbing heat from the support plates 609. The 2-planar diamond mesh has the advantage that it contains enough variation in the wire thicknesses that it does not significantly obstruct liquid flow. The diamond structure also distributes the cooling fluid evenly in the hollow area with no inactive flow areas that can result in uneven cooling performance of the membrane plate structure. Finally the support plates 609 are connected to each other by additional adhesive dots 620 that can be made from similar material to the adhesive dots 607. These additional adhesive dots ensure that the plates stay uniformly connected to each other, even when the hollow area is filled with cooling fluid which will exert a force that is separating the plates 609. The adhesive dots 620 are also placed in a regular pattern that ensures an even connection between the two plates, typically 2.5 cm apart so as to create proper support against the force of the cooling fluid that fills the hollow area. Rather than employing adhesive dots 620, it would be clear to those skilled in the art that other methods of bonding the support plates 609 to the turbulator mesh 608 and the opposite support plate 609 can be devised, for example by coating the mesh 608 with an adhesive or by co-extruding the mesh 608 with an adhesive so that the mesh 608 already contains an adhesive that can be activated by heat or some other activation mechanism.

The membrane plate assembly of FIG. 10 thus has 3 turbulent fluid flows in a counter-flow arrangement, is constructed with inexpensive materials, is corrosion resistant and is easily manufactured. The membrane plate is also easily reconfigurable to accommodate both horizontal and vertical air flow with the cooling fluid in a counter-flow arrangement. It is also possible to adhere the membrane 603, screen 606, adhesive dots 607 and support plate 609 in a roll-to-roll process. In such a process the adhesives chosen might be different or may be applied for example with a screen printing system.

FIG. 11 and FIG. 12 illustrate the effect that the desiccant pressure can have on the shape of the very thin membrane 603. The liquid desiccant enters the membrane plate structure at port 611. It flows through a small port (not shown) into the fine screening material 606 described earlier and then proceeds as a falling film through the screening material 606. For ease of illustration only one of the membranes 603 is shown. Although adhesive dots 607 hold the membrane 603 against the screening material 606, a backpressure can develop near the bottom of the membrane plate 701 that results in the membrane bulging into the air-gap thereby reducing or cutting off air flow as shown in FIG. 12. In FIG. 11 a proper siphoning drain 614 has been attached, which allows the desiccant to be sucked down the drain 614 and into the collection tank 508 resulting in a negative pressure in area 702. This in turn allows the membrane 603 to be pressed flat against the screening material 606. A non-siphoning drain such as shown in FIG. 12 will enhance the backpressure and result in bulging of the membrane. The advantage of using a siphoning drain is that it reduces the need for adhesive dots 607 between the membrane 603 and the support plate 609.

Figure 13:
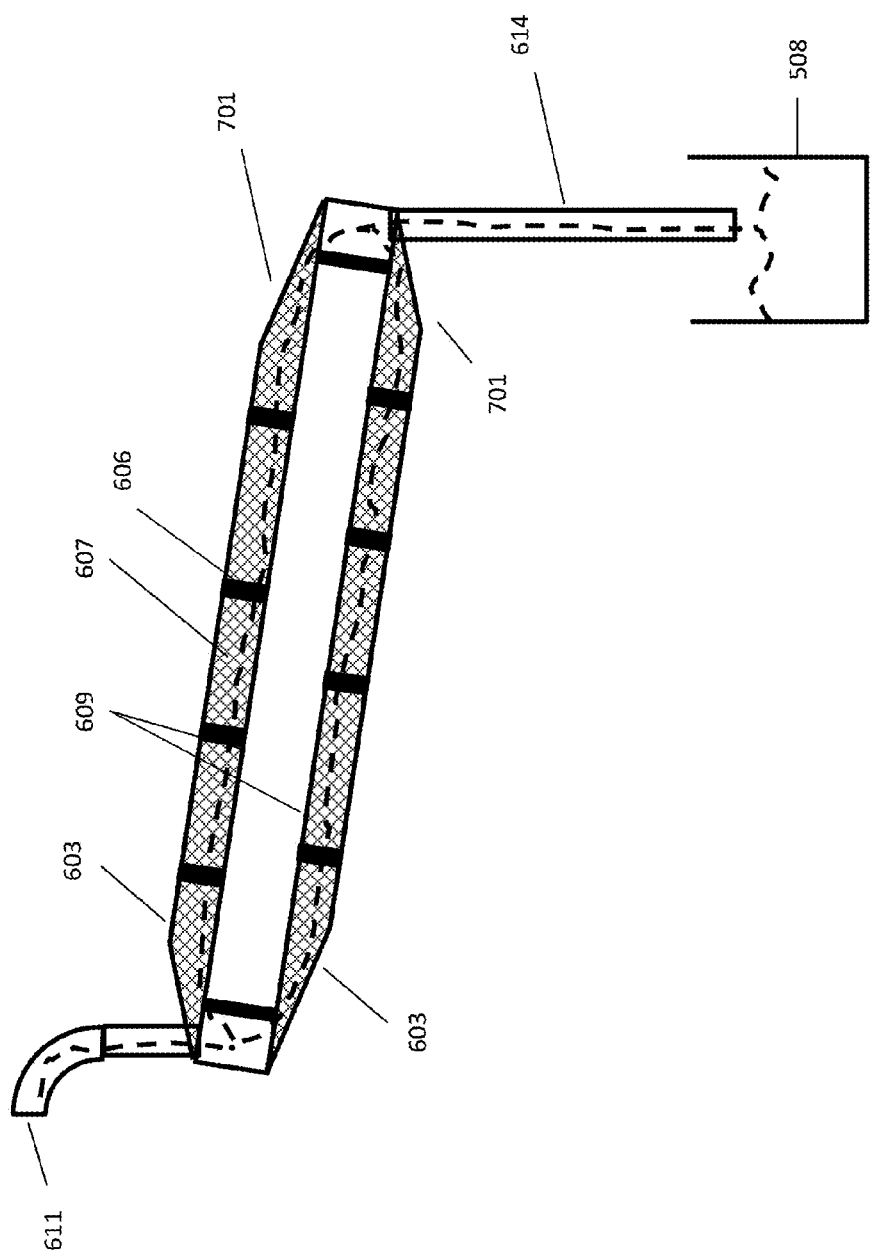
FIG. 13 illustrates an alternate orientation of the syphoning drain for the 3-way heat exchanger plate of FIG. 10, which allows for an almost horizontal, flat orientation of the 3-way heat exchanger plates.

The siphoning drain is a unique feature that allows the desiccant plate to be used in almost horizontal orientation such as is shown in FIG. 13. The siphoning drain 614 collects liquid desiccant at the lower edge of the plate. The membranes in location 701 are kept flat against the screening material 606 by the negative pressure. The siphoning feature can also be used in the main water channel 608 which similarly reduces the need for the adhesive dots 620 that connect the support plates 609.

FIG. 14 shows a spacer 750A that is used to connect two of the membrane support plates 609 as was shown in FIG. 10. The spacer 750A is typically made from a slightly compliant rubber such as EPDM or other suitable material. The spacer provides two fluid connections. Connection 753 is used to provide or drain cooling fluid to/from the membrane plates shown in FIG. 10 and connection 755 is used for supplying or draining desiccant from the membrane plates. Either connection is surrounded by a sealing material 752 and 754. The sealing material can be an adhesive or a separate sealing ring with adhesives on both sides of the ring such as a ring made from 3M VHB Adhesive Transfer Tape F9473PC or similar material. The advantage of having two separate seals such as is shown in FIG. 14 is that if one of the seals develops a leak, the leak will not affect the other seal. Aspect 757 shows a side orientation of the spacer construction with the seal 752 also visible as well as the two membrane support plates 609.

FIG. 15 shows an alternate implementation of the spacer wherein the whole spacer 750B has been coated by an adhesive 756. Aspect 758 again shows a side orientation of the space construction. It will be obvious to those skilled in the art that many variations and combinations of seals and adhesives can be made suitable for connecting the membrane plates of FIG. 10.

Figure 16:
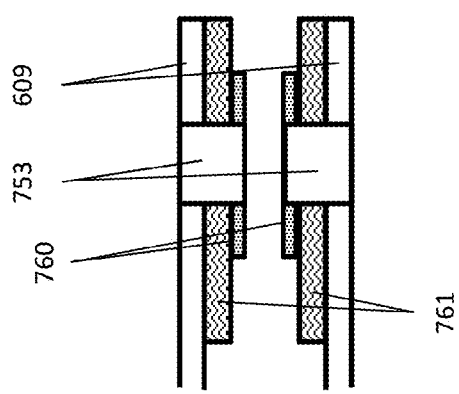
FIG. 16 shows an embodiment of a spacer over-molded on each side of the individual plates of FIG. 10 with an adhesive to make the final connection between the plates.

FIG. 16 illustrates a side orientation embodiment wherein the EPDM material 761 is over-molded on the support plate 609. An adhesive 760 makes the connection between the two over-molded parts thereby connecting the two membrane plates.

Figure 17:
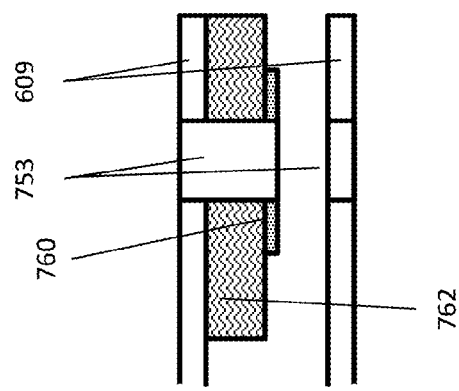
FIG. 17 shows an embodiment of a spacer over-molded on only one side of the individual plates of FIG. 10 with an adhesive to make the final connection between the plates.

FIG. 17 shows an alternate embodiment wherein the over-molding 762 is applied to only one of the two support plates 609.

FIG. 18 illustrates a use of the spacers 763 of FIG. 14 wherein the spacers all have equal thickness allowing even spacing between the membrane plates 764. The incoming air stream 765 is directed between the spacers 763 and gets treated in area 766 before exiting the plates 767. However the membrane plates 764 are treating the air stream. In cooling mode, when the membrane plates are low in temperature, the air stream is contracting since it is being cooled and dehumidified simultaneously. It can be beneficial in that circumstance to apply forces 768 and 769 on the plate assembly thereby reducing the air gap width between the plates, which the compliant EPDM spacers will allow. By reducing the air gap, the efficiency of cooling and dehumidification is increased. However, the air also will experience a larger resistance to flow in the channels and therefore there will be a tradeoff between cooling efficiency and pressure drop. It will be clear to those skilled in the art that the forces 768 and 769 can be applied equally thereby resulting in a more even reduction of the air gap, or can be applied unevenly thereby reducing the air gap more at one side of the membrane plates compared to the other side of the plates. This can be advantageous to compensate for the reduction on air volume. For example, air entering the membrane plates at a temperature of 35 C has a density of about 1.13 kg/m$^3$ and has a density of 1.20 kg/m$^3$ at a leaving temperature of 20 C. This increase in density results in a reduction in surface velocity near the exit of the membrane plates. By reducing the air gap near the exit of the membrane plates (for instance by applying a larger force 768 near the exit of the membrane plates than the force 769 near the entrance of the membrane plates), the surface velocity of the air over the membranes can be held constant, which allows a more optimum efficiency along the membrane surface.

FIG. 19 shows an alternate embodiment of the membrane module of FIG. 18 wherein the spacers 773 near the entrance of the membrane plates 764 are made wider than the spacers 774 near the exit of the membrane plates. The warmer entering air 770 enters the membrane plates 764 and gradually shrinks as it is being cooled by the membrane plates in air channel 771. The leaving air 772 has shrunk to a smaller size matching more closely to the width of the spacers 774 near the exit of the membrane module. It will be clear by those skilled in the art that if the air is being heated by the membrane module, as is the case if the module functions as a regenerator, the membrane plates may be arranged to increase their air gaps to accommodate the expanding air as it is moving through the membrane plates.

Figure 20:
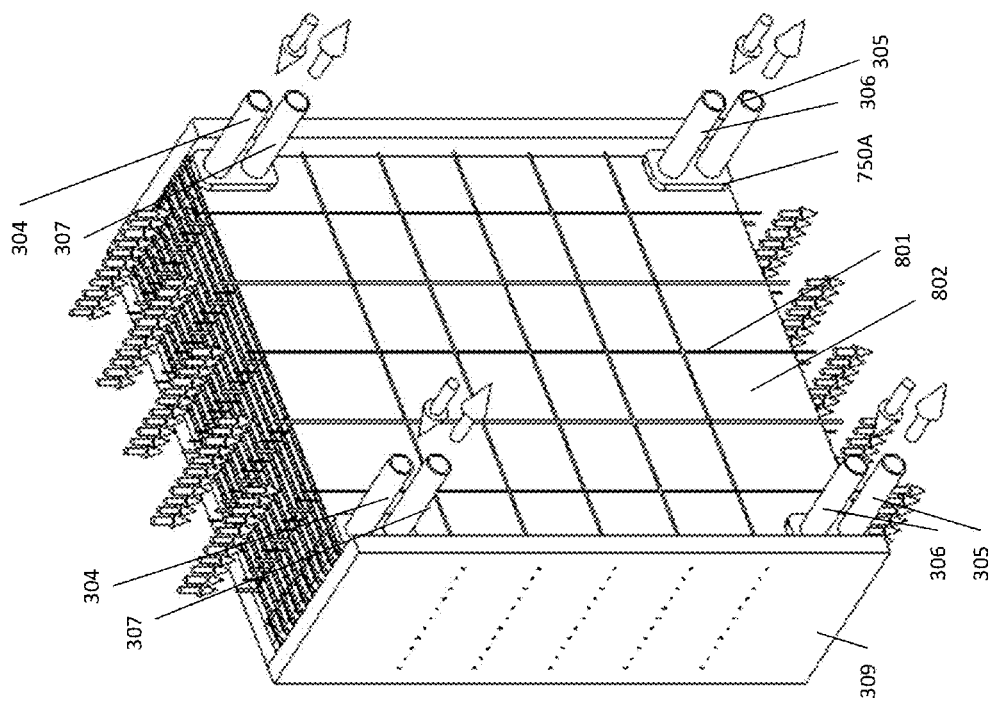
FIG. 20 shows the 3-way heat exchanger of FIG. 4 with the front cover face plate removed so that the first air channel is visible.

FIG. 20 now illustrates the plate block of FIG. 4 with the front cover face plate removed so that the first air gap and first membrane plate are visible. The four spacers 750A are shown to provide the fluid connections to the first membrane plate 802. Also visible is the air turbulator 801, which as discussed earlier can be a series of plastic lines or a mesh material attached to the side cover plates 309 in such a way as to sit in the middle of the air gap where the air flow obstruction has the greatest effect on turbulence.

Figure 21:
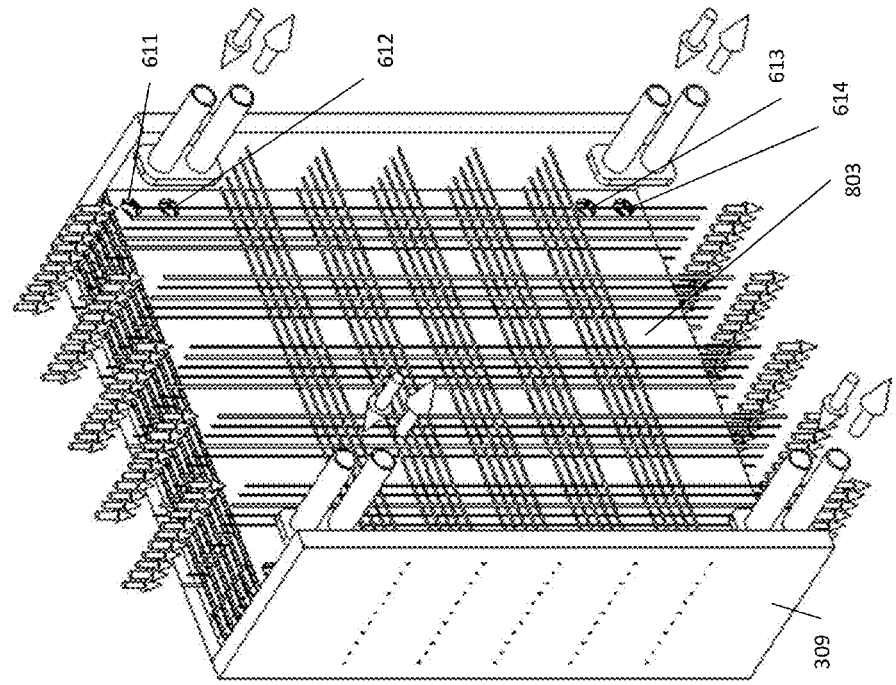
FIG. 21 shows the 3-way heat exchanger of FIG. 20 with several additional membrane plates removed for purposes of illustration.

FIG. 21 shows the plate block of FIG. 20 with multiple plates removed so that fluid connection into the membrane plates 803 are visible. The desiccant is supplied through port 611 and drains out through port 614. The cooling fluid enters through port 613 and leaves through port 612.

Figure 22:
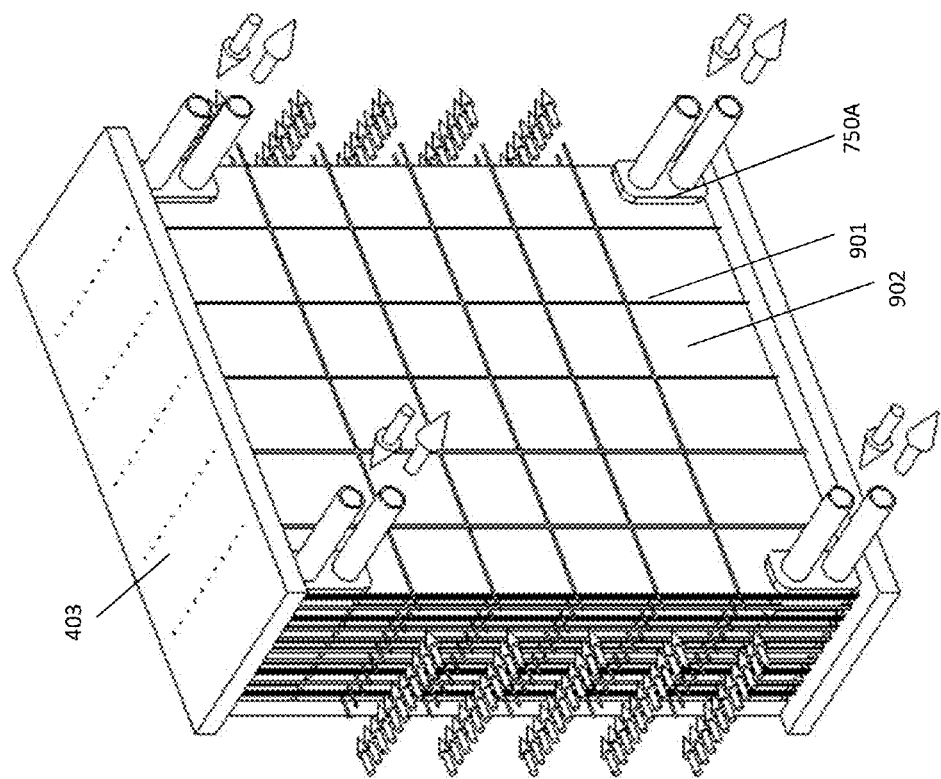
FIG. 22 shows the 3-way heat exchanger of FIG. 5 with the front cover face plate removed so that the first air channel is visible.

FIG. 22 now illustrates the plate block of FIG. 5 with the front cover face plate removed so that the first air gap and first membrane plate are visible. The four spacers 750A are shown to provide the fluid connections to the first membrane plate 902. Also visible is the air turbulator 901, which as discussed earlier can be a series of plastic lines or a mesh material attached to the top and bottom cover plates 403 in such a way as to sit in the middle of the air gap where the air flow obstruction has the greatest effect on turbulence.

Figure 23:
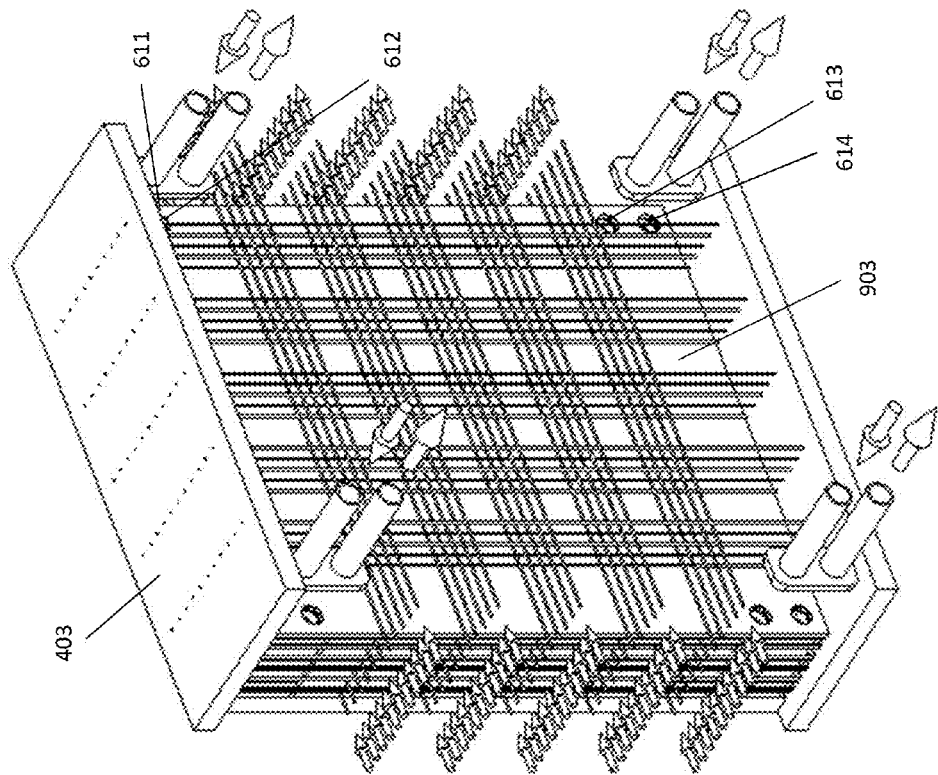
FIG. 23 shows the 3-way heat exchanger of FIG. 5 with several additional membrane plates removed for purposes of illustration.

FIG. 23 shows the plate block of FIG. 22 with multiple plates removed so that fluid connection into the membrane plate 903 are visible. The desiccant is supplied through port 611 and drains out through port 614. The cooling fluid enters through port 613 and leaves through port 612.

Figure 25:
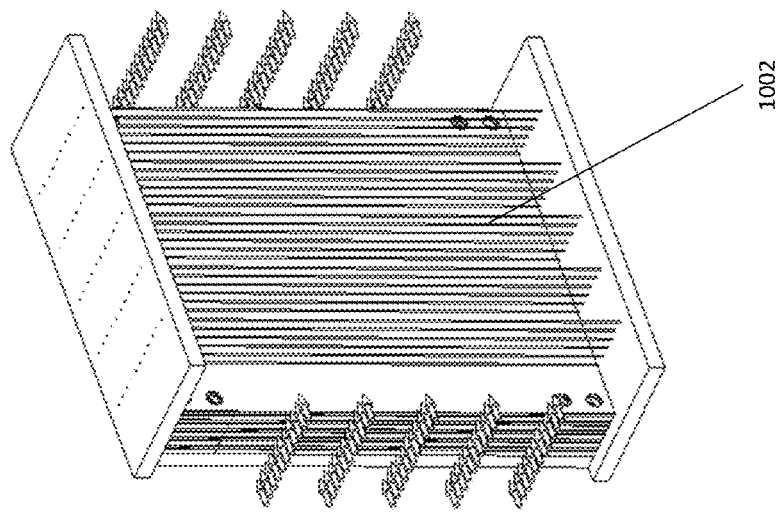
FIG. 25 illustrates an alternate turbulator for the air channels shown in FIG. 23.
Figure 24:
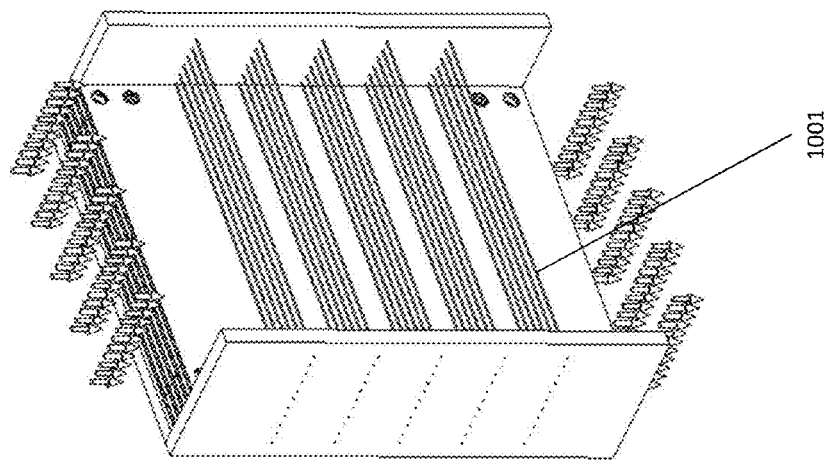
FIG. 24 illustrates an alternate turbulator for the air channels shown in FIG. 21.

FIG. 24 illustrates an alternative air-mesh wherein the turbulence is provided by horizontal plastic lines 1001 that obstruct the air in the gaps between the membrane plates. This embodiment is less flexible because if the air flow direction is converted to a horizontal flow as is shown in FIG. 25 the wires 1002 need to be repositioned as well.

FIG. 26 illustrates an exploded view of an embodiment of the membrane plate as discussed in FIG. 10. A membrane 1101 has provisions 1106 for fluid passages cut into it, or the corners of the membrane can simply be removed as shown at 1107. As discussed earlier, a glue- or tape seal 1102 seals the edges of the membrane 1101 to the support plate 609. A screen material or wicking fabric 606 is adhered to the support plate 609 with glue dots 607 as discussed earlier. The support plate 609 can be made of various plastics such as fiberglass reinforced plastic or thermally doped engineering plastics. The support plate has provisions for fluids as well as a series of small desiccant supply holes 1108 and desiccant drain holes 1103. The support plate 609 is in turn bonded to a diamond mesh 1105 with a main seal 604 surrounding it. The main seal 604 provides liquid seal as well as confines the areas for cooling fluids, and desiccants. The cooling fluid turbulator 608 is also shown. As can be seen from the figure, the system is symmetrical about the mean seal 604 and cooling fluid turbulator 608. Therefore a second support plate 609, screen 606 and membrane 1101 are adhered to the opposite side of the mean seal 604. Bonding four spacers 750A to the four corners of the membrane plate, allows for connection to the next membrane plate. Repeating the assembly of FIG. 26 allows for a multi-plate stack to be built and eventually configured into a complete plate block.

Figure 28:
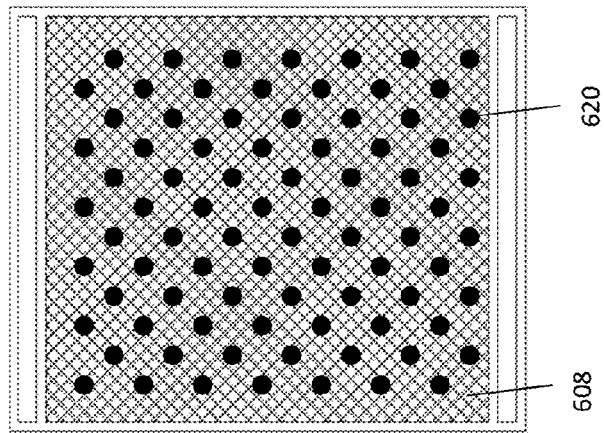
FIG. 28 illustrates the seal, turbulator and adhesive dots as an integral unit.
Figure 27:
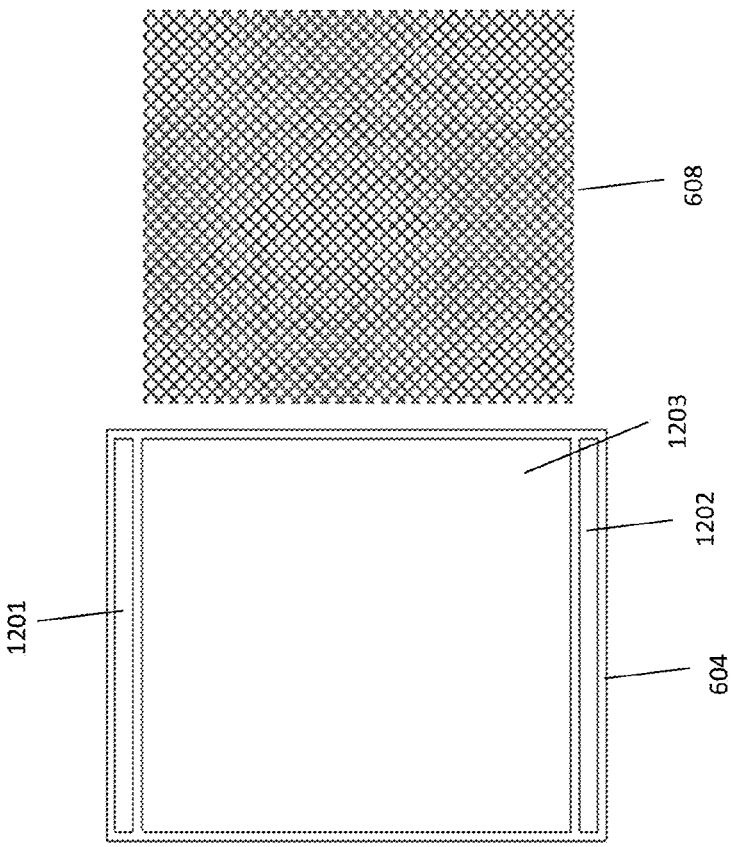
FIG. 27 illustrates a seal and turbulator detail for the core of the membrane plate in accordance with one or more embodiments.

FIG. 27 shows the mean seal 604, which as discussed before can be made entirely from an adhesive or an injection molded plastic part with an adhesive covered surface. The main seal 604 creates areas for desiccant supply 1201 and desiccant drainage 1202, which are separate from the cooling fluid area 1203. A diamond mesh turbulator 608 is placed in the middle of the seal 604. The final assembly of the components is shown in FIG. 28, which also shows the pattern of adhesive dots 620 that are used to bond the assembly to the 2 support plates that were shown in FIG. 26.

FIG. 29 shows an alternate seal arrangement to the arrangement from FIG. 27. The cooling fluid seal 1301 is now distinctly a separate seal from the desiccant supply seal 1302 and the desiccant drain seal 1303. The seals 1302 and 1303 form channels 1304 and 1305 that are shaped to enable the desiccant to drain easily. Similarly the cooling fluid seal 1301 is shaped to enable the cooling fluid to drain easily. This self-draining feature makes draining the system for service significantly easier and less messy. FIG. 30 shows the seal assembly of FIG. 29 place on top of one of the support plates 609. As can be seen from the figure, the desiccant supply holes 1108 and drain holes 1103 are placed on a horizontal line, whereas the seals are constructed with and angle with respect to the horizontal plane. As a result of the seal shape desiccant distribution at the top is uniform and the siphoning at the bottom is enhanced. The holes 611, 612, 613 and 614 in the support plate 609 are also shown and these are placed in the corner of the seals so as to not to create a pocket where liquids can collect. FIG. 31 finally shows the installation of the diamond mesh turbulator 608 and the adhesive dots 620 that connect the two support plates 609.

Figure 32:
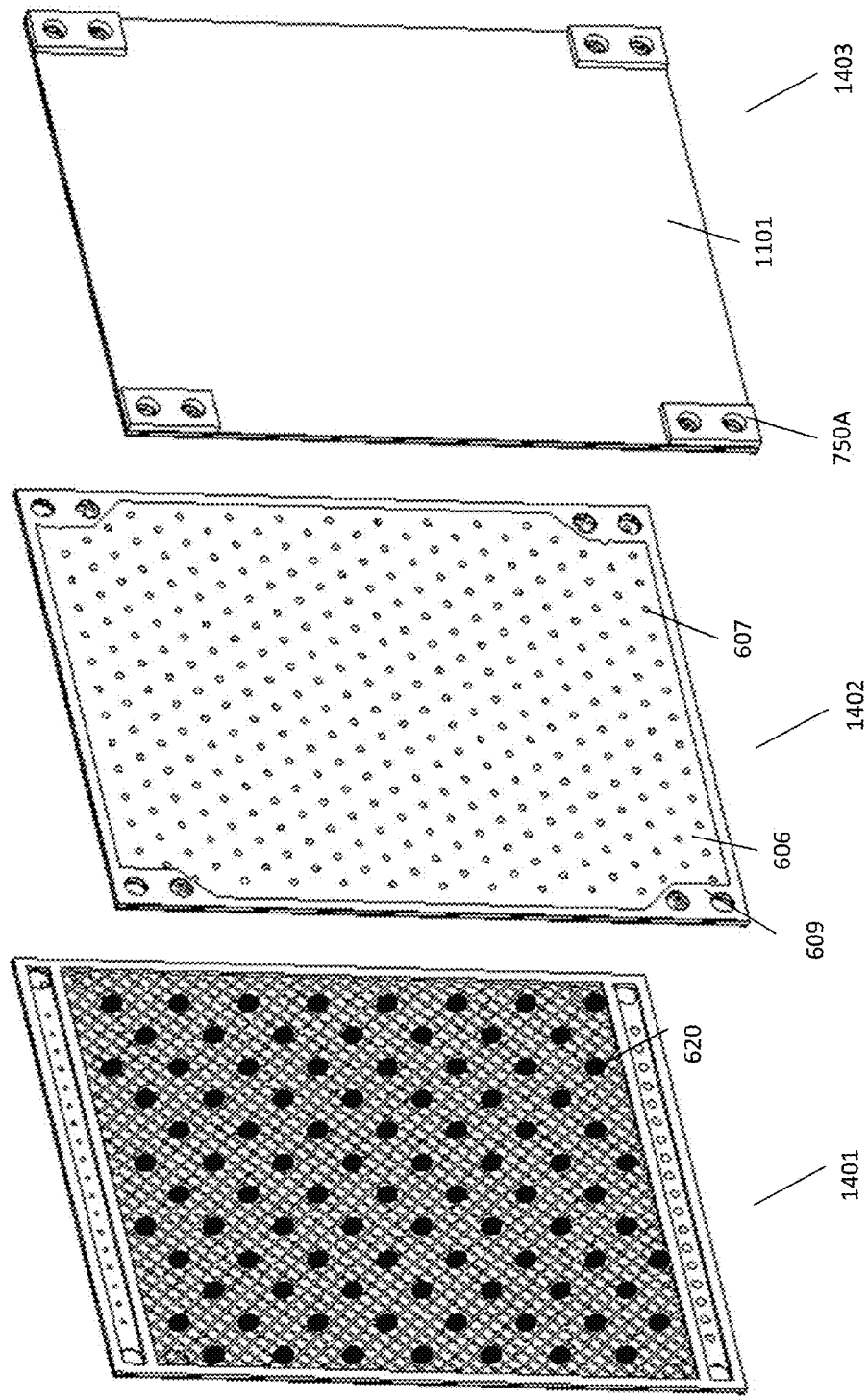
FIG. 32 illustrates the assembly steps from the assembly of FIG. 31 through the final assembly of a single membrane plate and spacers.

FIG. 32 shows the remaining assembly process. Aspect 1401 is the same as was shown in FIG. 31. Aspect 1402 illustrates the second support plate 609 installed together with the fine screening material 606 and the adhesive dots 607 for attaching the membrane. Aspect 1403 shows the application of the membrane 1101 and the spacers 750A as discussed earlier.

Figure 33:
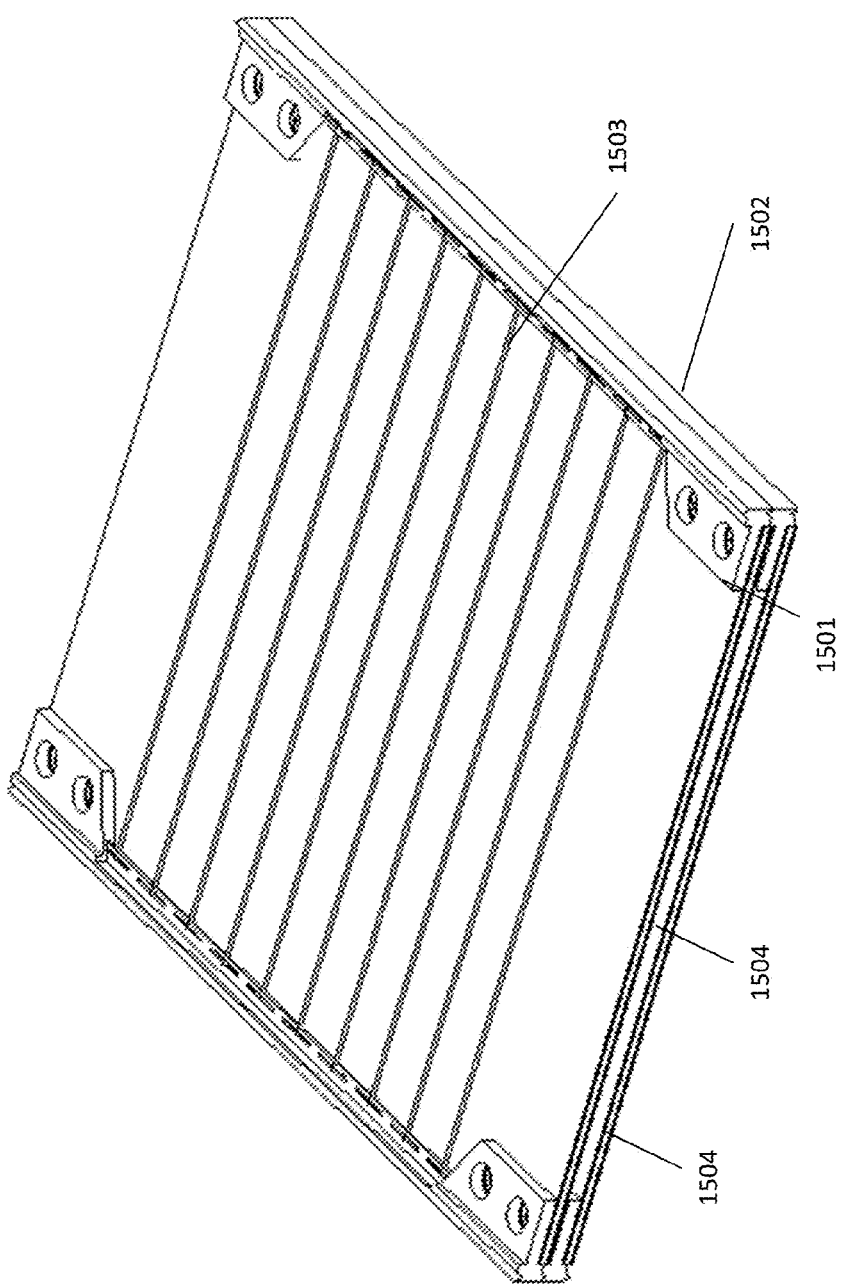
FIG. 33 illustrates the assembly process of multiple membrane plates.

FIG. 33 shows an alternate spacer design 1501 that also integrates wires 1503 and a side cover 1502. The integral spacers 1501 can be stacked vertically around the membrane plates 1504 and provide the side seal for the air flow, thus eliminating the need for a separate side cover 309 as was shown in for example FIG. 300. The integral spacers 1501 could be a plastic material molded over the wires 1503 or alternatively a mesh could be over-molded as well.

Figure 34:
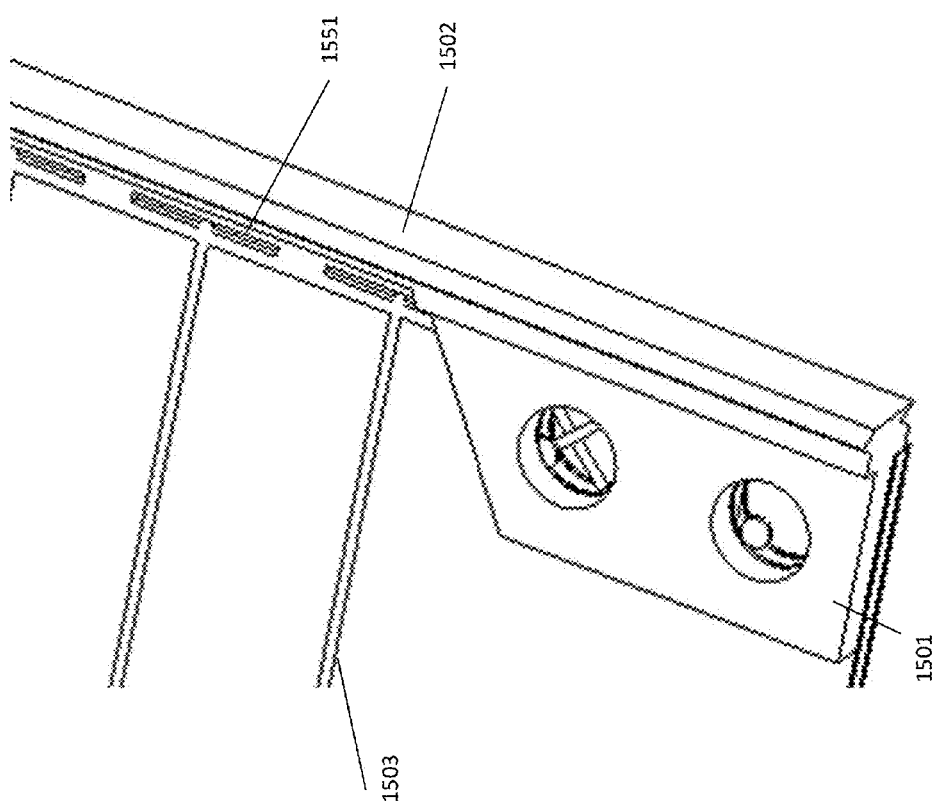
FIG. 34 illustrates a detail of FIG. 33.

FIG. 34 shows a detail of the bottom corner of FIG. 33. The detail also illustrates that it is possible to design a feature 1551 into the integral spacer 1501 that provides a spring tension to the wires 1503. The spring feature 1551 helps ensure that the wires 1503 stay properly tensioned through different temperatures so that sagging or vibration in the wires is inhibited.

Figure 35:
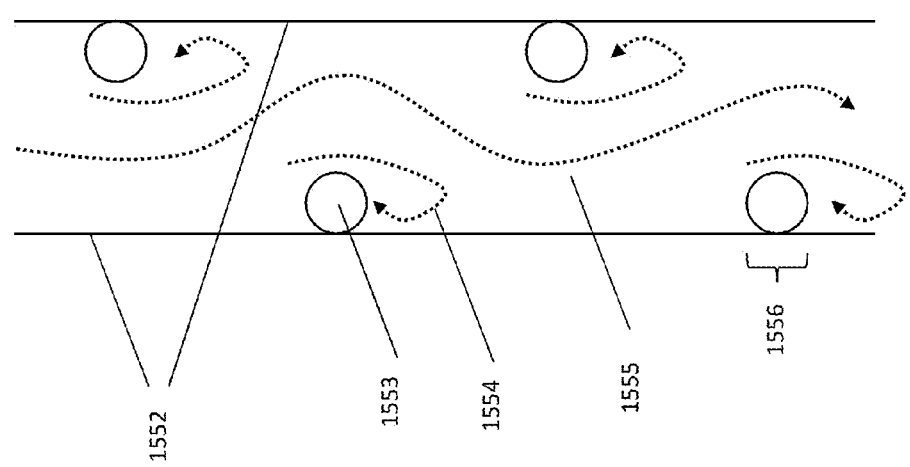
FIG. 35 shows a set of surface turbulators in the prior art.
Figure 37:
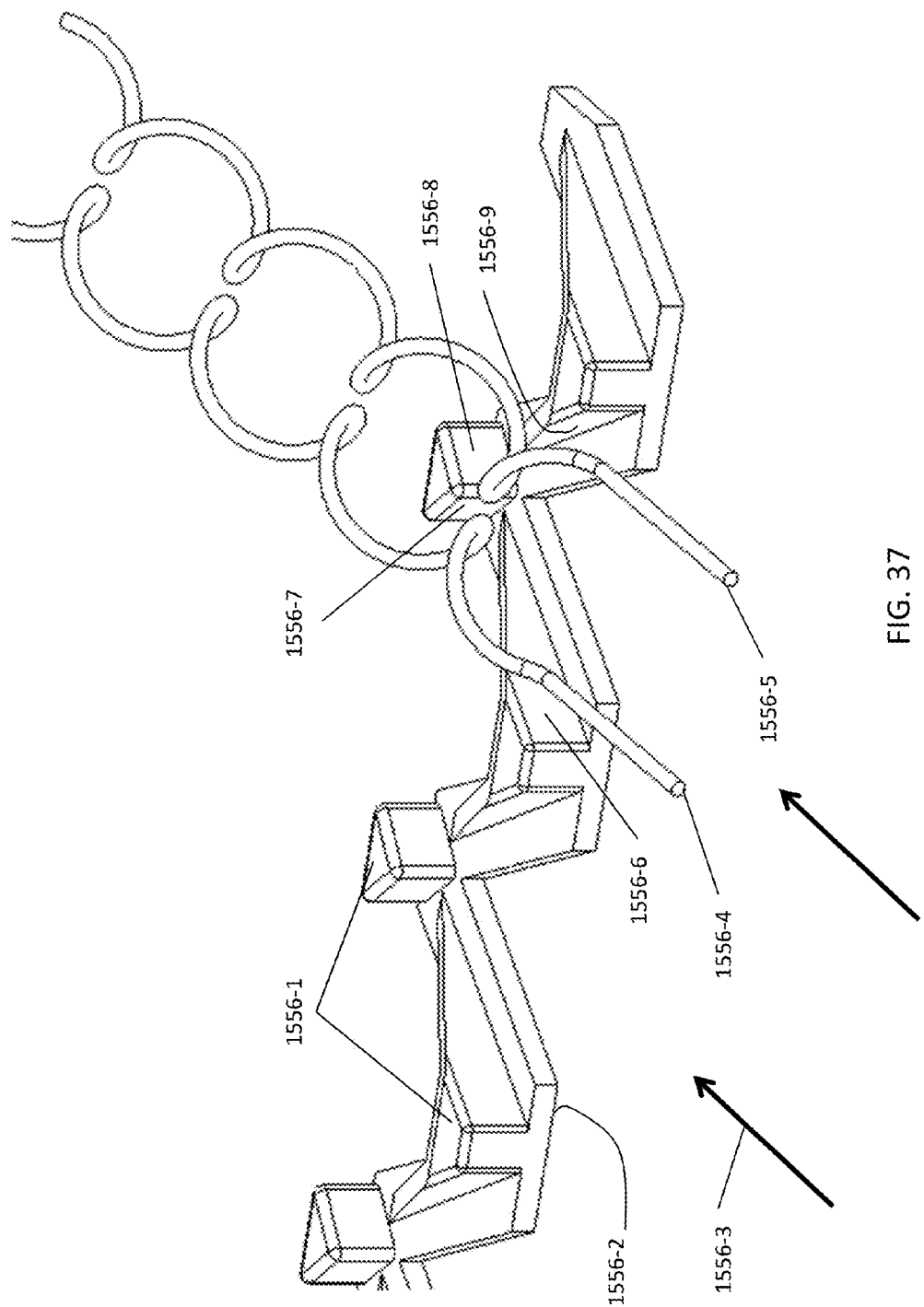
FIG. 37 shows a turbulator that is able to generate a counter-rotating flow in a narrow air channel.

FIG. 35 illustrates a surface turbulator as described in the prior art. An air stream 1555 is directed into a channel between two surfaces 1552, which can be membranes. The surface turbulators 1553 are placed at distances typically 10 to 15 times the width of the channel at alternating sides of the channel. The surface turbulator causes small eddies or vortices 1554 behind the turbulator which allows a larger amount of molecules in the air stream to be directed towards the membrane surfaces. However, the surface turbulators also cause a small area 1556 that is covered by the turbulator and is thus inactive for transport of molecules through the membrane.

Figure 36:
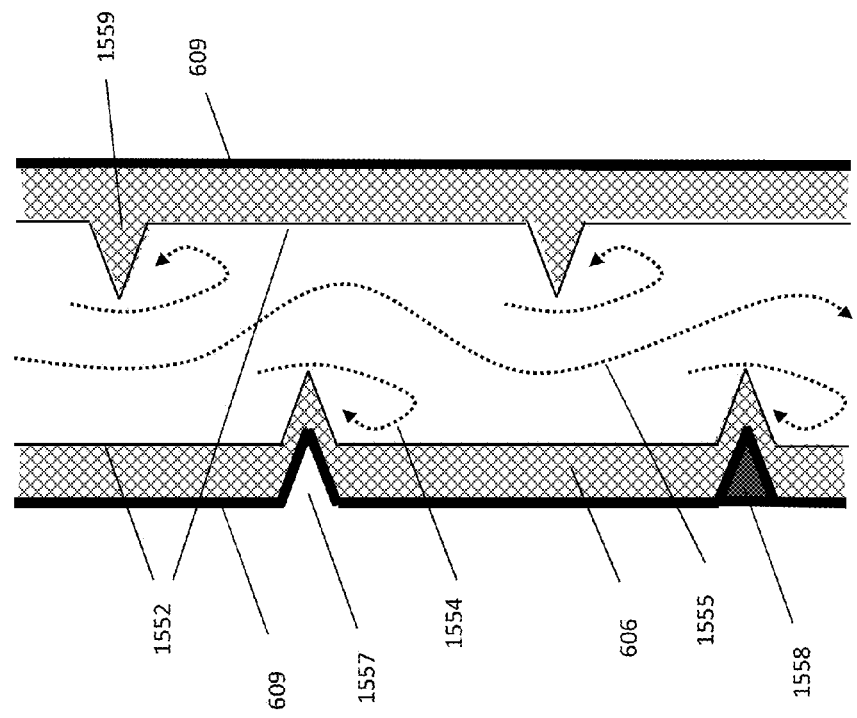
FIG. 36 illustrates a set of surface turbulators using a membrane and support structure as the means of creating turbulent flow.

FIG. 36 shows a surface turbulator that uses the membrane itself to create eddies and vortices in the air stream. Since the membrane is relatively thin, it is possible to form the screen 606 in such a way that it holds the membrane at an acute angle to the air stream as is illustrated by element 1559. The support surface 609 can also be formed to create a ridge 1557, which then in turn forms a ridge in the screen 606. It is also possible to adhere a separate material 1558 to the support surface 609 rather than forming the support material itself. The advantage of these methods is that the desiccant that is running in the screen material 606 is now forced to stay close to the membrane 1552, which enhances the interaction between the air stream and the desiccant streams. As can be seen from the figure, by forming the membrane over these ridges, the surface area is increased and thus the efficiency of the system is improved as well.

FIG. 37 shows a turbulator that is able to generate a counter-rotating air flow in a narrow air channel. The turbulator is also able to support a membrane structure such as is shown in FIG. 78 and is easily manufacturable, for example using injection molding technology. In the figure, an air stream 1556-3 is directed to the turbulator structure. The structure is clamped in a narrow slot, for example in-between two membrane surfaces. The top of the turbulator structure 1556-1 contacts a membrane or surface and is not shown. The bottom of the turbulator structure 1556-2 contacts a second membrane or surface and is also not shown. When the air stream 1556-3 reaches the turbulator, a section of the air stream 1556-4 contacts a wall 1556-6 that is placed at an angle to the air stream. The wall 1556-6 progressively gets shorter in the downstream direction. As a result the air stream 1556-3 is forced into a rotational motion as shown by air stream 1556-4. Furthermore an optional obstruction 1556-7 forces the air stream back to the opposite direction that wall 1556-6 was forcing the air stream in. As a result, the air stream is coerced into a right-handed rotation. Similarly a section of the air stream 1556-5 that is a small distance away from air stream 1556-4, contacts a wall 1556-9 that is placed at an angle to the air stream, but in the opposite angle of wall 1556-6. Again, this wall slopes down in the direction of the air stream. As a result the air stream 1556-5 is forced into a rotation over the wall. Again an optional obstruction 1556-8 forces the air stream in the other direction, resulting in a left-handed rotation of the air stream. The two streams combine to a counter-rotation air stream behind the turbulator as is shown by air streams 1556-4 and 1556-5.

Figure 38:
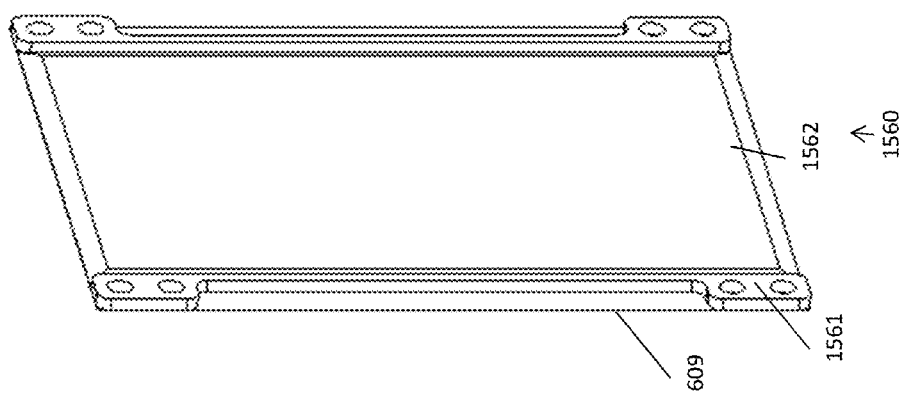
FIG. 38 shows half-plate assembly with an over-molded spacer and a membrane attached in accordance with one or more embodiments

FIG. 38 shows an alternate construction for a half-membrane plate structure 1560. The support plate 609 as discussed earlier now has an over-molded spacer 1561. The spacer 1561 also acts as a side seal for the air flow similar to FIG. 33. The membrane 1562 covers a thin screen 1563.

Figure 39:
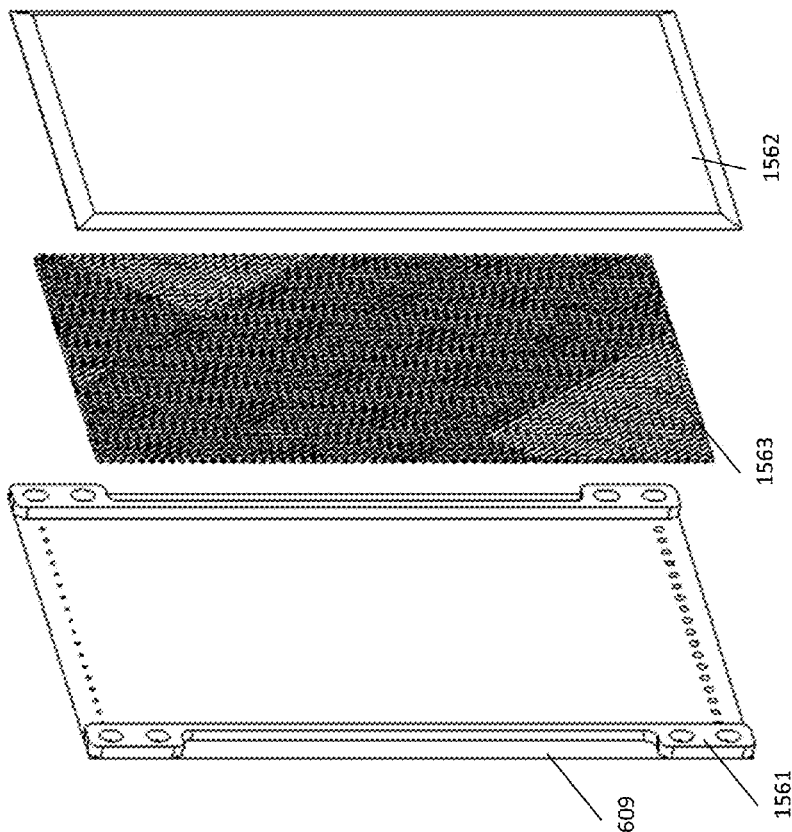
FIG. 39 shows and exploded view of the half-plate assembly of FIG. 38 in accordance with one or more embodiments.

The exploded view in FIG. 39 shows that the membrane 1562 is placed over the thin screen 1563. The structure can be manufactured with simple manufacturing operations such as die-cutting, over-molding, stencil printing and roll-to-roll assembly processes.

FIG. 40 illustrates how two half-plates 1560 can be connected by using the seal arrangement from FIG. 1300. The main seal 1301 contains the cooling fluid. The desiccant supply seal 1302 and the desiccant collection seal 1303 complete the assembly. After connecting the two half-plates as shown in the figure, multiple plates can be stacked to create a complete block of plates.

Figures 41, 42, 43:
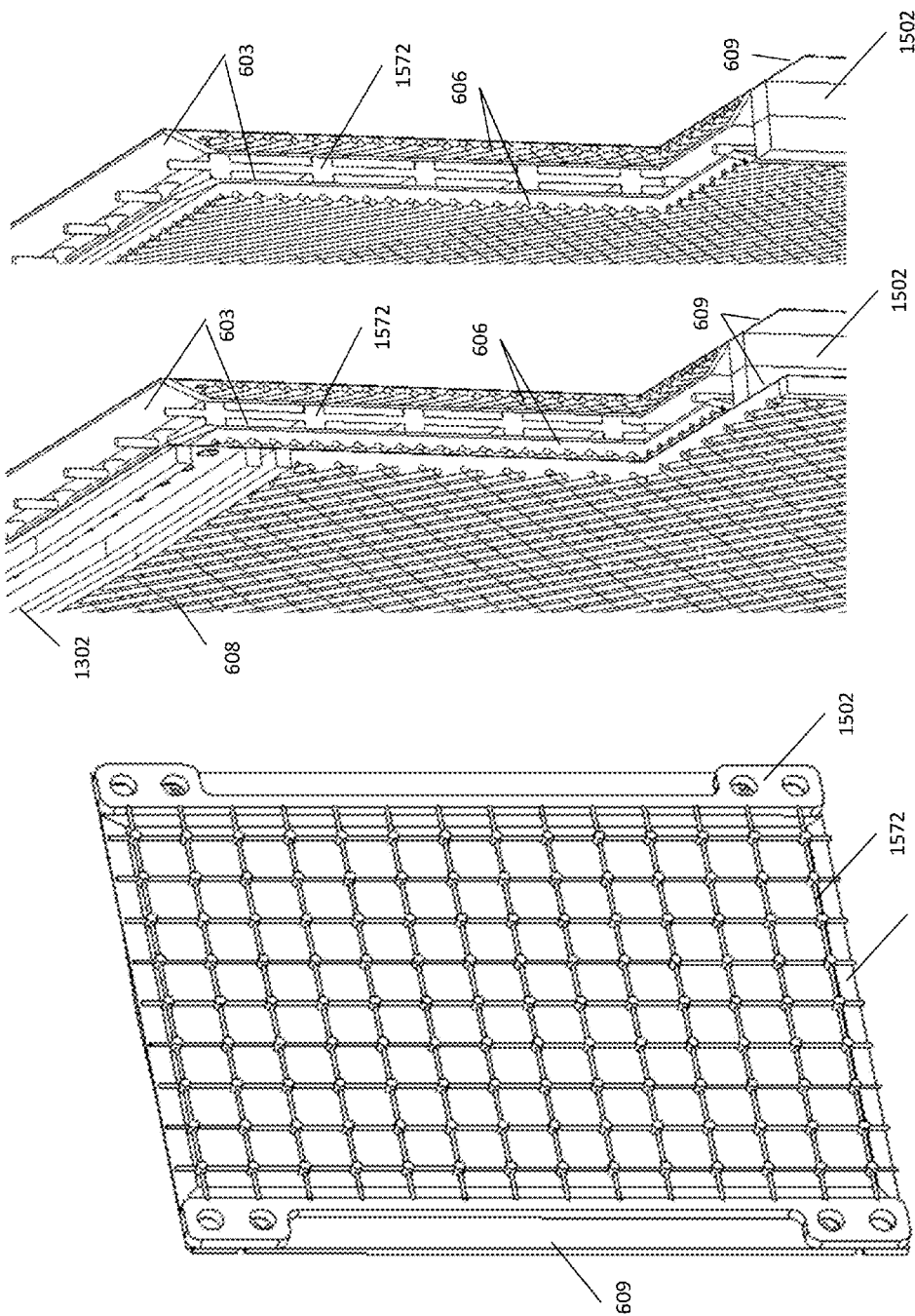
FIG. 41 shows an air-turbulating netting material that can also provide mechanical support to the membrane structure.
FIG. 42 shows a detail of FIG. 41 wherein two membranes connected to two 3-way membrane plates are supported by an air-turbulating netting.
FIG. 43 shows a similar detail of FIG. 42 wherein two membranes connected to two 2-way membrane plates are supporting by an air-turbulating netting.

FIG. 41 shows an air-turbulating netting material that can also provide mechanical support to the membrane structure in a half-plate aspect of the design. Since the membrane is relatively thin as mentioned above (~20 µm), several techniques need to be employed to ensure that the membrane does not release from the support structure and enter into the airstream. As shown in FIG. 700 a negative syphoning pressure in the liquid desiccant stream can help ensure that the membrane 603 stays flat against the support screen 606. Adhesive dots 607 ensure that the screen and the membrane stay in place. FIG. 41 shows an alternative air mesh support structure 1572 to the adhesive dots 607. The air mesh support structure 1572 has two functions: it provides a level of turbulent mixing of the air stream and it contacts the membrane to keep it against its support plate. The edge and liquid path seals 1502 were discussed earlier in FIG. 33.

FIG. 42 shows a detail cut-out of FIG. 41 wherein two membranes connected to two 3-way membrane plates are supported by an air-turbulating netting 1572. The membranes 603 are contacted by the air mesh support structure 1572 from the air-gap side and by the screen material 606 from the liquid desiccant side. A 3-way heat exchanger (which utilizes air, liquid desiccant, and a cooling fluid) would also have a water turbulating mesh 608 and a water sealing structure 1302 as shown earlier. Furthermore the support plates 609 provide mechanical isolation between the liquid desiccant running through the screen 606 and the cooling fluid running through the plate mesh 608.

FIG. 43 shows a similar detail to FIG. 42 wherein two membranes connected to two 2-way membrane plates are supporting by an air-turbulating netting. In a 2-way membrane heat exchanger (air and desiccant without a cooling fluid), the same air mesh support structure 1572 can be deployed. The cooling fluid layer is simply eliminated from the plate structures.

Figures 44, 45:
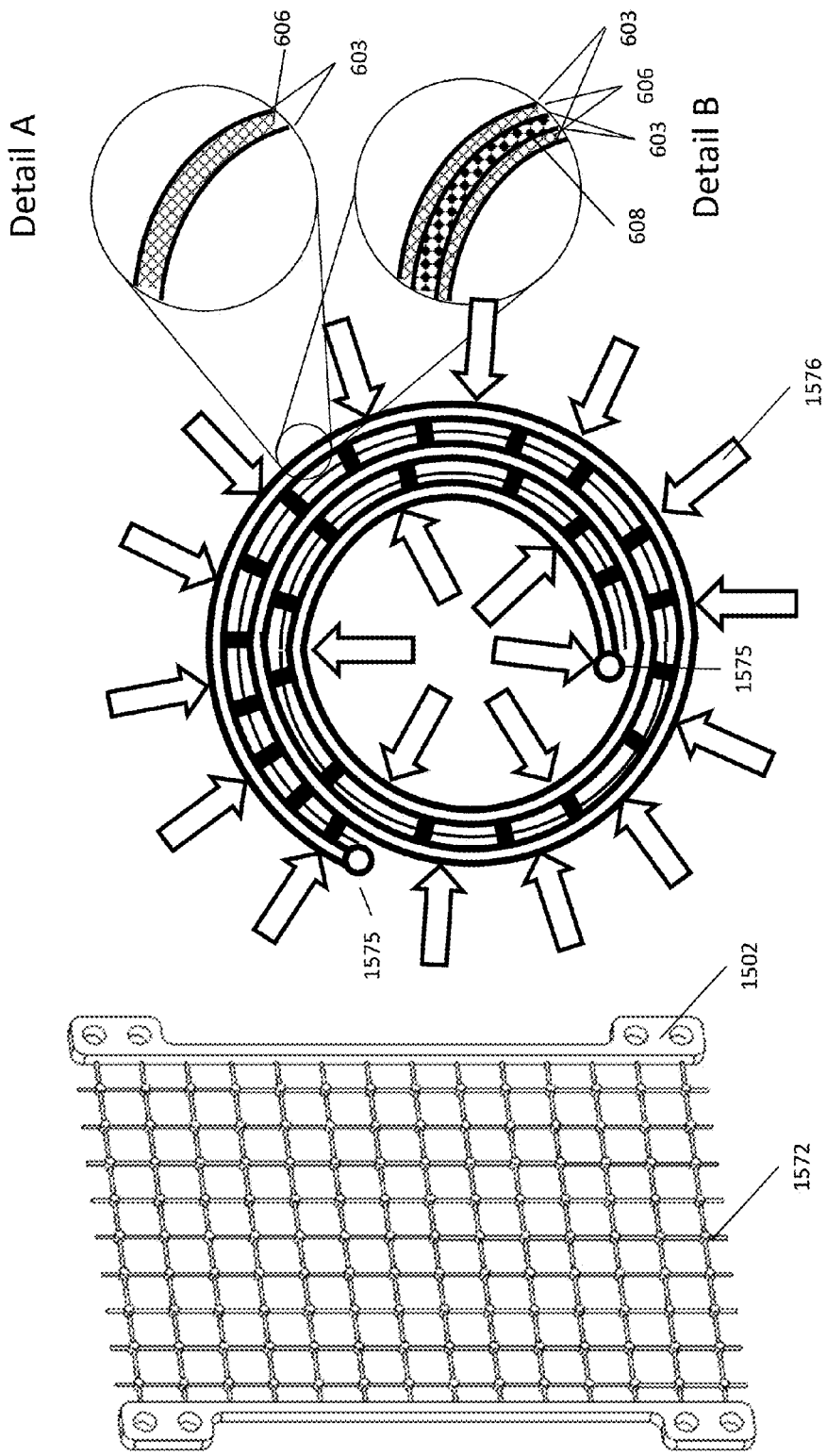
FIG. 44 shows an embodiment of an air turbulating netting wherein the netting also incorporates support structures designed to keep membranes mechanically in place and wherein edge spacers are integrated to the design.
FIG. 45 shows how the air turbulating netting can support a membrane structure that is rolled into a cylindrical structure. Detail "A" shows a 2-way heat exchanger plate structure. Detail "B" shows a 3-way heat exchanger plate structure.

FIG. 44 shows an embodiment of an air turbulating netting wherein the netting also incorporates support structures designed to keep membranes mechanically in place as well as a set of spacers meant to keep the air stream contained to a slot between two membrane plates. The shape of the support structures can be designed to generally minimize the area lost on the membrane while still achieving good support. Likewise, the shape of the "wires" between the support structures can be designed to optimize the air turbulence and mixing. The edge spacers 1502 are designed to provide one or more fluid connections between stacks of membrane plates. The air turbulating netting can be manufactured with many different techniques such as forming, injection molding or other common manufacturing steps. By making the air turbulating netting from a flexible material such as EPDM, the netting remains elastic and can supply a force to the membranes.

FIG. 45 shows how the air turbulating netting can support a membrane structure that is rolled into a cylindrical structure. Detail "A" shows a 2-way heat exchanger plate structure. Detail "B" shows a 3-way heat exchanger plate structure. By selecting flexible materials for the desiccant mesh 606 and air turbulating netting, the structure can be rolled into a multi-layer cylindrical structure. Forces (represented by the arrows 1576) constrain the rolled up structure. Supply and drain bulkheads 1575 provide for the fluid connections for the cooling fluids and desiccant. The air stream is perpendicular to the plane of the figure and is directed to only run through the rolled up structure. Detail "A" shows the rolled up structure for a 2-way air to desiccant heat exchanger, whereas detail "B" shows the rolled up structure for a 3-way air, desiccant and cooling fluid structure.

Figure 46:
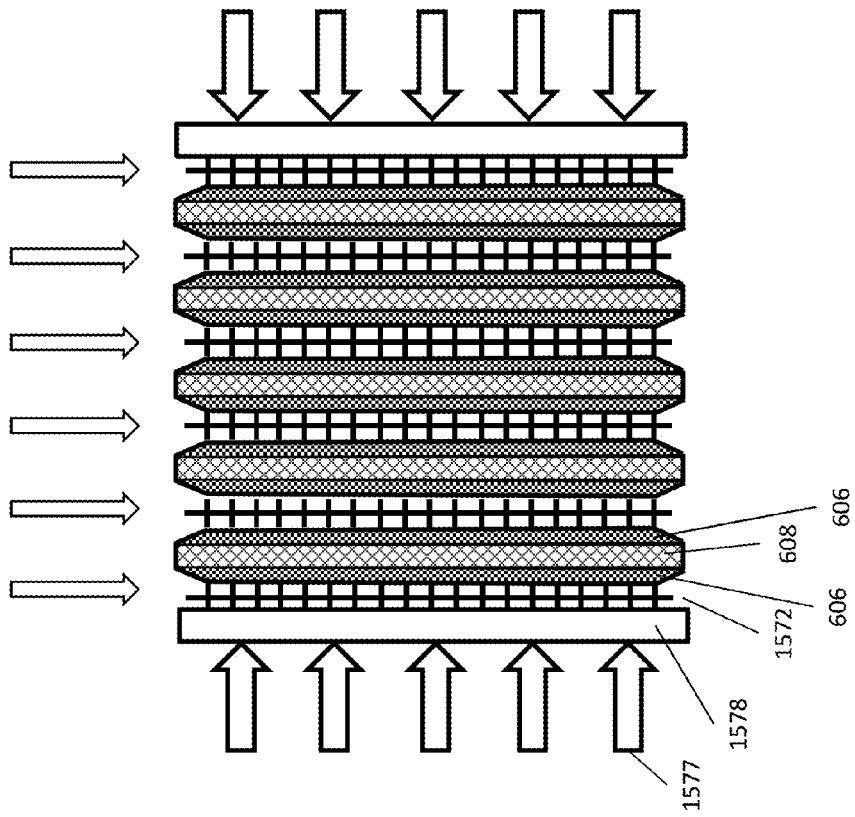
FIG. 46 shows how the air turbulating netting can support a flat membrane structure for a 3-way heat exchanger plate structure.

FIG. 46 shows how the air turbulating netting can support a flat membrane structure for a 3-way heat exchanger plate structure. The structure shown in the figure contains five 3-way liquid desiccant plates in the design of FIG. 10. Endplates 1578 are providing a force 1577 on the five plates and the six air mesh support structures. The assembly shown reduces the need for adhesives and the adhesive dots 607 and 620 from FIG. 10 can be eliminated.

Figure 47:
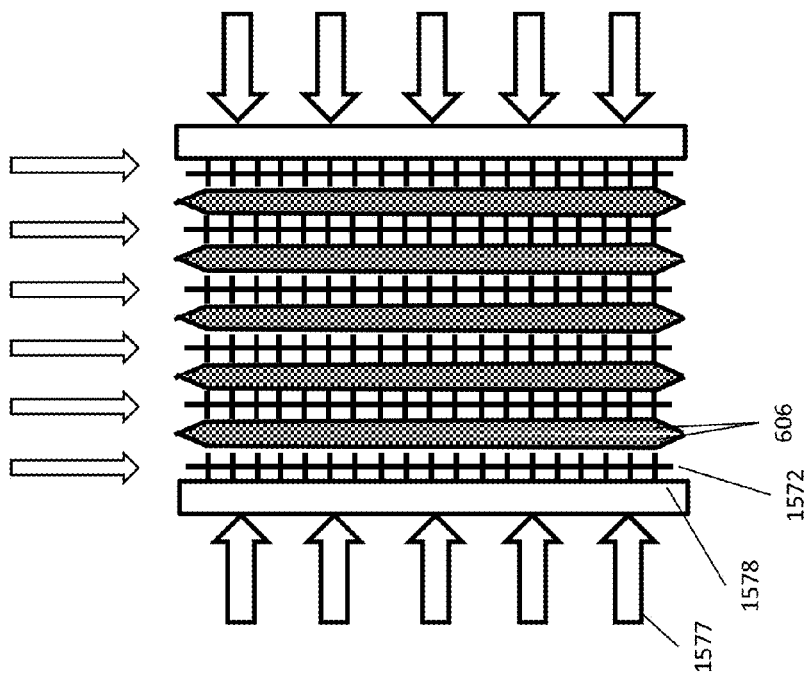
FIG. 47 shows how the air turbulating netting can support a flat membrane structure for a 2-way heat exchanger plate structure.

FIG. 47 shows how the air turbulating netting can support a flat membrane structure for a 2-way heat exchanger plate structure. The structure shown in the figure contains five 2-way liquid desiccant plates. Endplates 1578 are providing a force 1577 on the five plates and the six air mesh support structures. The assembly shown reduces the need for adhesives.

Figure 48:
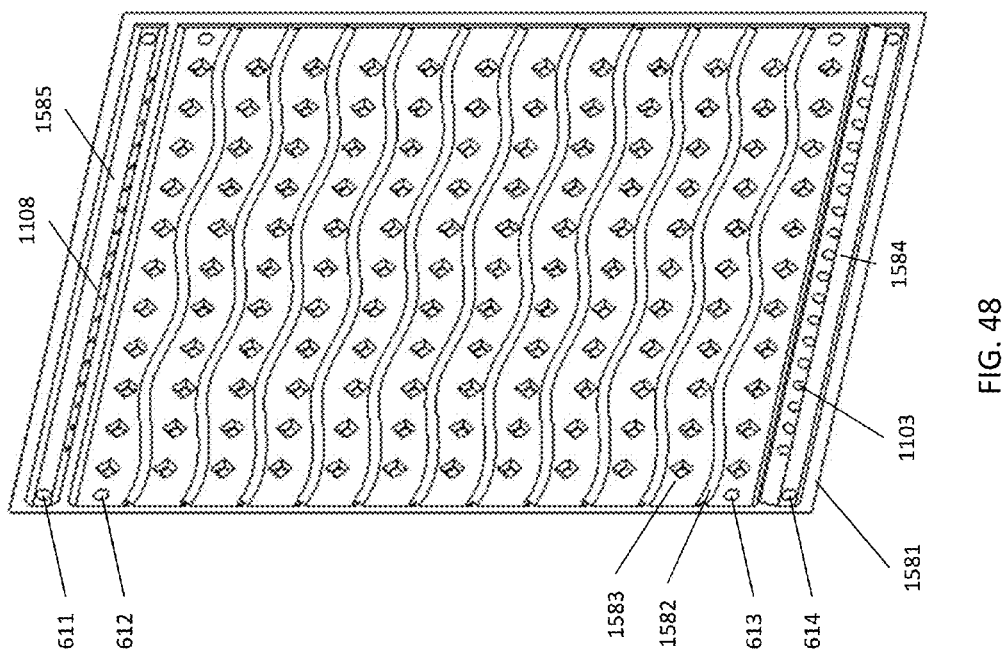
FIG. 48 shows a support plate that has been die-cut and thermoformed to incorporate features for cooling fluid and desiccant distribution.

In FIG. 48 a thermo-formed, die-cut support plate 1581 is shown. The function of the support plate 1581 is identical to that of support plate 609 in FIG. 10, however both the diamond mesh 608, the wicking fabric or screen material 606 and the desiccant and cooling fluid supply and drain channels (labeled 611, 612, 613 and 614 in FIG. 10) have been integrated into the mold design. The desiccant supply channel 611 allows the desiccant to run along the desiccant header 1585. The desiccant exits the header 1585 through the holes 1108 and can run on the outside of the support plate 1581. Desiccant collection holes 1103 allow the desiccant to re-enter the support plate and run through the desiccant drain header 1584 to exit at drain 614. Similar to FIG. 10, the cooling fluid enters the support plate through opening 614, and exits at the top of the plate at 612. Feature 1582 is a formed-in feature that functions like the diamond mesh shown in earlier figures. The feature 1582 can be formed in many different ways, but should accomplish three main functions: 1) set the distance between two support plates, 2) create turbulent mixing in the cooling fluid while maintaining uniform cooling fluid flow patterns, and 3) provide a bonding surface to a second support plate.

The small features 1583 are raised slight above the surface of the support plate into the direction of the desiccant. These features provide for a similar function as the wicking fabric or screen material 606 as was shown in FIG. 10. The features provide for mixing of the desiccant, they allow the membrane (not shown) to be bonded to the support plate and they set a uniform, firm distance between the membrane and the support plate so that uniform heat- and water vapor transport occur. There are many possible configurations of the feature 1583 possible to achieve these objectives.

Figure 49:
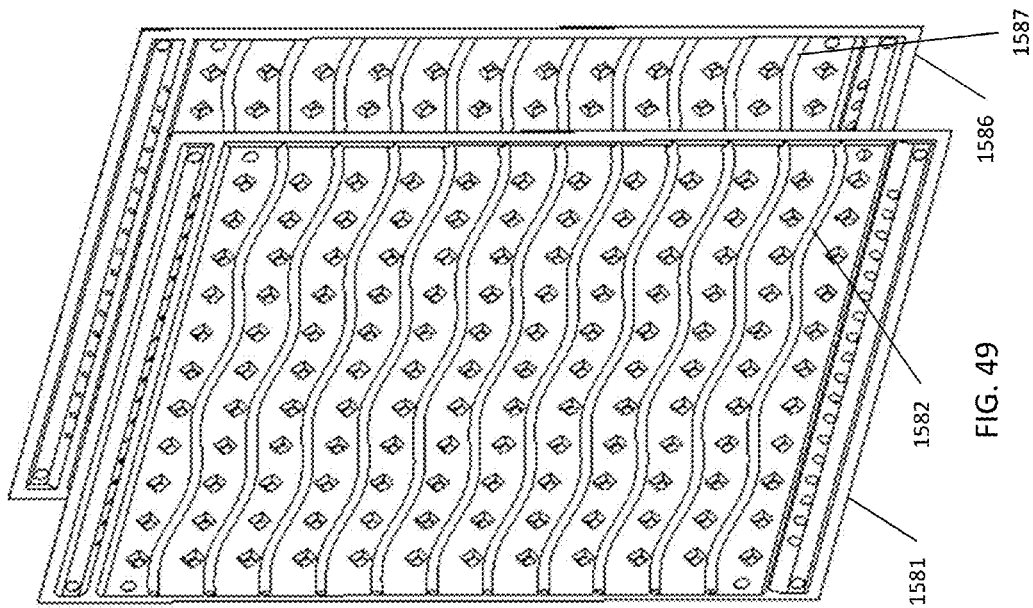
FIG. 49 shows how the support plate from FIG. 48 can be joined with another support plate from FIG. 48 to form a complete plate structure.

FIG. 49 shows how two support plates from FIG. 48 can be attached back to back to provide a full plate structure. For clarity the two plates are shown separated a small distance. The feature 1582 on support plate 1581 is mated to a similar feature 1587 on support plate 1586. When the two support plates are joined together, a full desiccant supply header, a desiccant drain header and a cooling fluid section are formed. The features 1582 and 1587 touch in numerous places creating a convoluted path for the cooling fluid flow.

Figure 50:
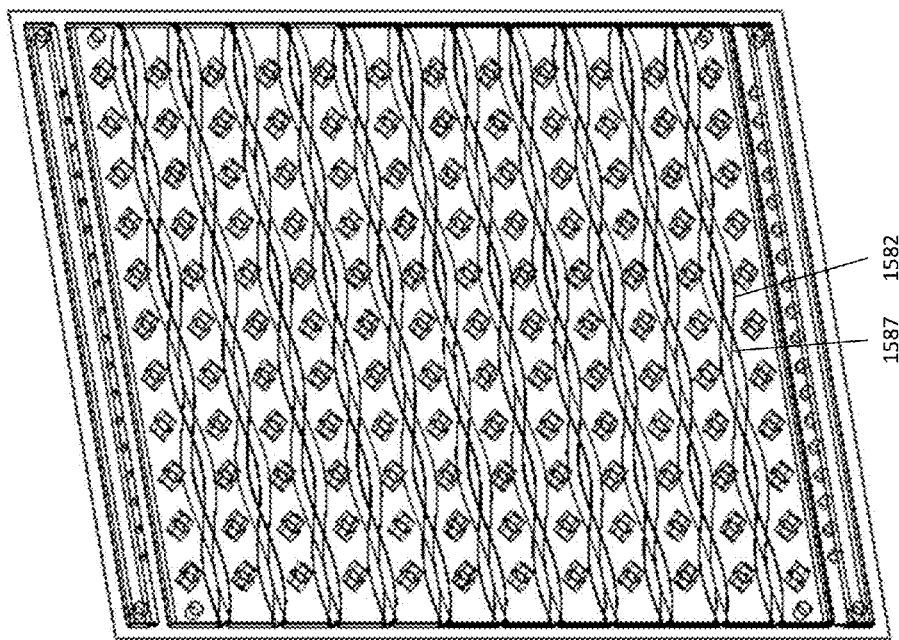
FIG. 50 illustrates how the two support plates from FIG. 49 are joined to form a single plate in a transparent aspect.

FIG. 50 shows the two joined plates. In the figure one of the plates has been shown transparently so that the overlapping features 1582 and 1587 can be seen to allow for fluid passage, turbulent mixing and a solid distance between support plates.

Figure 51:
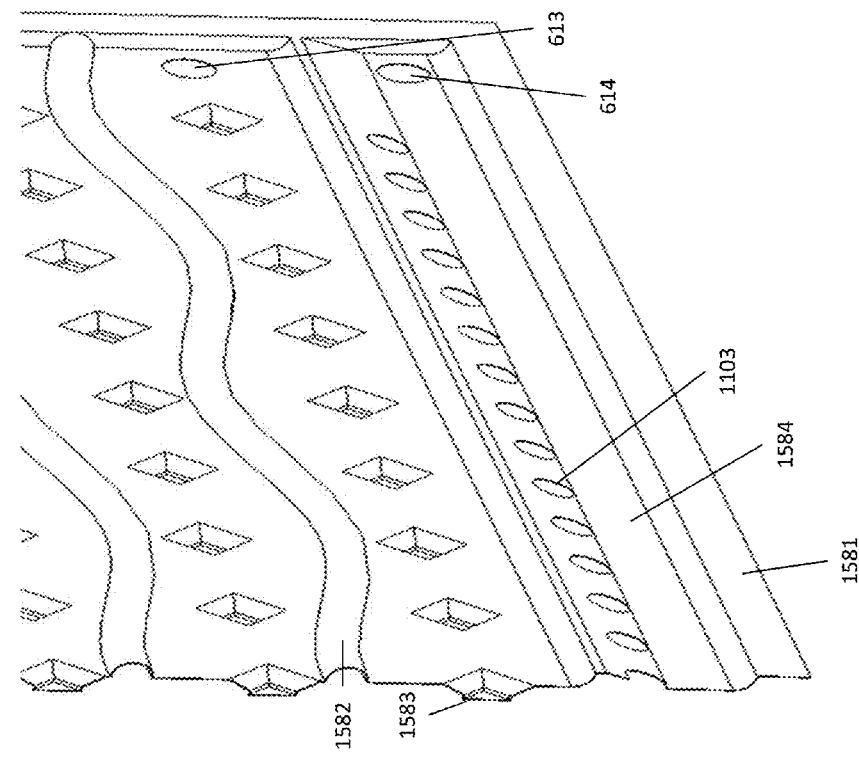
FIG. 51 shows a detail of a corner of the support plate of FIG. 48.

FIG. 51 finally shows a detail back-side view of the bottom-left corner of the support plate 1581 as was shown in FIG. 48. The small features 1583 protrude into the desiccant area by typically 0.5 mm. The cooling fluid features 1582 protrude into the cooling fluid area, by typically 1.5 to 2.0 mm. The cooling fluid supply port 613 is typically connected on the desiccant side by a compliant spacer as was shown in FIG. 14. Desiccant is collected through the ports 1103 into the header 1584 and eventually drains through ports 614.

FIG. 52 shows an arrangement of the seals involved in the plate design 609 of FIG. 10. As discussed prior the liquid desiccant 1591 enters through port 611, and runs inside the seal area 1304. The desiccant exits the seal area 1304 through the weeping holes 1108 and is contained by the membrane edge seal 1102. At the bottom of the membrane plate the desiccant seal 1102 drives the desiccant into the plate through the drain holes 1103, after which the lower desiccant seal 1303 drains the desiccant through port 614. The cooling fluid 1592 enters the plate at port 613, and runs upward until it exits at port 612.

FIG. 53 shows an alternate arrangement that can be useful if additional sensible cooling without dehumidification through the membrane is desirable. The desiccant drain 613 is now located somewhere near the upper portion of the plate in such a way that the desiccant drains away and the membrane seal 1102 (and the membrane—not shown) is now only covering the upper portion of the plate. As before, the desiccant 1591 enters through port 611 and runs down the surface of the plate through weeping holes 1108 and drains out through collection holes 1103 and through the drain port 613. The seal 1593 is now shaped in such a way as the allow the cooling fluid 1592 to pass in the middle of the plate through opening 1594. The desiccant collection seal 1595 is now split in 2 portions with each side draining through a separate port 613.

Figure 54:
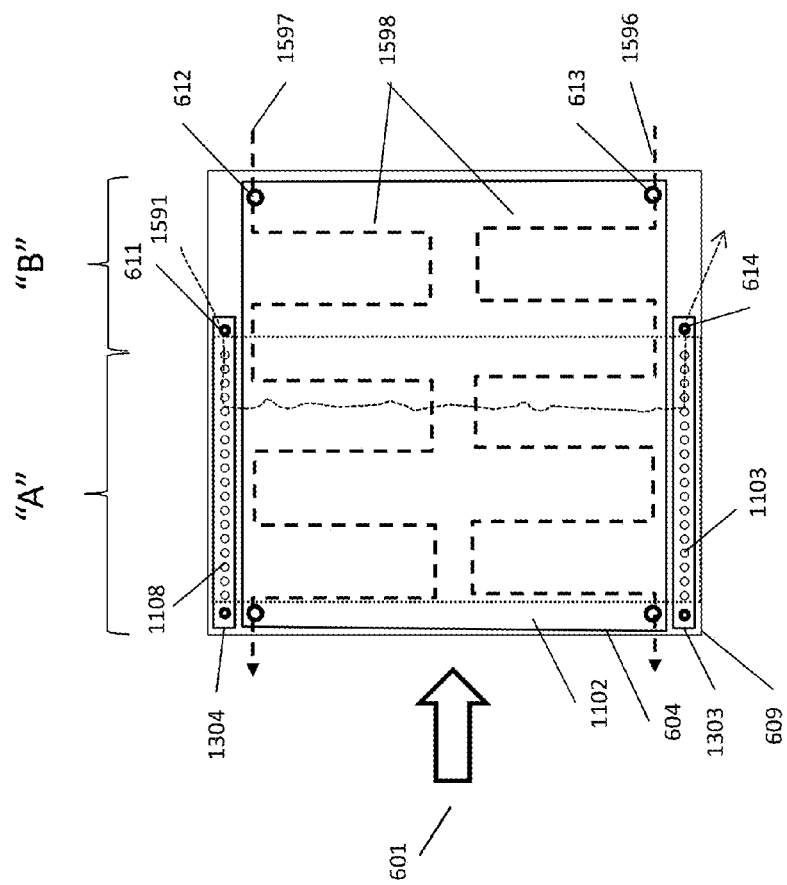
FIG. 54 shows an alternate arrangement of seals wherein the desiccant runs on a first section "A" of the membrane plate and there is no membrane on a second section "B" of the membrane plate.

FIG. 54 illustrates another embodiment of the arrangement of FIG. 53 wherein the air stream 601 is directed primarily in a horizontal fashion across the membrane across the membrane surface 1102. In section "A" the membrane is present with a desiccant behind the membrane and the air is dehumidified as well as cooled. Section "B" does not have a membrane and is therefore only providing additional sensible cooling to the air stream. The cooling fluid supplies 15967 and 1597 can now enter in for example ports 612 and 613 and the fluid channel 1598 can be shaped in such a way as to provide a counter-flow to the air stream 601. The advantage of this arrangement is that the cooling section "B" is acting on air that has already been dehumidified and therefore no condensation will occur in section "B".

Figure 55:
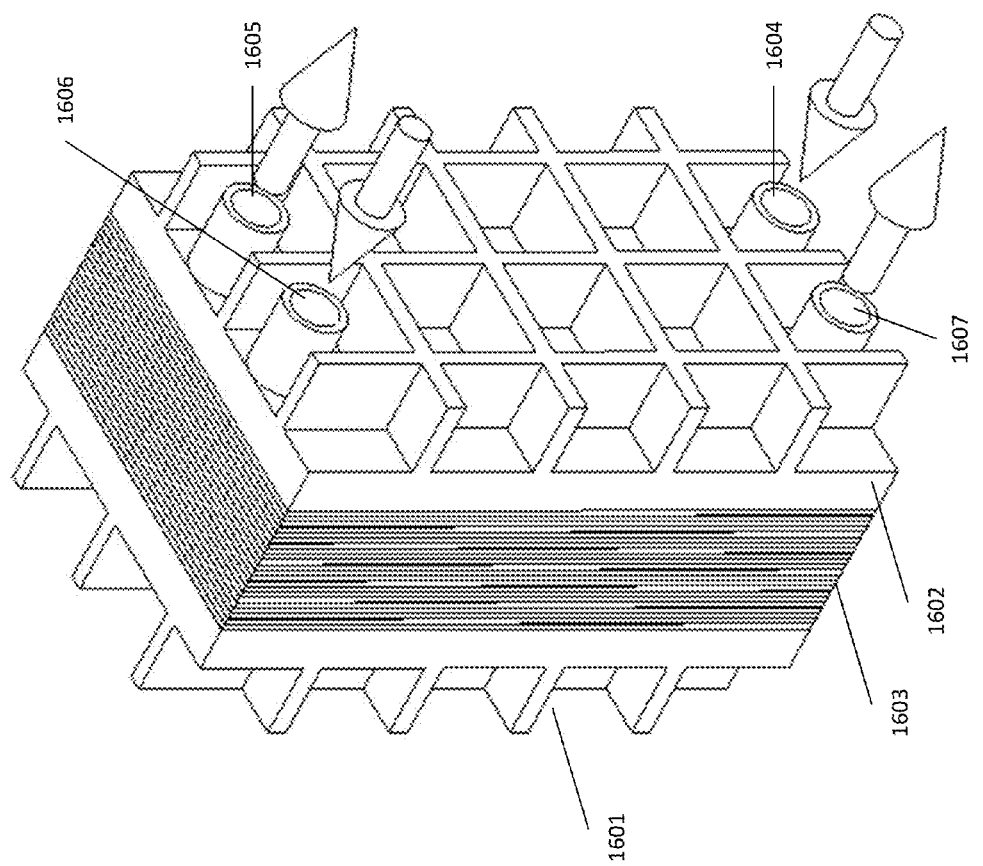
FIG. 55 shows a 2-way heat exchanger in accordance with one or more embodiments.

FIG. 55 illustrates a 2-way liquid to liquid heat-exchanger that uses similar concepts to the ones described above. Two main reinforced cover plates 1601 and 1602 contain a stack of plastic plates 1603. Liquid supply ports 1604 and 1606 and liquid drain ports 1605 and 1607 provide a counter-flow arrangement.

FIG. 56 shows the 2-way heat exchanger from FIG. 55 with one of the covers removed. The hole 1701 provides for a passage of liquid "A" that flows up through a diamond mesh turbulator 1707 and into the drain hole 1703. A main seal 1705 provides separation between the liquids "A" and "B" and the outside environment. As can be seen from the figure liquid "B" does not flow into the channel as the seal 1705 simply transports it to the next plate. As discussed under the 3-way heat exchanger, the diamond mesh turbulator 1707 provides two main functions: it sets the distance between the support plates 1706 and creates turbulent liquid flow across the plates. FIG. 57 shows the 2-way heat exchanger from FIG. 55 with an additional plate 1705 removed. As can be seen from the figure the seal 1705 now circles the opposite set of holes so that the fluid "B" can flow through the diamond mesh turbulator 1707.

Figure 58:
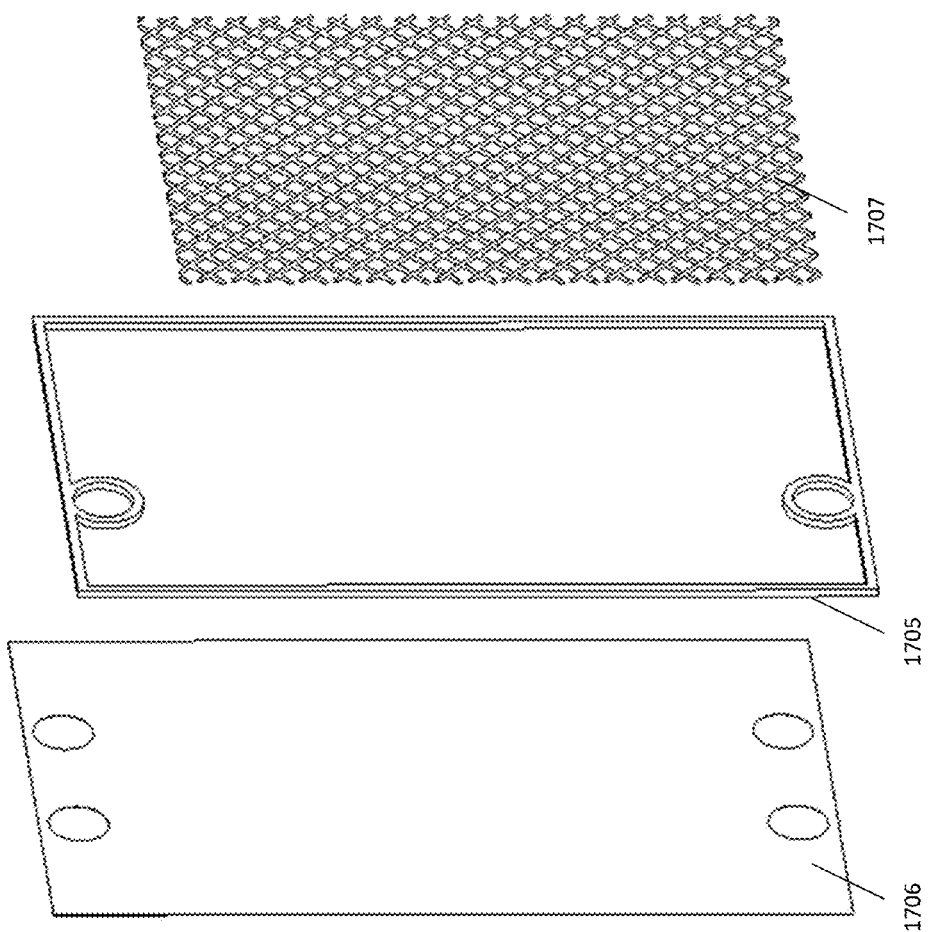
FIG. 58 illustrates the assembly of a single plate of the two-way heat exchanger of FIG. 55.

FIG. 58 shows the support plate 1706 which can be made similarly to the support plate 609 of the 3-way heat exchanger from a fiberglass reinforced plastic or a thermally conductive engineering plastic. The seal 1705 can again be made with an adhesive as discussed before for example 3M 550 or 5200 polyurethane adhesives. Such adhesives can be applied by hand or through a specifically designed adhesive robot system. A diamond mesh turbulator 1707 is applied inside the adhesive seal as was shown in FIG. 56.

Figure 60:
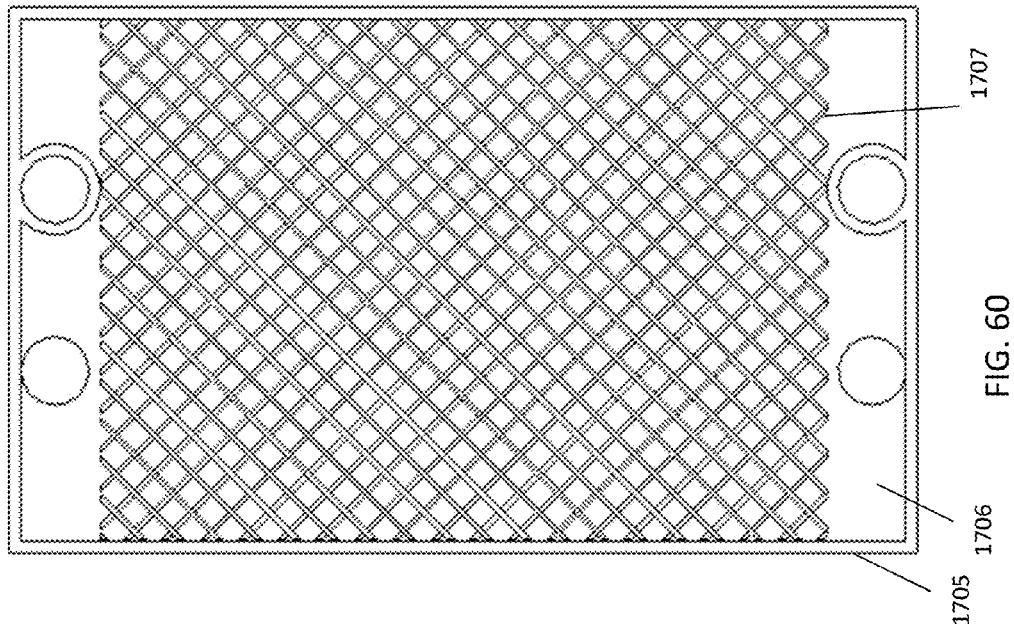
FIG. 60 shows an even-level plate assembly of the two-way heat exchanger.
Figure 59:
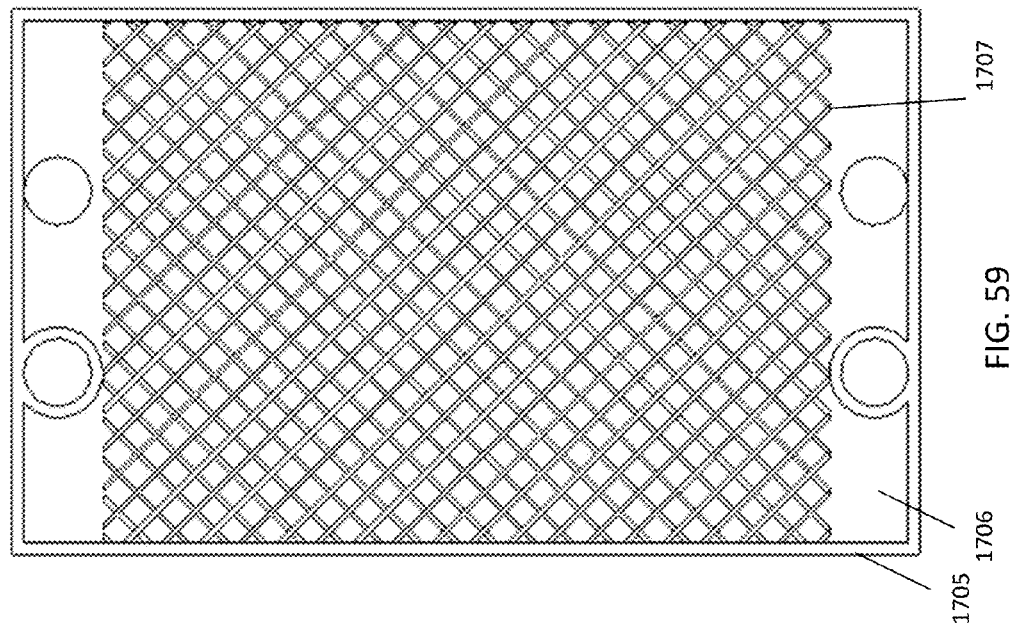
FIG. 59 shows an odd-level plate assembly of the two-way heat exchanger.

FIG. 59 and FIG. 60 show the alternating plates that make up the full plate stack 1603 as was shown in FIG. 55.

Figures 61, 62, 63:
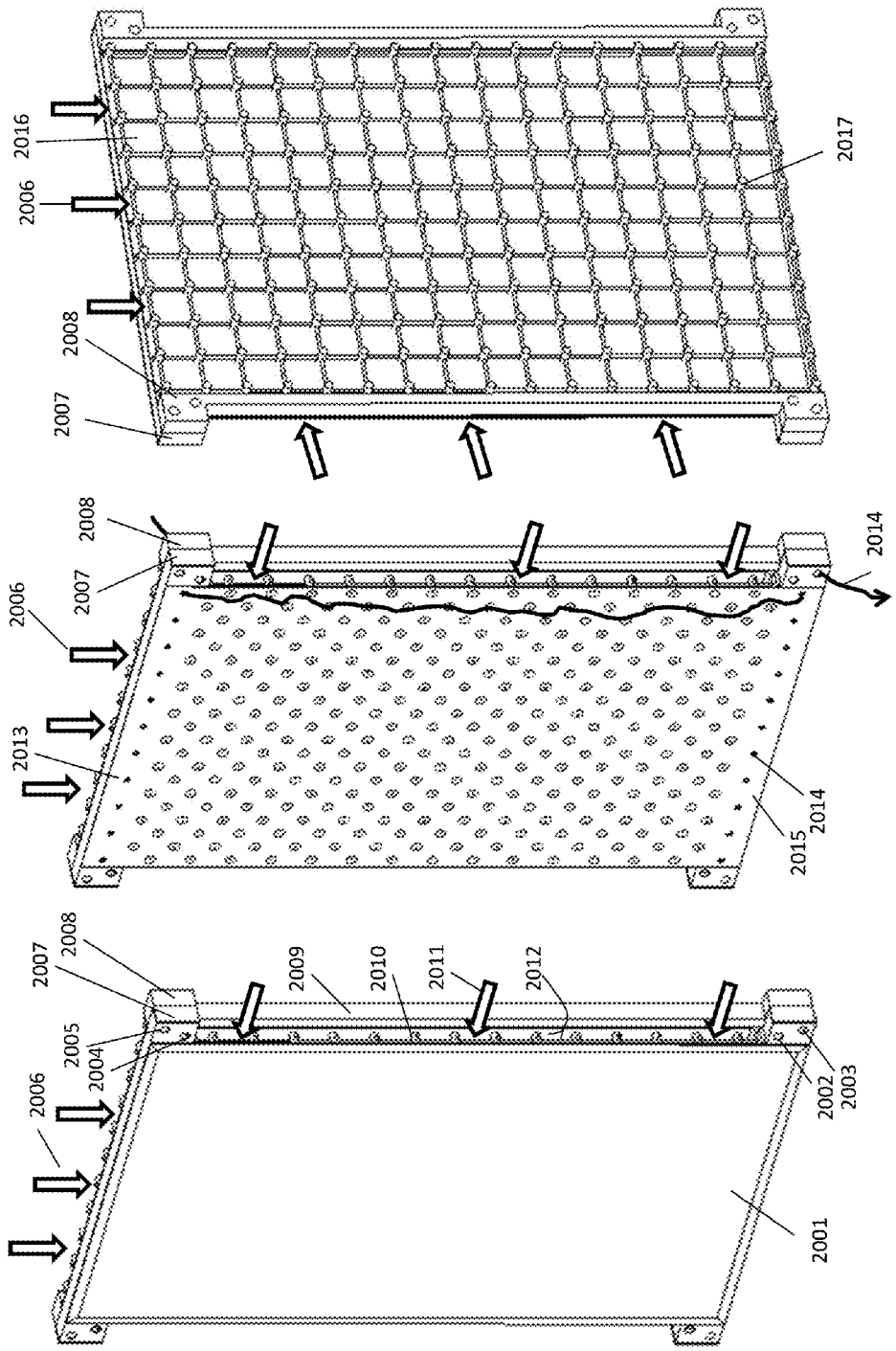
FIG. 61 illustrates a 2-part membrane plate assembly that utilizes a primary air stream in a vertical orientation and a secondary air flow in a cross flow, horizontal orientation wherein the cross flow air stream provides indirect cooling to the main air stream.
FIG. 62 shows the 2-part membrane plate assembly of FIG. 61 with an outer membrane removed for illustrative purposes.
FIG. 63 shows the rear-side of 2-part membrane plate assembly of FIG. 61.

FIG. 61 illustrates a 2-part membrane plate module wherein one part is made from a flexible material such as a polyurethane or EPDM rubber. Since membrane modules can be subject to higher temperatures, the assembly of the module is critical to ensure that temperature gradients do not cause materials to crack or adhesive bonds to fail. Oftentimes those failures are observed when plastics (which tend to have large thermal expansion coefficients) expand and generate stresses on bonds and adhesives. Membranes are often "potted" (meaning a liquid plastic is used to create seals between various components) but such potting materials once they cure can also easily fail. In liquid desiccant heat exchangers, this is particularly of importance on the regenerator, and to a lesser extent on the conditioner. Furthermore, supplying liquids evenly on opposite sides of non-internally cooled thin plates is oftentimes difficult. A 2-part structure where one portion is made from a pliable material such as EPDM or polyurethane is significantly more forgiving.

FIG. 61 shows a module with 2 distinct air passages 2006 and 2011 and two distinct sections 2007 and 2008. A front-side outer membrane 2001 is attached to a semi-rigid plate 2015 (which is more easily seen in FIG. 62). The liquid header 2007 at the top of the structure forms, combined with a flexible EPDM or similar material section 2008, a supply fluid channel 2005 for the outer membrane and a second fluid supply channel 2004 for the inner membranes 2012. It is worthwhile observing that there are two ports 2005 and 2004 on either end of the structure. This is because the fluids should preferably be distributed evenly across the surface of the membrane. It is very difficult to provide a uniform layer if the fluid gets too far away from the entry port. In practice a distance of about 400 to 500 mm between the two ports is achievable, but beyond that the middle of the membrane would become fluid starved. Having only one port in the header could therefor limit the width of the plate to about 300 mm. It should be clear that additional ports could be added to the header if desired to increase the width of the 2-plate structure to over 500 mm.

The liquids are drained through the drain 2002 for the inner membranes and the drain 2003 for the outer membranes. The flexible material 2008 can optionally also provide an edge seal 2009 to guide the air 2006 in a vertical aspect through the flexible material 2008, similar to the material 602 in FIG. 10 while also providing a certain amount of turbulent air mixing. The flexible component 2008 serves several functions: it provides a pliant interface between stacks of plates 2007; it provides passages for liquids between stacks of plates 2007; it provides an air channel edge seal 2009; it provides support for the outer membranes between stacks of plates 2007; and it provides a measured amount of air turbulence in the air channel. FIG. 62 shows the 2-part plate stack of FIG. 61 with the membrane 2001 removed. The rigid support plate 2015 is clearly visible with liquid supply holes 2013 (which serve to provide a liquid behind the membrane 2001) and liquid drain holes 2014. The figure shows how a liquid 2014 enters the 2-part structure 2007/2008 at the top of the figure, runs into the fluid header, through a supply hole 2013 and over the outer surface of the support plate 2015. As can be seen in the figure, the support plate 2015 can be outfitted with various features to adhere the membrane 2001 and also to provide turbulent flow of the fluid as discussed in the description of FIG. 10.

FIG. 63 shows the rear-side of the 2-part plate stack of FIG. 61. A rear-side outer membrane 2016 is being supported by the flexible structure 2008 which also contains supports 2017 for the rear-outer membrane 2016.

Figure 64:
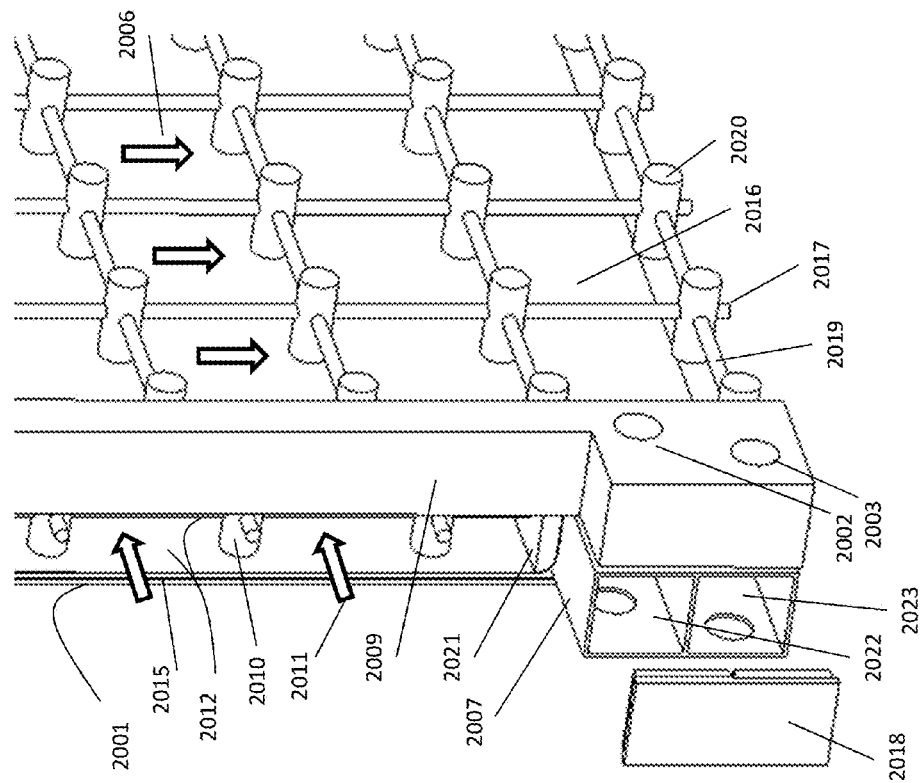
FIG. 64 shows a detail corner of FIG. 63.

FIG. 64 shows a detailed aspect of the lower left corner of FIG. 63. The figure shows the front outer-membrane 2001 attached to the support plate 2015. One of the two inner membranes 2012 is also shown. The secondary air stream 2011 is being turbulated by the membrane support structure 2010. It is possible to make the inner membrane support structure 2010 from a similar material as the outer membrane support structure 2008. The structure 2010 also contains a membrane edge seal 2021 which is set up in a way such that liquids between the inner membrane 2012 and the support plate 2015 can drain into the fluid drain holes 2025 (shown in FIG. 65). The lower fluid header 2007 is similar in construction to the upper fluid header or can be identical. The fluid headers can be made from an extruded plastic such as ABS or a flexible plastic such as EPDM. The header end-cap has been shown removed for clarity. The inner membrane fluid drain channel 2022 and the outer membrane fluid drain channel 2023 are also visible in the figure. The figure also shows the turbulator 2019 which has been made part of the flexible structure 2008. Membrane support pads 2020 keep the membrane 2016 in place. It should be clear that the support pads 2020 are serving the same function as the supports 1572 in FIG. 41. It is also clear that the membranes can be held against the support plate 2015 by a syphoning effect as discussed under FIG. 700.

Figure 65:
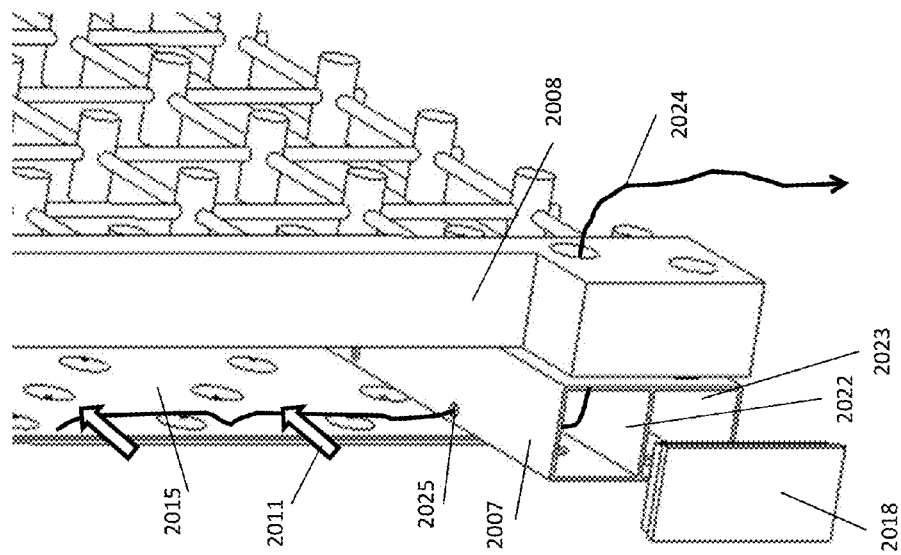
FIG. 65 shows a different aspect of FIG. 64 with an inner membrane and air turbulator removed for clarity.

FIG. 65 shows the same aspect as FIG. 64 with the inner membrane 2012 and the inner membrane support structure 2010 removed. The figure also shows the membrane support features 2015A used for either attaching the membranes and for diverting the fluid flows or both. Furthermore the fluid path 2024 for the fluid behind the inner membrane is shown. The fluid drain holes 2025 in the lower header are also visible.

Figures 66, 67:
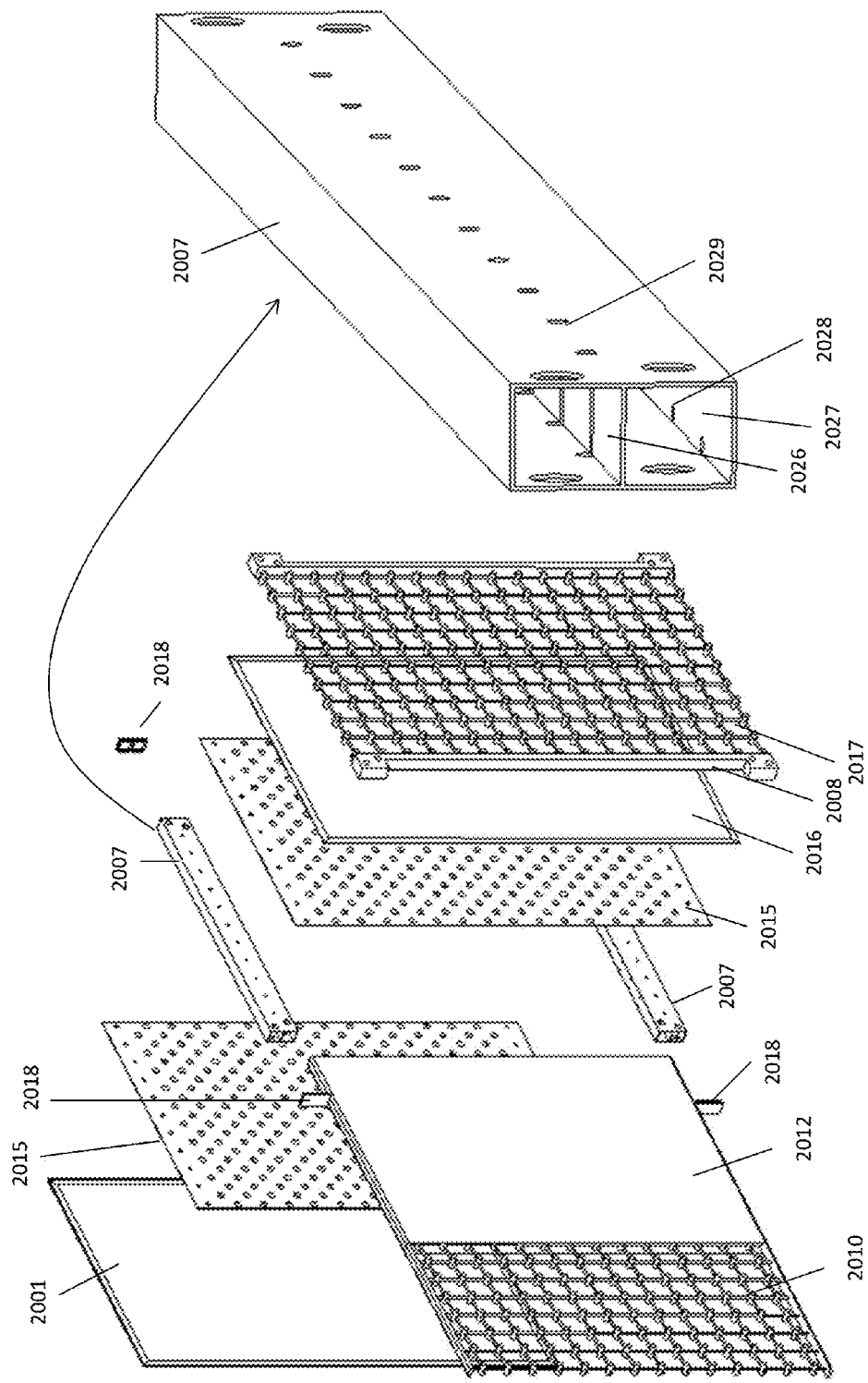
FIG. 66 shows an exploded view of the 2-part membrane plate assembly of FIG. 61.
FIG. 67 shows a detailed aspect of FIG. 66.

FIG. 66 shows the 2-part membrane plate assembly from FIG. 61 in an "exploded view" aspect. The inner membrane support structure 2010 has two inner membranes 2012 on either side of the structure. The upper and lower fluid headers 2007 supply and drain fluid from the membrane structures for both the inner and outer membranes. Support plates 2015 provide rigid support and features for turbulating the fluids. The outer membranes 2001 and 2016 are attached on the outside of the support plates 2015. The flexible structure 2008 finally completes the structure.

FIG. 67 shows a close-up view of the upper fluid header with the fluid supply channel 2026 for the outer membranes and the fluid supply channel 2027 for the inner membranes visible. The outer membranes receive fluids through the supply holes 2029 and the inner membranes receive fluid through the supply holes 2028.

Figure 68:
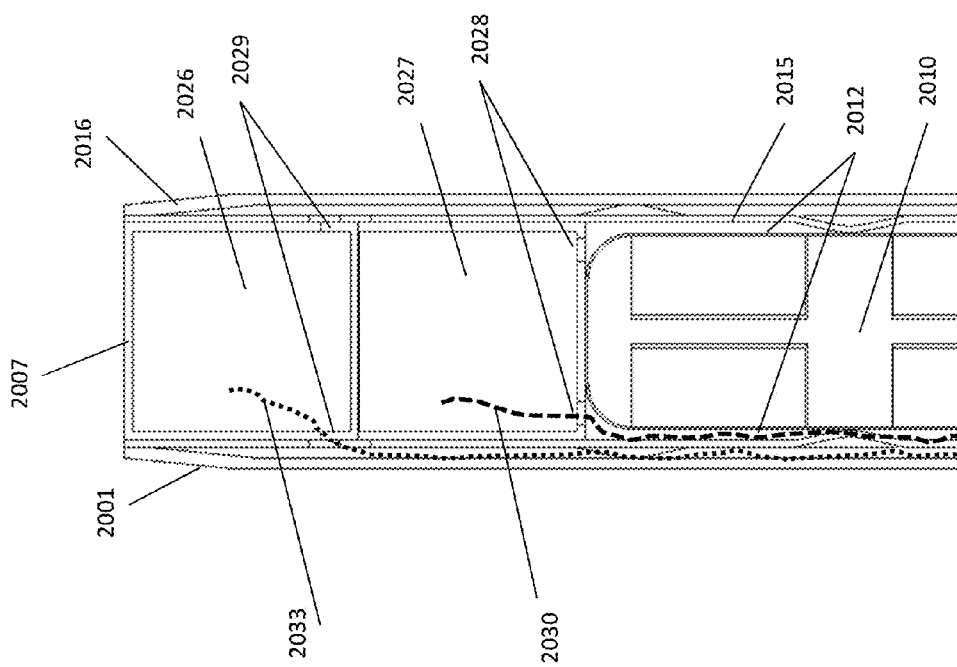
FIG. 68 shows a cross-sectional view of the top of 2-part the membrane plate assembly of FIG. 61.

FIG. 68 illustrates the fluid supply paths for the outer membrane 2029 as well as the fluid path 2033 for the inner membrane.

Figure 69:
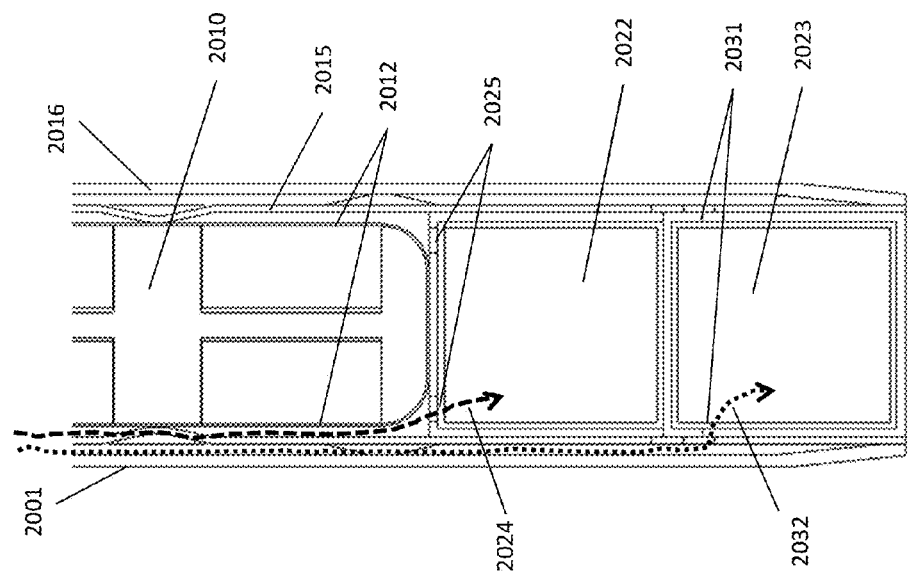
FIG. 69 shows a cross-sectional view of the bottom of the 2-part membrane plate assembly of FIG. 61.

FIG. 69 illustrates the fluid drain path 2032 for the outer membrane as well as the fluid drain path 2024 for the inner membrane. Drain holes 2025 and the fluid channel 2022 for the inner membranes are shown as are the lower drain holes 2031 for the outer membranes on the fluid channel 2023.

Figure 70:
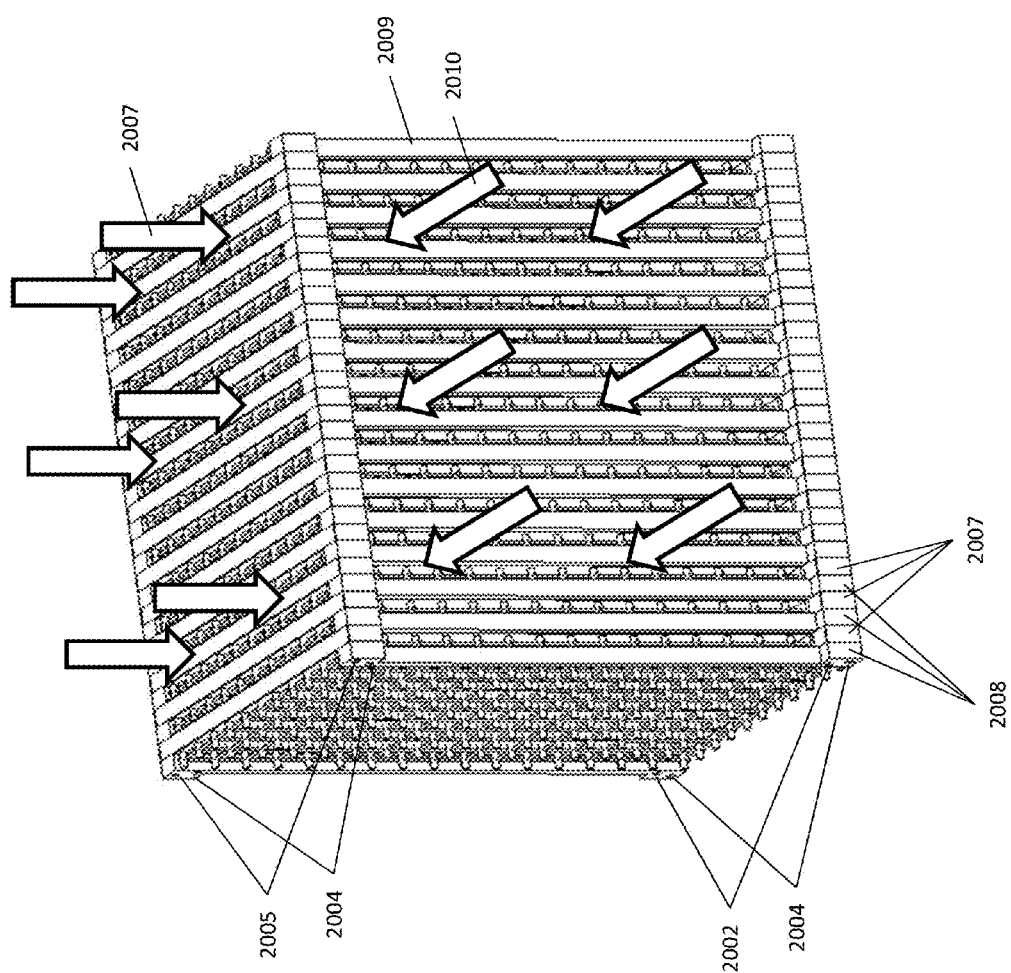
FIG. 70 shows a cross flow plate module utilizing multiple copies of the 2-part membrane plate assembly from FIG. 61.

FIG. 70 shows a stack of multiple 2-plate structures arranged into a cross-flow air treatment module. Liquids are supplied at the top of the structure through two ports 2005 for achieving more uniform fluid distribution across the outer membranes. Likewise the two ports 2004 provide even fluid distribution across the inner membranes. Drain ports 2002 and 2003 provide drainage for the inner membranes and outer membranes respectively. Notice that the fluids behind the inner and outer membranes can be different or identical. For example, one of the fluids could be a desiccant and the other could be plain water, or seawater or waste water. Other fluids are also possible. As discussed before, the primary air stream 2007 can be in an downward or in an upward aspect and the cross-flow air stream 2010 can enter the module from either side.

Figure 72:
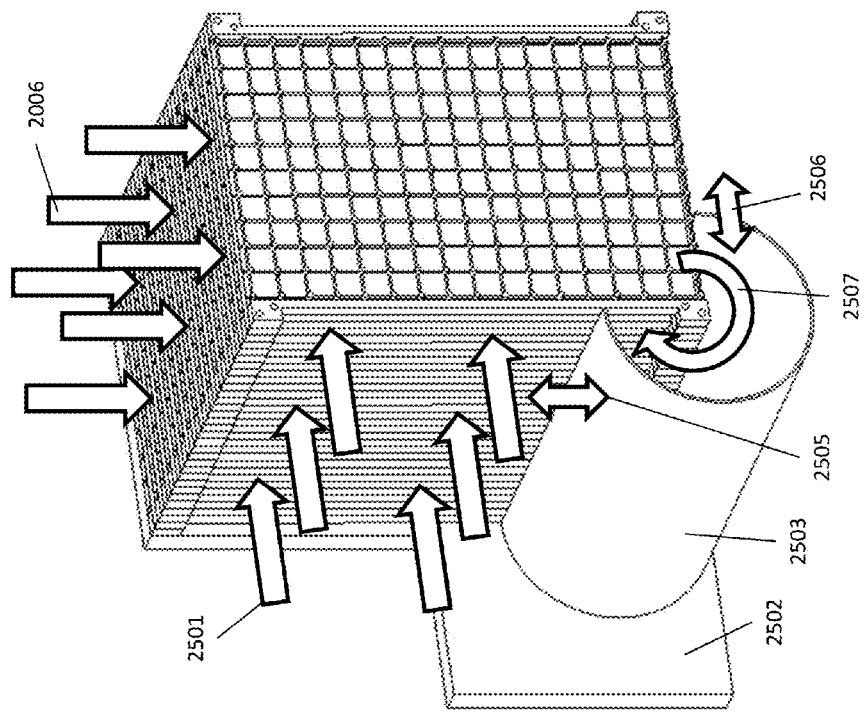
FIG. 72 illustrates the air treatment module of FIG. 71 with one side cover removed for illustrating the ability to vary the amount of air from the main stream to be diverted to the cross flow air stream.
Figure 71:
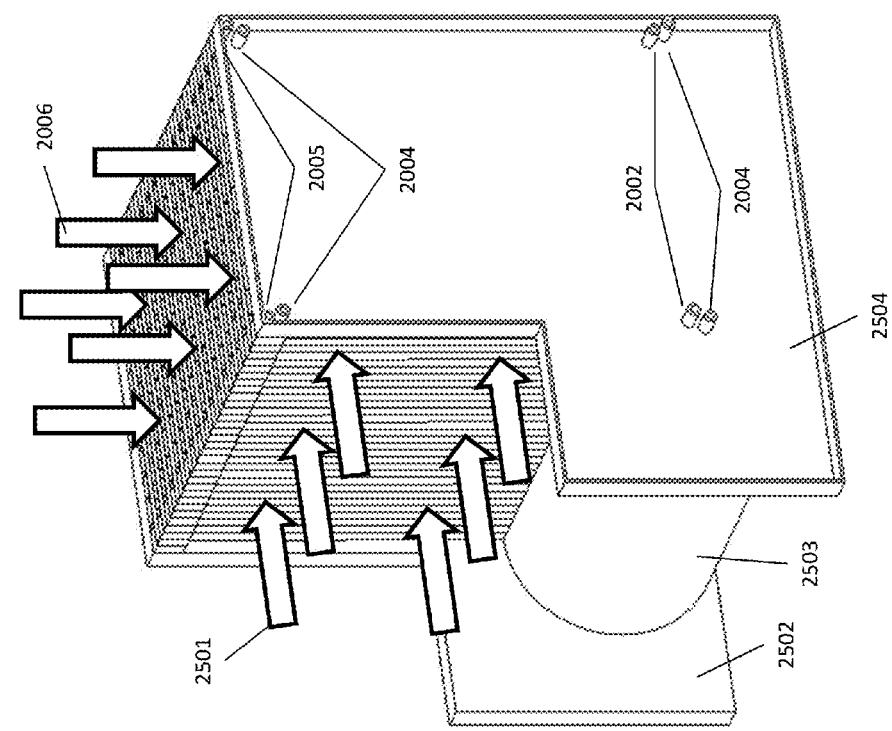
FIG. 71 shows the cross flow plate module of FIG. 70 integrated into an air treatment module wherein a portion of the primary supply air stream is diverted and mixed with the secondary cross flow air stream.

FIG. 71 demonstrates an application of the membrane module of FIG. 70 wherein the primary air stream 2006 comprising outdoor air flows generally vertically through the module and is partially diverted by diverter 2503 to become part of the secondary air stream flowing generally horizontally through the module. An additional secondary air stream 2501 which can, e.g., also be an outside air stream is applied as well. By now providing a liquid desiccant through ports 2005 the primary air stream 2006 is dehumidified through the outer membranes. If water is provided through the ports 2004, the secondary air stream will cause an evaporative cooling effect on the backside of the support plates 2015 shown earlier. This indirect evaporative cooling effect removes the latent heat as well as sensible heat from the primary air stream. This cooling effect then in turn improves the dehumidification in the primary channel which the gives a larger cooling effect in the secondary channel as a self-reinforcing system. The end plates 2502 and 2504 provide support and mounting of the plate stacks as well as a convenient interface for the fluids FIG. 72 shows the system of FIG. 71 with the end plate 2504 removed. As can be seen in the figure, the diverter 2503 is diverting a portion 2507 of the air in the channel. The diverter can be made from a flexible or adjustable material or parts so that the diverted air portion can be varied for example by moving the intake opening 2506 or the secondary air mixing ratio by moving section 2505. This allows the secondary air stream composition to be varied; for example in hot weather that is dry, there may be little need to use any of the primary dry air.

Figure 73:
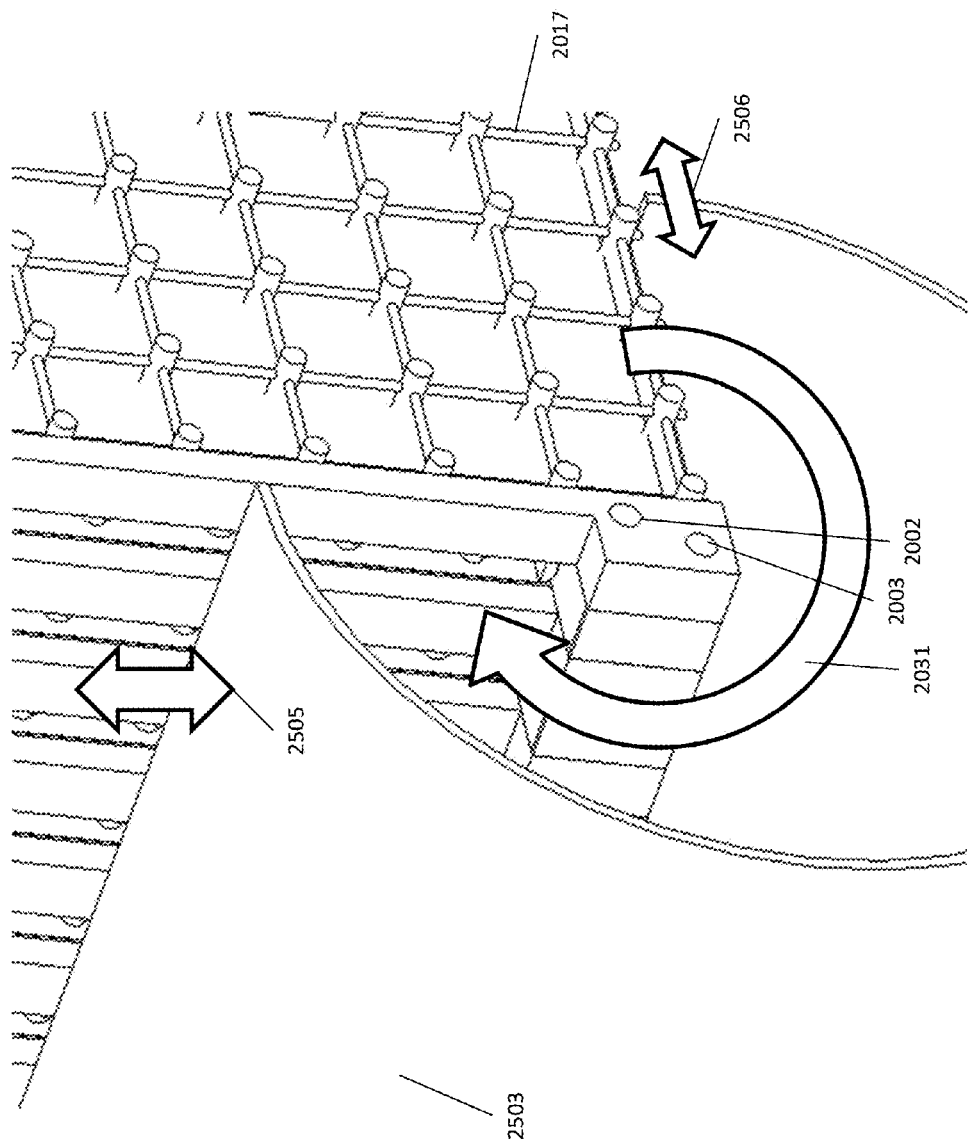
FIG. 73 shows a detail of FIG. 72.

FIG. 73 shows a detail of the lower left corner of FIG. 72, clearly showing how the primary air path in the vertical slots is changed to become the horizontal air path in the secondary air stream.

Figure 74:
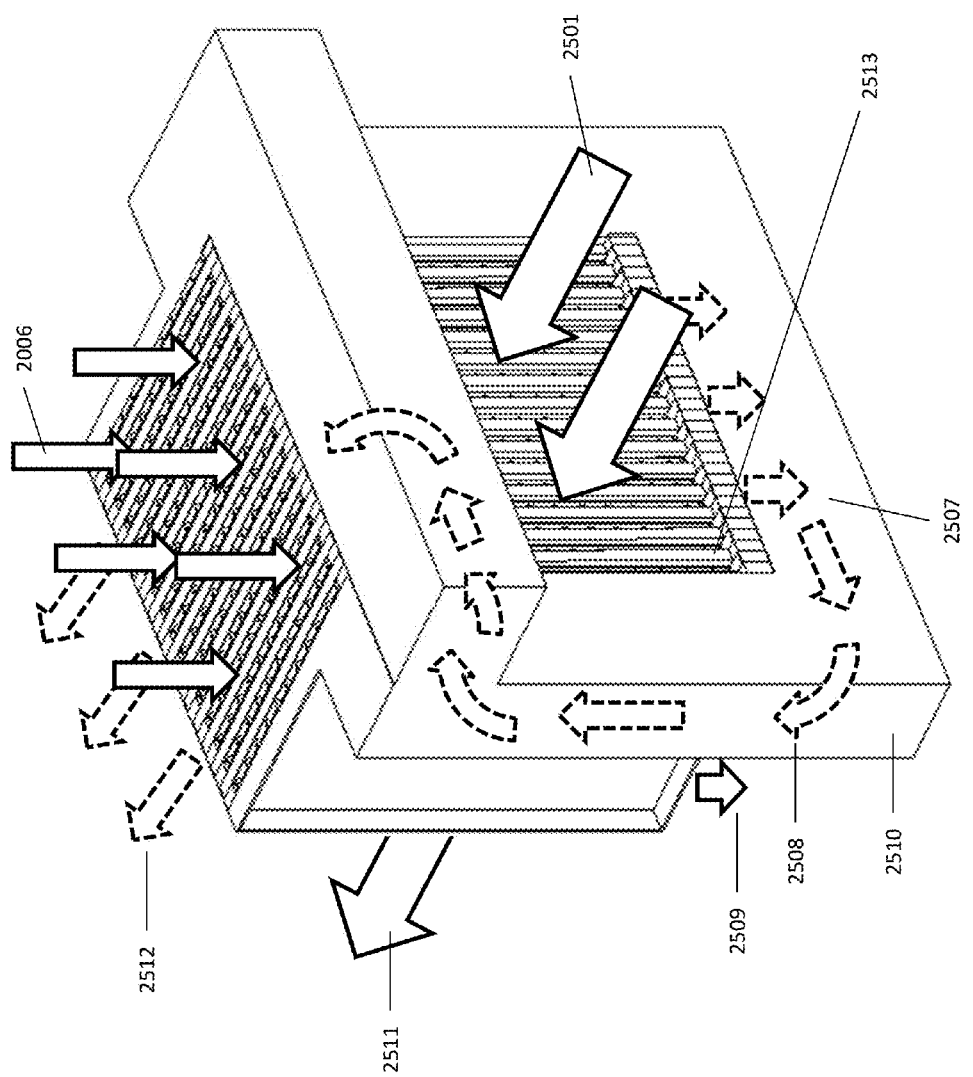
FIG. 74 illustrates an alternate embodiment of the system of FIG. 71, wherein the air stream is directed to the top portion of the cross flow plate module.

FIG. 74 shows an alternate embodiment of the system in FIG. 71. wherein a portion 2507 of the primary air stream 2006, after it has been treated by the membrane module plates 2513 is directed in ducts 2510 to flow up 2508 and to the top of the membrane module and where it is turned to a horizontal secondary air stream in such a way as to run in the alternate channels formed by the horizontal slots. The advantage of this arrangement is that the treated dry air 2509 is now mixed at the most advantageous location near the top of the secondary channel, where it has the greatest cooling effect on the primary air stream 2006. The secondary air stream 2501 now provides cooling near the bottom of the membrane plates 2513. The exiting air 2511 is then combined with the exiting air 2512 that is the result of the diverted air flow 2507. Although more complicated as a duct work, the advantage of redirecting the air flow near the top of the membrane panels results in a more efficient system. It will be clear to those skilled in the art that the primarily air flow 2006 and secondary air flow 2501 can be switched so that the primary air stream is horizontal and the secondary air stream is vertical (either flowing up or down as the case may be).

Figures 75, 76:
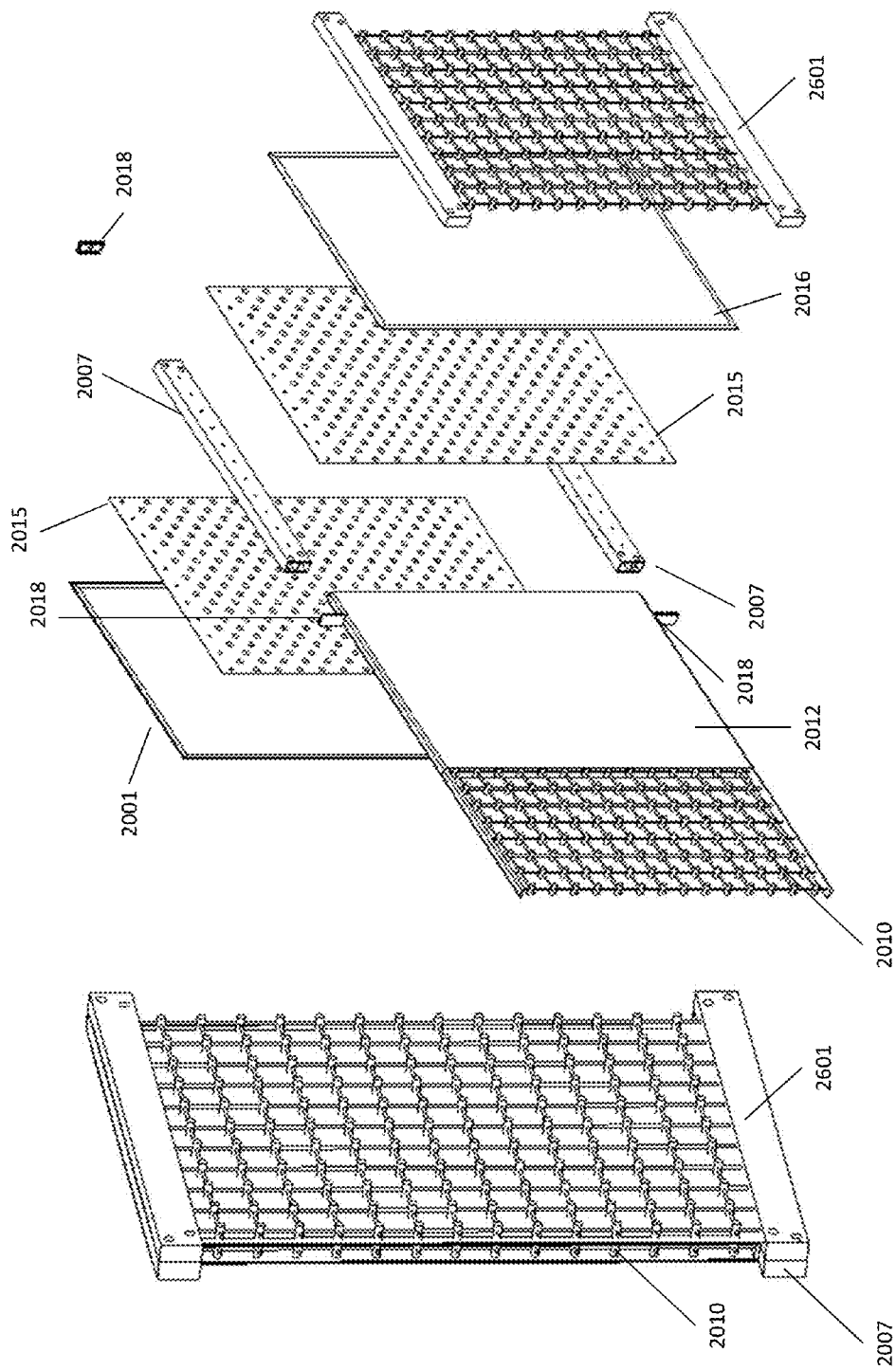
FIG. 75 shows a 2-part module wherein one plate provides 4 flow paths for liquids to be exposed to an air stream and wherein the air stream is primarily horizontal.
FIG. 76 shows an exploded view of the 2-part module of FIG. 75.

FIG. 75 illustrates an alternate embodiment of the 2-part plate stack of FIG. 61. In this case the vertical air flow membrane support structure 2008 has been modified to allow for a horizontal air flow. The new membrane support structure 2601 again is constructed from a compliant material such as Polyurethane or EPDM rubber. It also can provide for air turbulation and membrane support features as well as an edge seal and liquid passages.

FIG. 76 shows an "exploded view" of the 2-part plate stack of FIG. 75. The structure is essentially unchanged from that of FIG. 66 with the exception of the membrane support structure 2601 that now provides for horizontal air flow.

Figure 77:
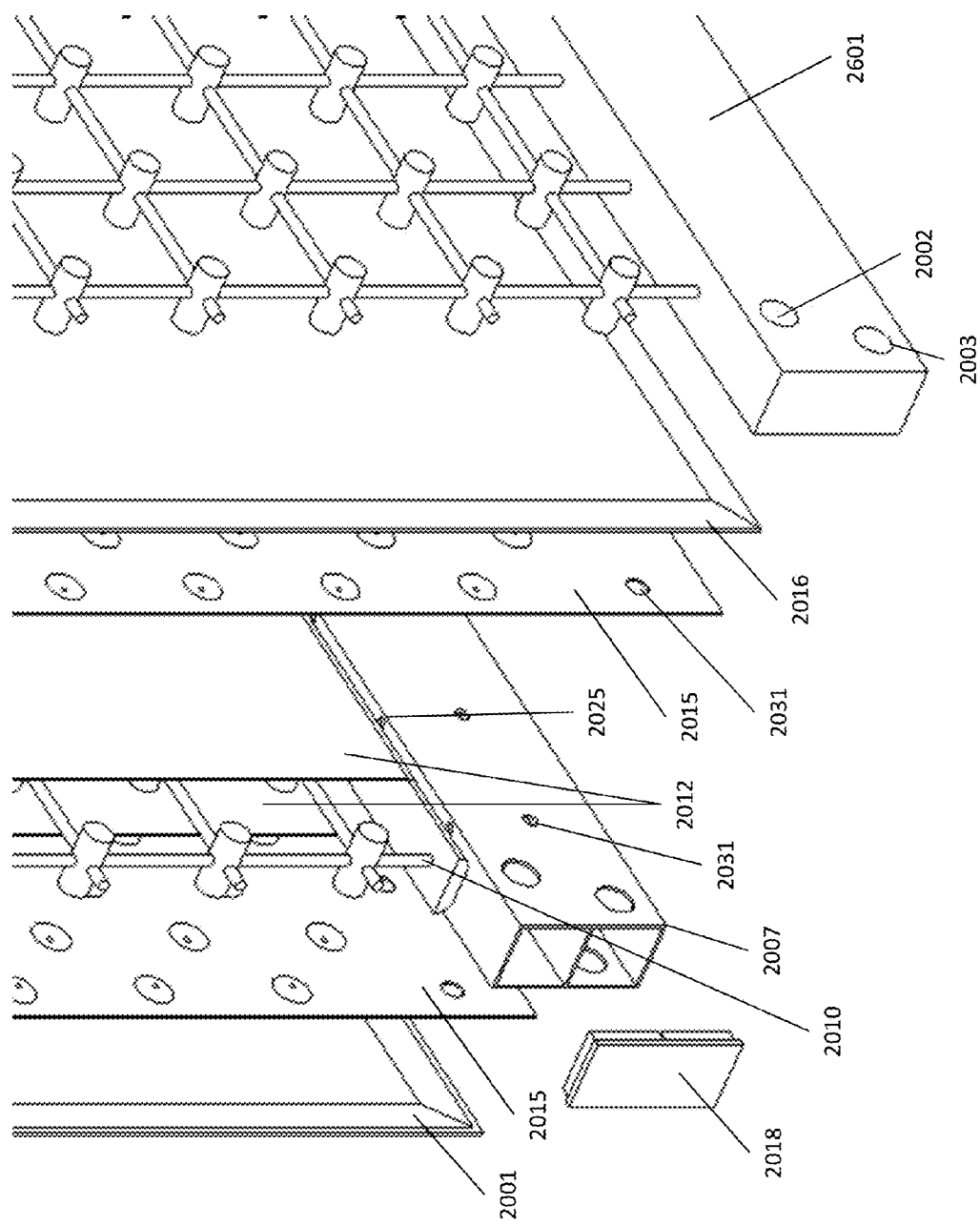
FIG. 77 shows a detail of the exploded view of FIG. 76.
Figure 79:
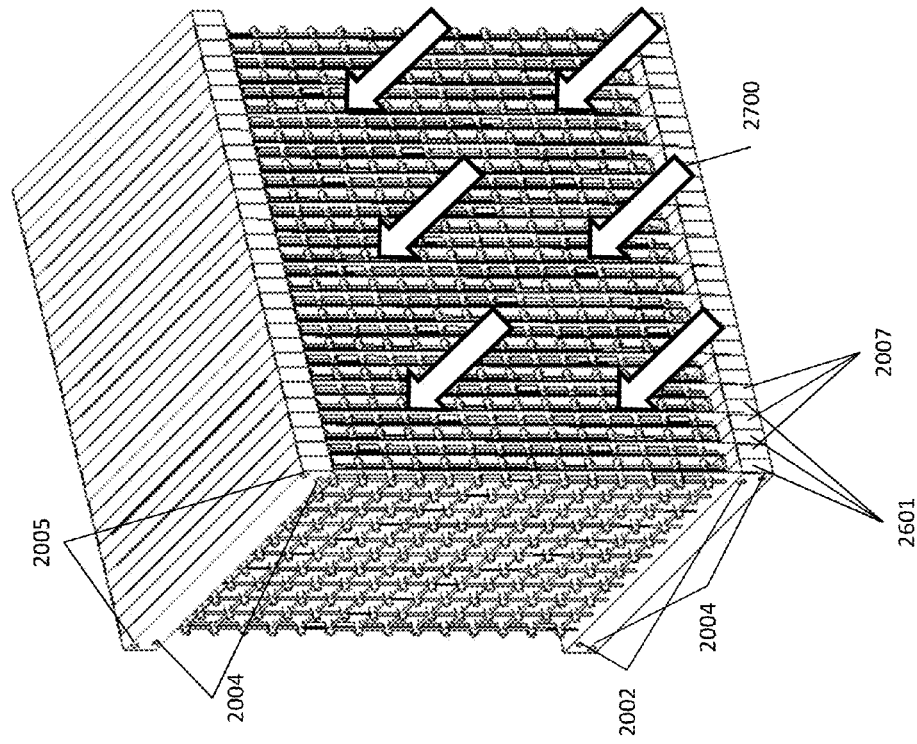
FIG. 79 shows the air treatment module of FIG. 78 with cover plates removed.

FIG. 77 shows a detail of the lower left corner of FIG. 76. The front outer-membrane 2001 attaches to the support plate 2015, which in turn is adhered to the lower header 2007. The membrane support structure 2010 provides support for the inner membranes 2012. Fluid drains 2025 for the inner membranes allow fluids to drain into channel 2002. Drain holes 2031 in the support plate 2015 allow the outer membranes 2001 and 2016 to drain into the lower fluid channel 2003.

Figure 78:
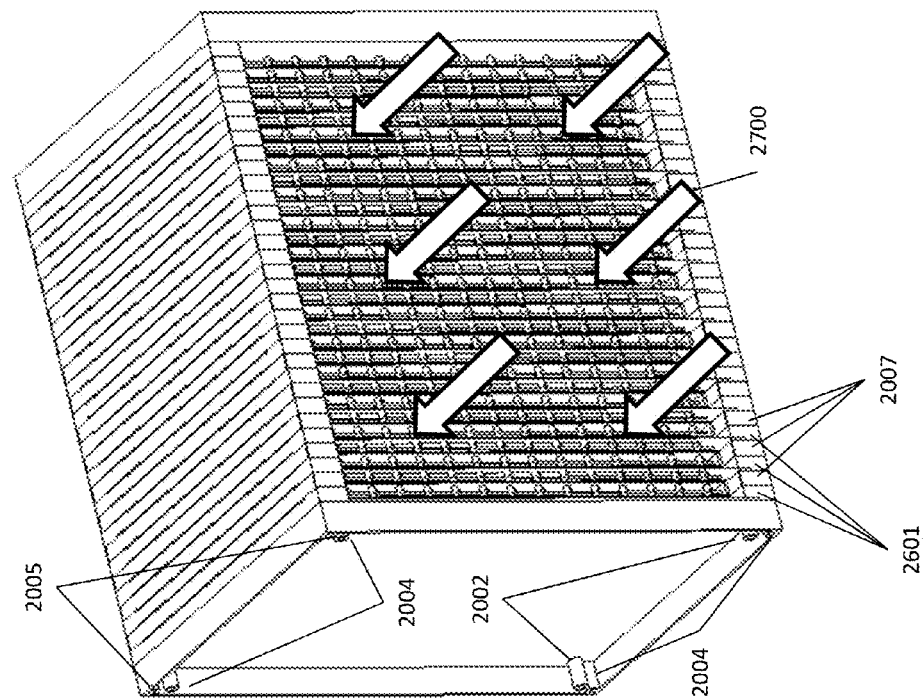
FIG. 78 shows an air treatment module with horizontal air flow wherein the air stream is exposed to liquids on each of the channels in the module.

FIG. 78 now illustrates a membrane module wherein air in a horizontal aspect is contacted by fluids behind the membranes. Ports 2005 provide fluids to the outer membranes and ports 2004 provide fluids to the inner membranes. Ports 2002 drain the fluids from the inner membranes and ports 2003 drain the outer membranes. It should be clear that if the fluids provided to ports 2005 and 2004 are identical (for example they both contain the same desiccant) then the fluid channels and supply channels can be combined into a single channel. This would simplify the membrane modules construction. Likewise it is easy to envision a structure that has more than 2 fluids exposed to the air stream by employing 3 or 4 separate supply and drain passages.

FIG. 80 illustrates a cross sectional view of the module described under FIG. 2000, with similar construction details as was shown in FIGS. 2100A, 2100B, 2200A, 2200B, 2300A, and 2300B, wherein the support plate 2015 has been modified so that it can wrap around a refrigerant line 2801 as is shown by the bulge in the plate 2802. Refrigerants are typically operating at high pressures which can vary from 200 to 600 psi, necessitating the use of metal lines. The refrigerant lines 2801 can provide cooling (or heating as the case may be) to the desiccant by thermal conduction through the support plate 2015. The liquid desiccant that is running behind the membranes 2012 and 2016 is highly corrosive so that direct contact with the metal refrigerant lines is undesirable, unless the refrigerant lines are made of a highly inert metal like titanium which can be cost prohibitive. By wrapping the support plate 2015 around the refrigerant lines 2801, a good thermal contact can be achieved, without the need for a titanium pipe and simple copper tubing (which is commonly used for refrigerants) can be employed. It is also possible to construct the refrigerant lines at an angle to the air stream so that the "bulge" in the membrane 2802 functions similarly to the surface turbulators as was shown in FIG. 35 and 1555B. The refrigerant lines allow for direct cooling of the desiccant and can be repeated every several inches to prevent the desiccant from heating up too much as it is running from the top to the bottom of the membrane plate. The advantage of this approach is that the air can now be dehumidified and cooled with a conventional vapor compression system, rather than using indirect backside evaporative cooling as was shown for example in FIG. 71.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. A heat exchanger for use in a desiccant air conditioning system, comprising:

a plurality of membrane-plate assemblies facing each other in a generally parallel arrangement and being spaced apart to define air gaps therebetween through which air to be treated by the desiccant air conditioning system can flow, each of said membrane-plate assemblies comprising (a) a plate structure and (b) two membranes, each facing an opposite side of the plate structure and spaced apart from the plate structure to define a liquid gap therebetween through which a liquid can flow, and wherein the membrane-plate assemblies have a cross-flow arrangement such that the air gaps alternatingly form primary and secondary channels, wherein air flow in the primary channels is at a cross flow to air flow in the secondary channel;

wherein each membrane has a bottom portion that is sealed to the plate structure such that liquid desiccant is forced to flow through one or more drain ports, thereby creating a negative pressure in the gap between each membrane and the plate structure.

2. The heat exchanger of claim 1, further comprising a diverter for diverting at least a portion of the airflow exiting the primary channels to become part of the airflow entering the secondary channels to provide evaporative cooling.

3. The heat exchanger of claim 2, wherein the diverter is configured to transport the diverted airflow to enter a portion of the heat exchanger near the entry of the primary channels.

4. The heat exchanger of claim 2, wherein the diverter is configured to transport the diverted airflow to enter a portion of the heat exchanger near the exit of the primary channels.

5. The heat exchanger of claim 1, wherein the primary channels are configured for vertical air flow.

6. The heat exchanger of claim 1, wherein the primary channels are configured for horizontal air flow.

7. The heat exchanger of claim 1, wherein the membranes defining the primary channels have a liquid desiccant flowing through the liquid gap.

8. The heat exchanger of claim 1, wherein the membranes defining the secondary channels have water flowing through the liquid gap.

9. The heat exchanger of claim 8, wherein the water comprises seawater or wastewater.

10. A heat exchanger for use in a desiccant air conditioning system, comprising:
- a plurality of membrane-plate assemblies facing each other in a generally parallel arrangement and being spaced apart to define air gaps therebetween through which air to be treated by the desiccant air conditioning system can flow,
- each of said membrane-plate assemblies comprising (a) a plate structure and (b) two membranes, each facing an opposite side of the plate structure and spaced apart from the plate structure to define a liquid gap therebetween through which a liquid can flow, and
- wherein the membrane-plate assemblies have a cross-flow arrangement such that the air gaps alternatingly form primary and secondary channels, wherein air flow in the primary channels is at a cross flow to air flow in the secondary channel; and
- a diverter for diverting at least a portion of the airflow exiting the primary channels to become part of the airflow entering the secondary channels to provide evaporative cooling.

11. The heat exchanger of claim 10, wherein the diverter is configured to transport the diverted airflow to enter a portion of the heat exchanger near the entry of the primary channels.

12. The heat exchanger of claim 10, wherein the diverter is configured to transport the diverted airflow to enter a portion of the heat exchanger near the exit of the primary channels.

13. The heat exchanger of claim 10, wherein the primary channels are configured for vertical air flow.

14. The heat exchanger of claim 10, wherein the primary channels are configured for horizontal air flow.

15. The heat exchanger of claim 10, wherein the membranes defining the primary channels have a liquid desiccant flowing through the liquid gap.

16. The heat exchanger of claim 10, wherein the membranes defining the secondary channels have water flowing through the liquid gap.

17. The heat exchanger of claim 16, wherein the water comprises seawater or wastewater.

\* \* \* \* \*